US012811762B2

(12) United States Patent
Zhang et al.

(10) Patent No.: US 12,811,762 B2
(45) Date of Patent: Nov. 24, 2026

(54) SCHEDULING DURING SLOTS WITH SUB-BAND FULL-DUPLEX RESOURCES

(71) Applicant: QUALCOMM Incorporated, San Diego, CA (US)

(72) Inventors: Qian Zhang, Basking Ridge, NJ (US); Yan Zhou, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 18/443,119

(22) Filed: Feb. 15, 2024

(65) Prior Publication Data

US 2024/0340153 A1 Oct. 10, 2024

Related U.S. Application Data

(60) Provisional application No. 63/494,988, filed on Apr. 7, 2023.

(51) Int. Cl.
*H04L 5/14* (2006.01)
*H04L 5/00* (2006.01)
*H04W 72/0446* (2023.01)

(52) U.S. Cl.
CPC ................ *H04L 5/14* (2013.01); *H04L 5/003* (2013.01); *H04W 72/0446* (2013.01)

(58) Field of Classification Search
CPC . H04L 5/14; H04L 5/003; H04L 5/16; H04W 72/0446
See application file for complete search history.

(56) References Cited

U.S. PATENT DOCUMENTS

2021/0377926 A1* 12/2021 Li ............................ H04L 5/14

OTHER PUBLICATIONS

Intel Corporation: "On SBFD in NR Systems", 3GPP TSG RAN WG1 #112, 3GPP Draft, R1-2300946, Type Discussion, FS_NR_DUPLEX_EVO, 3rd Generation Partnership Project (3GPP), Mobile Competence Centre, 650, Route Des Lucioles, F-06921 Sophia-antipolis Cedex, France, vol. 3GPP RAN 1, No. Athens, GR, Feb. 27, 2023-Mar. 3, 2023, Feb. 18, 2023, 16 Pages, XP052248089, Sections 2-4.

International Search Report and Written Opinion—PCT/US2024/016219—ISA/EPO—Jun. 6, 2024.

(Continued)

*Primary Examiner* — Natasha W Cosme
(74) *Attorney, Agent, or Firm* — Holland & Hart LLP

(57) ABSTRACT

Methods, systems, and devices for wireless communication are described. A network entity may transmit, and a user equipment (UE) may receive, control signaling that configures or schedules sub-band full-duplex (SBFD) slots or symbols. The network entity may transmit, and the UE may receive, control signaling that schedules occasions, a resource block group, or a precoding resource block group that may overlap with the SBFD slot or symbols. The UE and the network entity may regulate communications based on application of one or more rules pertaining to communications when scheduled resource overlaps with a SBFD slot or symbol.

28 Claims, 19 Drawing Sheets

(56) References Cited

OTHER PUBLICATIONS

Moderator (CATT): "Summary #3 of Subband Non-overlapping Full Duplex", 3GPP TSG RAN WG1 #111, R1-2212735, 3GPP Draft, Type Discussion, FS_NR_DUPLEX_EVO, 3rd Generation Partnership Project (3GPP), Mobile Competence Centre, 650, Route Des Lucioles, F-06921 Sophia-antipolis Cedex, France, vol. 3GPP Ran 1, No. Toulouse, FR, Nov. 14, 2022-Nov. 18, 2022, Nov. 21, 2022, 116 Pages, XP052223282, The Whole Document.

NEC: "Discussion on Subband Non-overlapping Full Duplex", 3GPP TSG-RAN1 #112-bis-e, R1-2302746, 3GPP Draft, Type Discussion, FS_NR_DUPLEX_EVO, 3rd Generation Partnership Project (3GPP), Mobile Competence Centre, 650, Route Des Lucioles, F-06921 Sophia-antipolis Cedex, France, vol. 3GPP Ran 1, No. Online, Apr. 17, 2023-Apr. 26, 2023, Apr. 6, 2023, 26 Pages, XP052293322, Section 2.4.

* cited by examiner

SCHEDULING DURING SLOTS WITH SUB-BAND FULL-DUPLEX RESOURCES

CROSS REFERENCE

The present application for patent claims the benefit of U.S. Provisional Patent Application No. 63/494,988 by ZHANG et al., entitled "SCHEDULING DURING SLOTS WITH SUB-BAND FULL-DUPLEX RESOURCES," filed Apr. 7, 2023, assigned to the assignee hereof, and expressly incorporated by reference herein.

FIELD OF TECHNOLOGY

The following relates to wireless communication, including scheduling during slots with sub-band full-duplex resources.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some devices of a wireless communications system may operate in accordance with half-duplex constraints, meaning that the devices may not be able to transmit and receive simultaneously. A wireless communications system may support full-duplex devices, which may support transmission and reception simultaneously. For example, a network entity may be configured to transmit to a first user equipment (UE) and receive from a second UE over the same time-domain resources. Full-duplex communications may support improved communication throughput and efficiency but may result in increased interference.

SUMMARY

The described techniques relate to improved methods, systems, devices, and apparatuses that support scheduling during slots with sub-band full-duplex resources. A network entity may transmit, and a user equipment (UE) may receive, control signaling that configures or schedules sub-band full-duplex (SBFD) slots or symbols. The network entity may transmit, and the UE may receive, control signaling that schedules occasions, a resource block group, or a precoding resource block group that may overlap with the SBFD slot or symbols. The UE and the network entity may regulate communications based on application of one or more rules pertaining to communications when a scheduled resource overlaps with a SBFD slot or symbol.

A method for wireless communications at user equipment (UE) is described. The method may include receiving first control signaling that indicates a slot that is allocated for sub-band full duplex communications, where the slot is scheduled to include one or more sub-band full duplex symbols that each include a combination of uplink resources and downlink resources in respective frequency sub-bands, receiving second control signaling that schedules, within the slot or outside the slot, one or more occasions for communication of a specified signal, and regulating communications, during the slot, in accordance with a rule that pertains to scheduled occasions for specified signals that overlap a sub-band full duplex slot.

An apparatus for wireless communications at UE is described. The apparatus may include one or more memories storing processor-executable code and one or more processors coupled with the one or more memories and individually or collectively operable to execute the code to cause the UE to receive first control signaling that indicates a slot that is allocated for sub-band full duplex communications, where the slot is scheduled to include one or more sub-band full duplex symbols that each include a combination of uplink resources and downlink resources in respective frequency sub-bands, receive second control signaling that schedules, within the slot or outside the slot, one or more occasions for communication of a specified signal, and regulate communications, during the slot, in accordance with a rule that pertains to scheduled occasions for specified signals that overlap a sub-band full duplex slot.

Another apparatus for wireless communications at UE is described. The apparatus may include means for receiving first control signaling that indicates a slot that is allocated for sub-band full duplex communications, where the slot is scheduled to include one or more sub-band full duplex symbols that each include a combination of uplink resources and downlink resources in respective frequency sub-bands, means for receiving second control signaling that schedules, within the slot or outside the slot, one or more occasions for communication of a specified signal, and means for regulating communications, during the slot, in accordance with a rule that pertains to scheduled occasions for specified signals that overlap a sub-band full duplex slot.

A non-transitory computer-readable medium storing code for wireless communications at UE is described. The code may include instructions executable by a processor to receive first control signaling that indicates a slot that is allocated for sub-band full duplex communications, where the slot is scheduled to include one or more sub-band full duplex symbols that each include a combination of uplink resources and downlink resources in respective frequency sub-bands, receive second control signaling that schedules, within the slot or outside the slot, one or more occasions for communication of a specified signal, and regulate communications, during the slot, in accordance with a rule that pertains to scheduled occasions for specified signals that overlap a sub-band full duplex slot.

In some examples of the method, apparatuses, and non-transitory computer-readable medium described herein, receiving the second control signaling may include operations, features, means, or instructions for receiving a schedule for the one or more occasions, where the one or more occasions may be scheduled outside of the slot in accordance with the rule, where the rule specifies that the UE may be not expected to communicate the specified signal in the slot that may be allocated for sub-band full duplex communications, where the communications during the slot do not include the specified signal scheduled by the second control signaling.

In some examples of the method, apparatuses, and non-transitory computer-readable medium described herein, regulating the communications may include operations, features, means, or instructions for communicating, in a first communication direction and in accordance with the rule, the specified signal during the one or more occasions that overlap with the slot such that the slot may be treated as a downlink, uplink, or flexible slot based on the first communication direction.

In some examples of the method, apparatuses, and non-transitory computer-readable medium described herein, regulating the communications may include operations, features, means, or instructions for communicating, in a first communication direction and in accordance with the rule, the specified signal during the one or more occasions that overlap with the slot such that one or more symbols that conflict with the one or more occasions may be converted to downlink, uplink, or flexible symbols based on the first communication direction.

In some examples of the method, apparatuses, and non-transitory computer-readable medium described herein, regulating the communications may include operations, features, means, or instructions for refraining from communicating the specified signal during the one or more occasions in accordance with the rule that specifies that the UE may be to drop occasions for communication of the specified signal that overlaps with the sub-band full duplex slot.

In some examples of the method, apparatuses, and non-transitory computer-readable medium described herein, regulating the communications may include operations, features, means, or instructions for determining that at least a first portion of the one or more occasions overlaps with a second portion of either the uplink resources or the downlink resources that may have a communication direction that may be different from a communication direction of the one or more occasions and refraining from communicating the specified signal during the first portion in accordance with the rule that specifies that the UE may be to drop communication of the specified signal during resource blocks that conflict with resources of a sub-band full duplex slot.

In some examples of the method, apparatuses, and non-transitory computer-readable medium described herein, the specified signal includes a synchronization signal block, a control message in a control resource set, a random access message in a random access channel occasion, a common search space set message, tracking reference signal, or a sounding reference signal.

A method for wireless communications at UE is described. The method may include receiving first control signaling that indicates a sub-band full duplex symbol that includes at least a first communication resource that is associated with a first communication direction and that spans a first frequency sub-band and a second communication resource that is associated with a second communication direction and that spans a second frequency sub-band, receiving second control signaling that allocates a resource block group for communication during the sub-band full duplex symbol, the resource block group including a set of multiple resource blocks and being associated with the first communication direction, where a first portion of the set of multiple resource blocks overlaps with the first frequency sub-band of the first communication resource and a second portion of the set of multiple resource blocks overlaps with a guard band or the second frequency sub-band of the second communication resource, and regulating communications, via the second portion of the set of multiple resource blocks, in accordance with a rule that pertains to communications over resource block group portions that overlap with communication resources having a different communication direction than the first communication direction of the resource block group.

An apparatus for wireless communications at UE is described. The apparatus may include one or more memories storing processor-executable code and one or more processors coupled with the one or more memories and individually or collectively operable to execute the code to cause the UE to receive first control signaling that indicates a sub-band full duplex symbol that includes at least a first communication resource that is associated with a first communication direction and that spans a first frequency sub-band and a second communication resource that is associated with a second communication direction and that spans a second frequency sub-band, receive second control signaling that allocates a resource block group for communication during the sub-band full duplex symbol, the resource block group including a set of multiple resource blocks and being associated with the first communication direction, where a first portion of the set of multiple resource blocks overlaps with the first frequency sub-band of the first communication resource and a second portion of the set of multiple resource blocks overlaps with a guard band or the second frequency sub-band of the second communication resource, and regulate communications, via the second portion of the set of multiple resource blocks, in accordance with a rule that pertains to communications over resource block group portions that overlap with communication resources having a different communication direction than the first communication direction of the resource block group.

Another apparatus for wireless communications at UE is described. The apparatus may include means for receiving first control signaling that indicates a sub-band full duplex symbol that includes at least a first communication resource that is associated with a first communication direction and that spans a first frequency sub-band and a second communication resource that is associated with a second communication direction and that spans a second frequency sub-band, means for receiving second control signaling that allocates a resource block group for communication during the sub-band full duplex symbol, the resource block group including a set of multiple resource blocks and being associated with the first communication direction, where a first portion of the set of multiple resource blocks overlaps with the first frequency sub-band of the first communication resource and a second portion of the set of multiple resource blocks overlaps with a guard band or the second frequency sub-band of the second communication resource, and means for regulating communications, via the second portion of the set of multiple resource blocks, in accordance with a rule that pertains to communications over resource block group portions that overlap with communication resources having a different communication direction than the first communication direction of the resource block group.

A non-transitory computer-readable medium storing code for wireless communications at UE is described. The code may include instructions executable by a processor to receive first control signaling that indicates a sub-band full duplex symbol that includes at least a first communication resource that is associated with a first communication direction and that spans a first frequency sub-band and a second communication resource that is associated with a second communication direction and that spans a second frequency sub-band, receive second control signaling that allocates a resource block group for communication during the sub-band full duplex symbol, the resource block group including a set of multiple resource blocks and being associated with the first communication direction, where a first portion of the set of multiple resource blocks overlaps with the first frequency sub-band of the first communication resource and a second portion of the set of multiple resource blocks overlaps with a guard band or the second frequency sub-band of the second communication resource, and regulate communications, via the second portion of the set of multiple resource blocks, in accordance with a rule that pertains to communications over resource block group portions that overlap with communication resources having a different communication direction than the first communication direction of the resource block group.

In some examples of the method, apparatuses, and non-transitory computer-readable medium described herein, regulating communications may include operations, features, means, or instructions for refraining from using the second portion of the set of multiple resource blocks in accordance with the rule that specifies that the UE may be to drop a reception during resource blocks that overlap with the communication resources having the different communication direction from the first communication direction of the resource block group.

In some examples of the method, apparatuses, and non-transitory computer-readable medium described herein, regulating communications may include operations, features, means, or instructions for using the second portion for communications via the first communication direction or as flexible resources in accordance with the rule.

Some examples of the method, apparatuses, and non-transitory computer-readable medium described herein may further include operations, features, means, or instructions for modifying, based on the rule, the second communication resource to may have the first communication direction or to may have a flexible allocation.

Some examples of the method, apparatuses, and non-transitory computer-readable medium described herein may further include operations, features, means, or instructions for determining whether to use the first portion of the set of multiple resource blocks for communications based on a quantity of the first portion relative to a threshold.

In some examples of the method, apparatuses, and non-transitory computer-readable medium described herein, the threshold may be based on a total quantity of resource blocks in the resource block group.

Some examples of the method, apparatuses, and non-transitory computer-readable medium described herein may further include operations, features, means, or instructions for refraining from using the first portion of the resource block group for communications based on the quantity of the first portion being less than the threshold.

Some examples of the method, apparatuses, and non-transitory computer-readable medium described herein may further include operations, features, means, or instructions for using the first portion based on the quantity of the first portion being greater than the threshold.

Some examples of the method, apparatuses, and non-transitory computer-readable medium described herein may further include operations, features, means, or instructions for refraining from using both the first portion and the second portion of the resource block group for communications based on the rule.

In some examples of the method, apparatuses, and non-transitory computer-readable medium described herein, regulating communications may include operations, features, means, or instructions for determining that the first portion and the second portion may be used for communications and modifying the second communication resource to may have the first communication direction or to may have a flexible allocation.

In some examples of the method, apparatuses, and non-transitory computer-readable medium described herein, the guard band may be positioned between the first communication resource spanning the first frequency sub-band and the second communication resource spanning the second frequency sub-band.

A method for wireless communications at UE is described. The method may include receiving first control signaling that indicates a sub-band full duplex symbol that includes at least a first uplink communication resource that spans a first frequency sub-band and a second downlink communication resource that spans a second frequency sub-band, receiving second control signaling that allocates a precoding resource block group for receiving a physical downlink shared channel transmission, the precoding resource block group including a set of multiple resource blocks, where a first portion of the set of multiple resource blocks overlaps with the first frequency sub-band of the first uplink communication resource, and regulating communications, via the precoding resource block group, in accordance with a rule that pertains to communications over precoding resource block group portions that overlap with uplink communication resources of a sub-band full duplex symbol.

An apparatus for wireless communications at UE is described. The apparatus may include one or more memories storing processor-executable code and one or more processors coupled with the one or more memories and individually or collectively operable to execute the code to cause the UE to receive first control signaling that indicates a sub-band full duplex symbol that includes at least a first uplink communication resource that spans a first frequency sub-band and a second downlink communication resource that spans a second frequency sub-band, receive second control signaling that allocates a precoding resource block group for receiving a physical downlink shared channel transmission, the precoding resource block group including a set of multiple resource blocks, where a first portion of the set of multiple resource blocks overlaps with the first frequency sub-band of the first uplink communication resource, and regulate communications, via the precoding resource block group, in accordance with a rule that pertains to communications over precoding resource block group portions that overlap with uplink communication resources of a sub-band full duplex symbol.

Another apparatus for wireless communications at UE is described. The apparatus may include means for receiving first control signaling that indicates a sub-band full duplex symbol that includes at least a first uplink communication resource that spans a first frequency sub-band and a second downlink communication resource that spans a second frequency sub-band, means for receiving second control signaling that allocates a precoding resource block group for receiving a physical downlink shared channel transmission, the precoding resource block group including a set of multiple resource blocks, where a first portion of the set of multiple resource blocks overlaps with the first frequency sub-band of the first uplink communication resource, and means for regulating communications, via the precoding resource block group, in accordance with a rule that pertains to communications over precoding resource block group portions that overlap with uplink communication resources of a sub-band full duplex symbol.

A non-transitory computer-readable medium storing code for wireless communications at UE is described. The code may include instructions executable by a processor to receive first control signaling that indicates a sub-band full duplex symbol that includes at least a first uplink communication resource that spans a first frequency sub-band and a second downlink communication resource that spans a second frequency sub-band, receive second control signaling that allocates a precoding resource block group for receiving a physical downlink shared channel transmission, the precoding resource block group including a set of multiple resource blocks, where a first portion of the set of multiple resource blocks overlaps with the first frequency sub-band of the first uplink communication resource, and regulate communications, via the precoding resource block group, in accordance with a rule that pertains to communications over precoding resource block group portions that overlap with uplink communication resources of a sub-band full duplex symbol.

In some examples of the method, apparatuses, and non-transitory computer-readable medium described herein, receiving the second control signaling may include operations, features, means, or instructions for receiving a schedule for the precoding resource block group, where the precoding resource block group may be scheduled such that the precoding resource block group does not overlap with a guard band or the first uplink communication resource in accordance with the rule, where the rule specifies that the UE may be not expected to be configured with precoding resource block groups that overlap with an uplink subband and a downlink subband of a bandwidth part.

In some examples of the method, apparatuses, and non-transitory computer-readable medium described herein, a size of the precoding resource block group may be two or four and a quantity of resource blocks in the first portion may be one and a second portion of the set of multiple resource blocks overlaps with a guard band or the second frequency sub-band of the second downlink communication resource.

In some examples of the method, apparatuses, and non-transitory computer-readable medium described herein, regulating the communications may include operations, features, means, or instructions for refraining from monitoring for the physical downlink shared channel transmission during the first portion based on the size and the quantity.

In some examples of the method, apparatuses, and non-transitory computer-readable medium described herein, regulating the communications may include operations, features, means, or instructions for monitoring for the physical downlink shared channel transmission during the first portion based on the size and the quantity.

In some examples of the method, apparatuses, and non-transitory computer-readable medium described herein, regulating the communications in accordance with the rule may include operations, features, means, or instructions for combining, based on the size and the quantity, the first portion with a second precoding resource block group to generate a combined precoding resource block group and monitoring for the physical downlink shared channel transmission in the combined precoding resource block group.

In some examples of the method, apparatuses, and non-transitory computer-readable medium described herein, a size of the precoding resource block group may be four and a quantity of resource blocks in the first portion may be two or three and a second portion of the set of multiple resource blocks overlaps with a guard band or the second frequency sub-band of the second downlink communication resource.

In some examples of the method, apparatuses, and non-transitory computer-readable medium described herein, regulating the communications may include operations, features, means, or instructions for refraining from monitoring for the physical downlink shared channel transmission during the first portion based on the size and the quantity.

In some examples of the method, apparatuses, and non-transitory computer-readable medium described herein, regulating the communications may include operations, features, means, or instructions for monitoring for the physical downlink shared channel transmission during the first portion based on the size and the quantity.

In some examples of the method, apparatuses, and non-transitory computer-readable medium described herein, regulating the communications may include operations, features, means, or instructions for monitoring, based on the size and the quantity, for the physical downlink shared channel transmission during only a sub-portion of resource blocks of the first portion in accordance with the rule.

In some examples of the method, apparatuses, and non-transitory computer-readable medium described herein, regulating the communications may include operations, features, means, or instructions for combining, based on the size and the quantity, the first portion with a second precoding resource block group to generate a combined precoding resource block group and monitoring for the physical downlink shared channel transmission in the combined precoding resource block group.

In some examples of the method, apparatuses, and non-transitory computer-readable medium described herein, the first control signaling indicates the sub-band full duplex symbol that includes the first uplink communication resource, the second downlink communication resource, and a third downlink communication resource that may be non-contiguous with the second downlink communication resource and the second control signaling indicates that the precoding resource block group may be a wideband precoding resource block group.

In some examples of the method, apparatuses, and non-transitory computer-readable medium described herein, receiving the second control signaling may include operations, features, means, or instructions for receiving a schedule for the precoding resource block group that does not overlap with the second downlink communication resource and a third downlink communication resource in accordance with the rule, where the rule specifies that the UE may be not expected to be configured with non-contiguous resource blocks across two downlink subbands for reception of physical downlink shared channel transmissions configured with wideband precoding resource block groups.

In some examples of the method, apparatuses, and non-transitory computer-readable medium described herein, regulating the communications may include operations, features, means, or instructions for monitoring for the physical downlink shared channel transmission in the precoding resource block group and refraining from using the first uplink communication resource for uplink communications in accordance with the rule.

Some examples of the method, apparatuses, and non-transitory computer-readable medium described herein may further include operations, features, means, or instructions for monitoring for the physical downlink shared channel transmission during the second downlink communication resource and the third downlink communication resource using a same precoder in accordance with the rule.

In some examples of the method, apparatuses, and non-transitory computer-readable medium described herein, the UE monitors for the physical downlink shared channel transmission during the second downlink communication resource and the third downlink communication resource based on a capability of the UE in monitoring non-contiguous physical downlink shared channel transmissions with a wideband precoding resource block group.

Some examples of the method, apparatuses, and non-transitory computer-readable medium described herein may further include operations, features, means, or instructions for selecting one of the second downlink communication resource and the third downlink communication resource for monitoring for the physical downlink shared channel transmission, where non-selected resource blocks may be rate-matched with the selected resource.

A method for wireless communications at a network entity is described. The method may include transmitting first control signaling that indicates a slot that is allocated for sub-band full duplex communications, where the slot is scheduled to include one or more sub-band full duplex symbols that each include a combination of uplink resources and downlink resources in respective frequency sub-bands, transmitting second control signaling that schedules, within the slot or outside the slot, one or more occasions for communication of a specified signal, and participating in communications, during the slot, in accordance with a rule that pertains to scheduled occasions for the specified signal that overlaps a sub-band full duplex slot.

An apparatus for wireless communications at a network entity is described. The apparatus may include one or more memories storing processor-executable code and one or more processors coupled with the one or more memories and individually or collectively operable to execute the code to cause the network entity to transmit first control signaling that indicates a slot that is allocated for sub-band full duplex communications, where the slot is scheduled to include one or more sub-band full duplex symbols that each include a combination of uplink resources and downlink resources in respective frequency sub-bands, transmit second control signaling that schedules, within the slot or outside the slot, one or more occasions for communication of a specified signal, and participate in communications, during the slot, in accordance with a rule that pertains to scheduled occasions for the specified signal that overlaps a sub-band full duplex slot.

Another apparatus for wireless communications at a network entity is described. The apparatus may include means for transmitting first control signaling that indicates a slot that is allocated for sub-band full duplex communications, where the slot is scheduled to include one or more sub-band full duplex symbols that each include a combination of uplink resources and downlink resources in respective frequency sub-bands, means for transmitting second control signaling that schedules, within the slot or outside the slot, one or more occasions for communication of a specified signal, and means for participating in communications, during the slot, in accordance with a rule that pertains to scheduled occasions for the specified signal that overlaps a sub-band full duplex slot.

A non-transitory computer-readable medium storing code for wireless communications at a network entity is described. The code may include instructions executable by a processor to transmit first control signaling that indicates a slot that is allocated for sub-band full duplex communications, where the slot is scheduled to include one or more sub-band full duplex symbols that each include a combination of uplink resources and downlink resources in respective frequency sub-bands, transmit second control signaling that schedules, within the slot or outside the slot, one or more occasions for communication of a specified signal, and participate in communications, during the slot, in accordance with a rule that pertains to scheduled occasions for the specified signal that overlaps a sub-band full duplex slot.

In some examples of the method, apparatuses, and non-transitory computer-readable medium described herein, transmitting the second control signaling may include operations, features, means, or instructions for transmitting a schedule for the one or more occasions, where the one or more occasions may be scheduled outside of the slot in accordance with the rule, where the rule specifies that a UE may be not expected to communicate the specified signal in the slot that may be allocated for sub-band full duplex communications, where the communications during the slot do not include the specified signal scheduled by the second control signaling.

In some examples of the method, apparatuses, and non-transitory computer-readable medium described herein, participating in the communications may include operations, features, means, or instructions for communicating, in a first communication direction and in accordance with the rule, the specified signal during the one or more occasions that overlap with the slot such that the slot may be treated as a downlink, uplink, or flexible slot based on the first communication direction.

In some examples of the method, apparatuses, and non-transitory computer-readable medium described herein, participating in the communications may include operations, features, means, or instructions for communicating, in a first communication direction and in accordance with the rule, the specified signal during the one or more occasions that overlap with the slot such that one or more symbols that conflict with the one or more occasions may be converted to downlink, uplink, or flexible symbols based on the first communication direction.

In some examples of the method, apparatuses, and non-transitory computer-readable medium described herein, participating in the communications may include operations, features, means, or instructions for refraining from communicating the specified signal during the one or more occasions in accordance with the rule that specifies that a UE may be to drop occasions for communication of the specified signal that overlaps with the sub-band full duplex slot.

In some examples of the method, apparatuses, and non-transitory computer-readable medium described herein, participating in the communications may include operations, features, means, or instructions for determining that at least a first portion of the one or more occasions overlap with a second portion of either the uplink resources or the downlink resources that may have a communication direction that may be different from a communication direction of the one or more occasions and refraining from communicating the specified signal during the first portion in accordance with the rule that specifies that a UE may be to drop transmission of the specified signal during resource blocks that conflict with resources of a sub-band full duplex slot.

In some examples of the method, apparatuses, and non-transitory computer-readable medium described herein, the specified signal includes a synchronization signal block, a control message in a control resource set, a random access message in a random access channel occasion, a common search space set message, tracking reference signal, or a sounding reference signal.

A method for wireless communications at a network entity is described. The method may include transmitting first control signaling that indicates a sub-band full duplex symbol that includes at least a first communication resource that is associated with a first communication direction and that spans a first frequency sub-band and a second communication resource that is associated with a second communication direction and that spans a second frequency sub-band, transmitting second control signaling that allocates a resource block group for communication during the sub-band full duplex symbol, the resource block group including a set of multiple resource blocks and being associated with the first communication direction, where a first portion of the set of multiple resource blocks overlaps with the first frequency sub-band of the first communication resource and a second portion of the set of multiple resource blocks overlaps with a guard band or the second frequency sub-band of the second communication resource, and participating in communications, via the second portion of the set of multiple resource blocks, in accordance with a rule that pertains to communications over resource block group portions that overlap with communication resources having a different communication direction than the first communication direction of the resource block group.

An apparatus for wireless communications at a network entity is described. The apparatus may include one or more memories storing processor-executable code and one or more processors coupled with the one or more memories and individually or collectively operable to execute the code to cause the network entity to transmit first control signaling that indicates a sub-band full duplex symbol that includes at least a first communication resource that is associated with a first communication direction and that spans a first frequency sub-band and a second communication resource that is associated with a second communication direction and that spans a second frequency sub-band, transmit second control signaling that allocates a resource block group for communication during the sub-band full duplex symbol, the resource block group including a set of multiple resource blocks and being associated with the first communication direction, where a first portion of the set of multiple resource blocks overlaps with the first frequency sub-band of the first communication resource and a second portion of the set of multiple resource blocks overlaps with a guard band or the second frequency sub-band of the second communication resource, and participate in communications, via the second portion of the set of multiple resource blocks, in accordance with a rule that pertains to communications over resource block group portions that overlap with communication resources having a different communication direction than the first communication direction of the resource block group.

Another apparatus for wireless communications at a network entity is described. The apparatus may include means for transmitting first control signaling that indicates a sub-band full duplex symbol that includes at least a first communication resource that is associated with a first communication direction and that spans a first frequency sub-band and a second communication resource that is associated with a second communication direction and that spans a second frequency sub-band, means for transmitting second control signaling that allocates a resource block group for communication during the sub-band full duplex symbol, the resource block group including a set of multiple resource blocks and being associated with the first communication direction, where a first portion of the set of multiple resource blocks overlaps with the first frequency sub-band of the first communication resource and a second portion of the set of multiple resource blocks overlaps with a guard band or the second frequency sub-band of the second communication resource, and means for participating in communications, via the second portion of the set of multiple resource blocks, in accordance with a rule that pertains to communications over resource block group portions that overlap with communication resources having a different communication direction than the first communication direction of the resource block group.

A non-transitory computer-readable medium storing code for wireless communications at a network entity is described. The code may include instructions executable by a processor to transmit first control signaling that indicates a sub-band full duplex symbol that includes at least a first communication resource that is associated with a first communication direction and that spans a first frequency sub-band and a second communication resource that is associated with a second communication direction and that spans a second frequency sub-band, transmit second control signaling that allocates a resource block group for communication during the sub-band full duplex symbol, the resource block group including a set of multiple resource blocks and being associated with the first communication direction, where a first portion of the set of multiple resource blocks overlaps with the first frequency sub-band of the first communication resource and a second portion of the set of multiple resource blocks overlaps with a guard band or the second frequency sub-band of the second communication resource, and participate in communications, via the second portion of the set of multiple resource blocks, in accordance with a rule that pertains to communications over resource block group portions that overlap with communication resources having a different communication direction than the first communication direction of the resource block group.

In some examples of the method, apparatuses, and non-transitory computer-readable medium described herein, participating in communications may include operations, features, means, or instructions for refraining from using the second portion of the set of multiple resource blocks in accordance with the rule that specifies that a UE may be to drop a reception during resource blocks that overlap with the communication resources having the different communication direction from the first communication direction of the resource block group.

In some examples of the method, apparatuses, and non-transitory computer-readable medium described herein, participating in communications may include operations, features, means, or instructions for using the second portion for communications via the first communication direction or as flexible resources in accordance with the rule.

Some examples of the method, apparatuses, and non-transitory computer-readable medium described herein may further include operations, features, means, or instructions for modifying, based on the rule, the second communication resource to may have the first communication direction or to may have a flexible allocation.

Some examples of the method, apparatuses, and non-transitory computer-readable medium described herein may further include operations, features, means, or instructions for determining whether to use the first portion of the set of multiple resource blocks for communications based on a quantity of the first portion relative to a threshold.

In some examples of the method, apparatuses, and non-transitory computer-readable medium described herein, the threshold may be based on a total quantity of resource blocks in the resource block group.

Some examples of the method, apparatuses, and non-transitory computer-readable medium described herein may further include operations, features, means, or instructions for refraining from using the first portion of the resource block group for communications based on the quantity of the first portion being less than the threshold.

Some examples of the method, apparatuses, and non-transitory computer-readable medium described herein may further include operations, features, means, or instructions for using the first portion based on the quantity of the first portion being greater than the threshold.

Some examples of the method, apparatuses, and non-transitory computer-readable medium described herein may further include operations, features, means, or instructions for refraining from using both the first portion and the second portion of the resource block group for communications based on the rule.

In some examples of the method, apparatuses, and non-transitory computer-readable medium described herein, participating in communications may include operations, features, means, or instructions for determining that the first portion and the second portion may be used for communications and modifying the second communication resource to may have the first communication direction or to may have a flexible allocation.

In some examples of the method, apparatuses, and non-transitory computer-readable medium described herein, the guard band may be positioned between the first communication resource spanning the first frequency sub-band and the second communication resource spanning the second frequency sub-band.

A method for wireless communications at a network entity is described. The method may include transmitting first control signaling that indicates a sub-band full duplex symbol that includes at least a first uplink communication resource that spans a first frequency sub-band and a second downlink communication resource that spans a second frequency sub-band, transmitting second control signaling that allocates a precoding resource block group for receiving a physical downlink shared channel transmission, the precoding resource block group including a set of multiple resource blocks, where a first portion of the set of multiple resource blocks overlaps with the first frequency sub-band of the first uplink communication resource, and participating in communications, via precoding resource block group, in accordance with a rule that pertains to communications over precoding resource block group portions that overlap with uplink communication resources of a sub-band full duplex symbol.

An apparatus for wireless communications at a network entity is described. The apparatus may include one or more memories storing processor-executable code and one or more processors coupled with the one or more memories and individually or collectively operable to execute the code to cause the network entity to transmit first control signaling that indicates a sub-band full duplex symbol that includes at least a first uplink communication resource that spans a first frequency sub-band and a second downlink communication resource that spans a second frequency sub-band, transmit second control signaling that allocates a precoding resource block group for receiving a physical downlink shared channel transmission, the precoding resource block group including a set of multiple resource blocks, where a first portion of the set of multiple resource blocks overlaps with the first frequency sub-band of the first uplink communication resource, and participate in communications, via precoding resource block group, in accordance with a rule that pertains to communications over precoding resource block group portions that overlap with uplink communication resources of a sub-band full duplex symbol.

Another apparatus for wireless communications at a network entity is described. The apparatus may include means for transmitting first control signaling that indicates a sub-band full duplex symbol that includes at least a first uplink communication resource that spans a first frequency sub-band and a second downlink communication resource that spans a second frequency sub-band, means for transmitting second control signaling that allocates a precoding resource block group for receiving a physical downlink shared channel transmission, the precoding resource block group including a set of multiple resource blocks, where a first portion of the set of multiple resource blocks overlaps with the first frequency sub-band of the first uplink communication resource, and means for participating in communications, via precoding resource block group, in accordance with a rule that pertains to communications over precoding resource block group portions that overlap with uplink communication resources of a sub-band full duplex symbol.

A non-transitory computer-readable medium storing code for wireless communications at a network entity is described. The code may include instructions executable by a processor to transmit first control signaling that indicates a sub-band full duplex symbol that includes at least a first uplink communication resource that spans a first frequency sub-band and a second downlink communication resource that spans a second frequency sub-band, transmit second control signaling that allocates a precoding resource block group for receiving a physical downlink shared channel transmission, the precoding resource block group including a set of multiple resource blocks, where a first portion of the set of multiple resource blocks overlaps with the first frequency sub-band of the first uplink communication resource, and participate in communications, via precoding resource block group, in accordance with a rule that pertains to communications over precoding resource block group portions that overlap with uplink communication resources of a sub-band full duplex symbol.

In some examples of the method, apparatuses, and non-transitory computer-readable medium described herein, transmitting the second control signaling may include operations, features, means, or instructions for transmitting a schedule for the precoding resource block group, where the precoding resource block group may be scheduled such that the precoding resource block group does not overlap with a guard band or the first uplink communication resource in accordance with the rule, where the rule specifies that a UE may be not expected to be configured with precoding resource block groups that overlap with an uplink subband and a downlink subband of a bandwidth part.

In some examples of the method, apparatuses, and non-transitory computer-readable medium described herein, a size of the precoding resource block group may be two or four and a quantity of resource blocks in the first portion may be one and a second portion of the set of multiple resource blocks overlaps with a guard band or the second frequency sub-band of the second downlink communication resource.

In some examples of the method, apparatuses, and non-transitory computer-readable medium described herein, regulating the communications may include operations, features, means, or instructions for refraining from transmitting the physical downlink shared channel transmission during the first portion based on the size and the quantity.

In some examples of the method, apparatuses, and non-transitory computer-readable medium described herein, regulating the communications may include operations, features, means, or instructions for transmitting the physical downlink shared channel transmission during the first portion based on the size and the quantity.

In some examples of the method, apparatuses, and non-transitory computer-readable medium described herein, regulating the communications in accordance with the rule may include operations, features, means, or instructions for combining, based on the size and the quantity, the first portion with a second precoding resource block group to generate a combined precoding resource block group and transmitting the physical downlink shared channel transmission in the combined precoding resource block group.

In some examples of the method, apparatuses, and non-transitory computer-readable medium described herein, a size of the precoding resource block group may be four and a quantity of resource blocks in the first portion may be two or three and a second portion of the set of multiple resource blocks overlaps with a guard band or the second frequency sub-band of the second downlink communication resource.

In some examples of the method, apparatuses, and non-transitory computer-readable medium described herein, regulating the communications may include operations, features, means, or instructions for refraining from transmitting the physical downlink shared channel transmission during the first portion based on the size and the quantity.

In some examples of the method, apparatuses, and non-transitory computer-readable medium described herein, regulating the communications may include operations, features, means, or instructions for transmitting the physical downlink shared channel transmission during the first portion based on the size and the quantity.

In some examples of the method, apparatuses, and non-transitory computer-readable medium described herein, regulating the communications may include operations, features, means, or instructions for transmitting, based on the size and the quantity, the physical downlink shared channel transmission during only a sub-portion of resource blocks of the first portion in accordance with the rule.

In some examples of the method, apparatuses, and non-transitory computer-readable medium described herein, regulating the communications may include operations, features, means, or instructions for combining, based on the size and the quantity, the first portion with a second precoding resource block group to generate a combined precoding resource block group and transmitting the physical downlink shared channel transmission in the combined precoding resource block group.

In some examples of the method, apparatuses, and non-transitory computer-readable medium described herein, the first control signaling indicates the sub-band full duplex symbol that includes the first uplink communication resource, the second downlink communication resource, and a third downlink communication resource that may be non-contiguous with the second downlink communication resource and the second control signaling indicates that the precoding resource block group may be a wideband precoding resource block group.

In some examples of the method, apparatuses, and non-transitory computer-readable medium described herein, transmitting the second control signaling may include operations, features, means, or instructions for transmitting a schedule for the precoding resource block group that does not overlap with the second downlink communication resource and a third downlink communication resource in accordance with the rule, where the rule specifies that a UE may be not expected to be configured with non-contiguous resource blocks across two downlink subbands for reception of physical downlink shared channel transmissions configured with wideband precoding resource block groups.

In some examples of the method, apparatuses, and non-transitory computer-readable medium described herein, regulating the communications may include operations, features, means, or instructions for transmitting the physical downlink shared channel transmission in the precoding resource block group and refraining from monitoring for uplink communications in the first uplink communication resource in accordance with the rule.

Some examples of the method, apparatuses, and non-transitory computer-readable medium described herein may further include operations, features, means, or instructions for transmitting the physical downlink shared channel transmission during the second downlink communication resource and the third downlink communication resource using a same precoder in accordance with the rule.

Some examples of the method, apparatuses, and non-transitory computer-readable medium described herein may further include operations, features, means, or instructions for selecting one of the second downlink communication resource and the third downlink communication resource for transmitting the physical downlink shared channel transmission, where non-selected resource blocks may be rate-matched with the selected resource.

DETAILED DESCRIPTION

Figure 1:
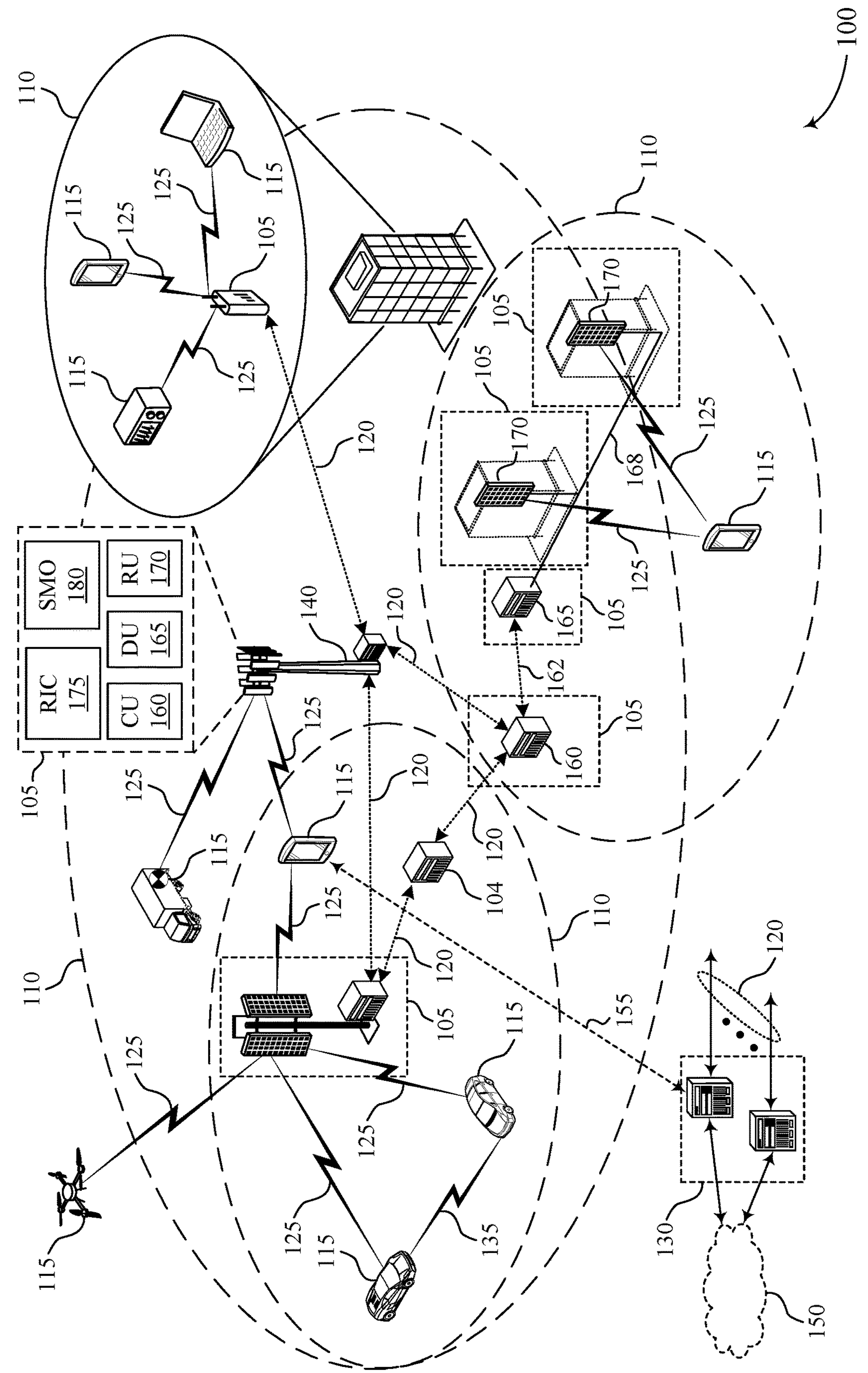
FIG. 1 shows an example of a wireless communications system that supports scheduling during slots with sub-band full-duplex resources in accordance with one or more aspects of the present disclosure.

A wireless communications system may support half-duplex communications, full-duplex communications, or both. For example, a network entity of a wireless communications system may support full-duplex communications, and as such, the network entity may communicate via uplink and downlink resources simultaneously. Accordingly, the network entity may transmit to a first user equipment (UE) using a first resource and receive from a second UE using a second resource, and the first and/second resource may overlap in the time domain within a frequency band or bandwidth part. For example, the network entity and the UE may be configured with sub-band full-duplex (SBFD) slots (e.g., transmission time intervals (TTIs)) or symbols which have separate frequency resources for uplink and downlink communications such as to support simultaneous transmission/reception at the network entity. However, utilization of SBFD resources may result various types of interference, and such interference may be enhanced when UEs are scheduled with communication resources that conflict or overlap with SBFD resources.

Various techniques for addressing communications scheduled in association with SBFD resources are described herein. For example, according to techniques described herein, a UE may receive first control signaling that indicates a slot that includes SBFD resources, and the UE may receive second control signaling that schedules one or more occasions for communication of a specified signal, such as various types of periodic or semi-persistent signals. The UE may apply a rule pertaining to occasions that overlap with SBFD slots to regulate communications within the SBFD slot. For example, the UE may be configured to drop the occasions fully or partially or modify SBFD resource fully or partially.

In accordance with other techniques, the UE may receive first control signaling that includes a symbol with SBFD resources and receive second control signaling that allocates a resource block group (RBG) that overlaps with the SBFD symbol. One or more resource blocks of the resource block group may overlap with resources of the SBFD resources that conflict with the communication direction of the resource block group. For example, the RBG may be configured for uplink communications, but a resource block (RB) of the RBG may overlap with downlink resources of the SBFD symbol. As such, the UE may be configured to apply a rule to handle the resources when such a condition occurs. For example, the UE may drop or not use the RBs that overlap with the conflicting resources, or the UE may adjust or treat the SBFD resources as corresponding to the communication direction of the RBG. In some cases, the UE considers the size of the RBG and/or the quantity of RBs that do not overlap with conflicting resources in determining whether to use or adjust the RBG or convert the SBFD resources.

Another technique proposes a UE applying a rule when the UE is configured with a precodings resource block group (PRG), for receiving a physical downlink shared channel (PDSCH) transmission, that overlaps with a SBFD symbols. In such cases, the UE may drop the non-conflicting RBs, consider the PRG as a partial RBG, resize the quantity of non-conflicting RBs, and/or concatenate the non-conflicting RBs with another PRG. In some cases, the PRG is a wideband PRG that may overlap with SBFD with non-contiguous downlink sub-bands. In such cases, the UE may not use the SBFD resource and/or may monitor for the PDSCH transmission in one or both of the downlink resources, and the technique may depend on the capability of the UE to monitor in non-contiguous downlink sub-bands. In other examples, the UE is not expected to be configured with partial PRGs that overlap with downlink and uplink subbands. These and other techniques are described in further detail with respect to the figures.

Aspects of the disclosure are initially described in the context of wireless communications systems. Aspects of the disclosure are further described with respect to a wireless communications system illustrating SBFD communications, resource diagrams, and a process flow. Aspects of the disclosure are further illustrated by and described with reference to apparatus diagrams, system diagrams, and flowcharts that relate to scheduling during slots with sub-band full-duplex resources.

FIG. 1 shows an example of a wireless communications system 100 that supports scheduling during slots with sub-band full-duplex resources in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support scheduling during slots with sub-band full-duplex resources as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communication system 100 may support half and full-duplex communications. For example, a network entity 105 of the wireless communications system 100 may support full-duplex communications, meaning that the network entity 105 may communicate in the uplink/downlink simultaneously. In some cases, the network entity 105 may transmit to a first UE 115 using a first resource and receive from a second UE 115 using a second resource, and the first and second resource may overlap in the time domain within a frequency band or bandwidth part. In such cases, the UEs 115 may perform half-duplex communications while the network entity 105 performs the full-duplex communications. As such, network entities 105 and UEs 115 may be configured with SBFD slots or symbols, which have separate frequency resources for uplink and downlink communications such as to support simultaneous transmission/reception at the network entity 105. In some cases, a UE 115 or network entity 105 may be configured with resources (e.g., an occasion, RBG, PRG) that overlaps with the SBFD resources. The devices of the wireless communication system 100 may be configured with techniques for handling scenarios when configured resources overlap with the SBFD resource.

Techniques described herein support application of rules for handling scheduling of occasions/communications in conjunction with SBFD slots/symbols. A first proposal is for handling periodic or semi-persistent scheduling occasions (e.g., for communication of specified signals) in relation to SBFD resources. The UE 115 may not expect that these occasions are to be scheduled to overlap with SBFD resources, or the UE 115 may perform various operations if such a scheduling occurs (e.g., drop the occasions fully or partially, modify the SBFD resources fully or partially). A second proposal is for handling resource block groups (RBGs) that overlap with SBFD resources having a same transmission direction (e.g., uplink/downlink) as the RBGs and that overlap with SBFD resources having a different transmission direction as the RBGs. The RBs that overlap with resources having the different direction may be dropped, or the SBFD resources may be adjusted to correspond to the direction of the RBG. In some cases, the technique depends on the amount of RBs that overlap relative to the total quantity of RBs in the RBG. A third proposal is directed to handling precoding resource block groups (PRGs) for PDSCH reception where the PRGs overlap with uplink SBFD resources. In such cases, resources of the PRG may be dropped or adjusted or the SBFD resources may be adjusted.

Figure 2:
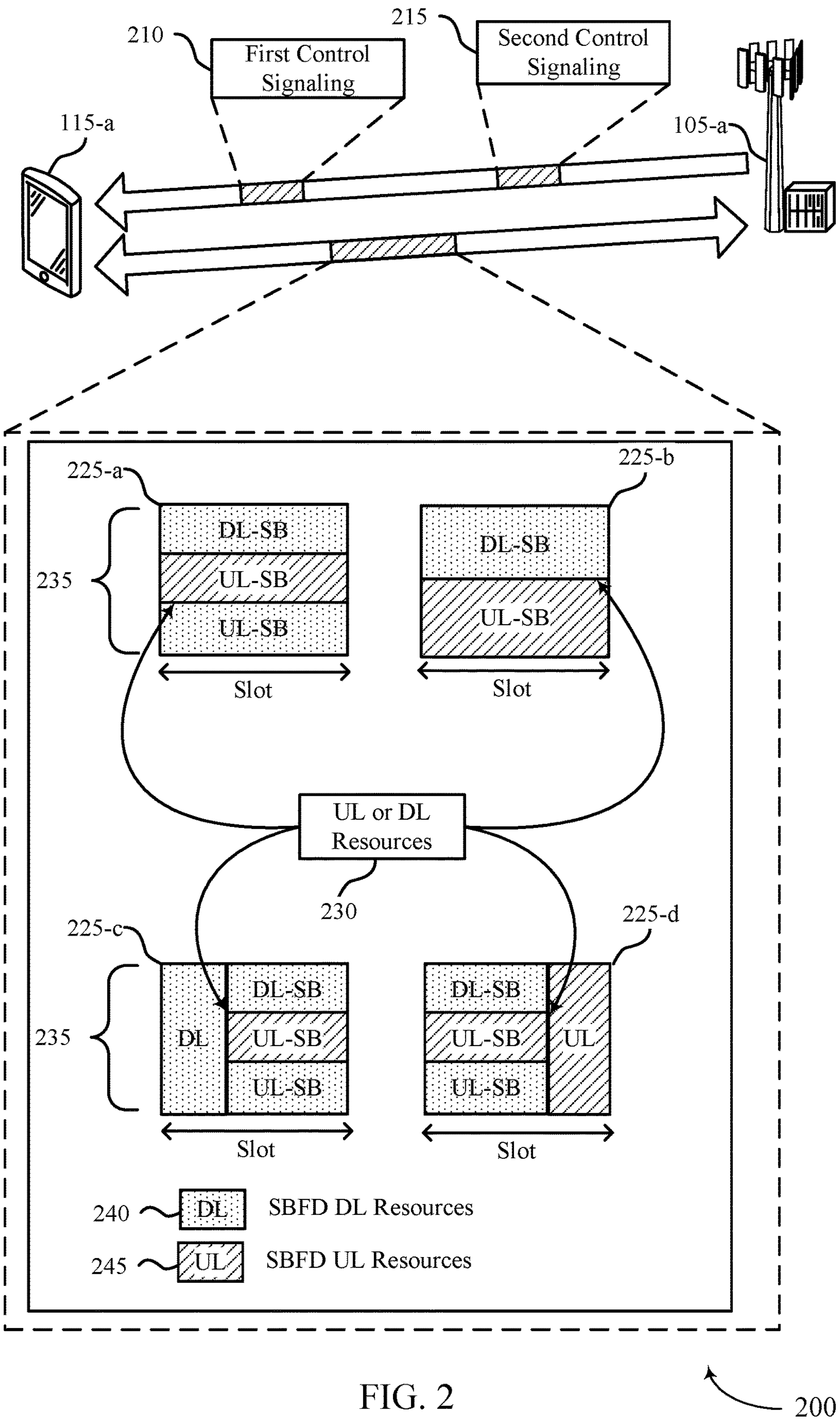
FIG. 2 shows an example of a wireless communications system that supports scheduling during slots with sub-band full-duplex resources in accordance with one or more aspects of the present disclosure.

FIG. 2 shows an example of a wireless communications system 200 that supports scheduling during slots with sub-band full-duplex resources in accordance with one or more aspects of the present disclosure. The wireless communications system 200 may implement or may be implemented by aspects of the wireless communications system 100 of FIG. 1. For example, the wireless communications system 200 includes a UE 115-*a* and a network entity 105-*a*, which may be examples of the corresponding devices as described with respect to FIG. 1.

As described herein, the wireless communications system 200 may support MIMO communications and more particularly half-duplex, full-duplex, or both half-duplex and full-duplex communications. In such cases, the network entity 105-*a* may communicate simultaneously with two different UEs 115. For example, the network entity 105-*a* may transmit downlink communications to a first UE 115 using a first communication resource, and the network entity 105-*a* may simultaneously receive communications from a second UE 115 using a second communication resource. The first communication resource and the second communication resource may overlap in the time domain but may be in different frequency sub-bands. For example, the network entity 105 may utilize a slot 225 for full-duplex communications, and the slots 225 may be example of slots configured with SBFD resources. More particularly the slots may include resources in a bandwidth part 235, and the slot may include downlink resources 240 that span a first frequency sub-band and uplink resources that span a second frequency sub-band of the bandwidth part 235. In some examples, the frequency sub-bands may span the duration of the slot 225, as illustrated in slots 225-*a* and 225-*b*. In other examples, the frequency sub-bands may span a portion of the slot 225, and another portion of the slot may include resources that span the bandwidth part. As illustrated, the slot 225-*a* includes a downlink resource 240 that spans the bandwidth part 235 and the slot 225-*a* includes an uplink resources 245 that spans the bandwidth part 235. Thus, the slots 225-*c* and 225-*d* include both SBFD symbols and non-SBFD symbols. It should be understood that other SBFD slot configurations are contemplated within the scope of the present disclosure. For example, the SBFD slots may include flexible symbols or sub-bands.

SBFD slots may be configured in a time domain duplex carrier or in an intra-band carrier aggregation configuration and may support simultaneous transmission of downlink and uplink signals on a sub-band basis in the same slot. The utilization of such resource configurations may support latency reduction. For example, the SBFD resources may support transmission (e.g., by a UE 115) of uplink signals in an uplink sub-bands that typically may fall in downlink only or flexible slots. Additionally, or alternatively, the SBFD resources may support reception (e.g., by a UE 115) of downlink signals in downlink sub-bands that typically may fall in uplink only slots. As such, these techniques may support latency savings and uplink coverage improvement. Additionally, the SBFD resources may support enhanced system capacity, resource utilization, and spectrum efficiency. Further, the SBFD resources may support flexible and dynamic uplink and downlink resource adaption according to uplink and downlink traffic in a robust manner.

In FIG. 2, the network entity 105-*a* may transmit one or more control messages to the UE 115-*a*. For example, the network entity 105-*a* may transmit first control signaling 210 to the UE 115-*a*, and the first control signaling may indicate SBFD resources, such as one or more slots 225 or one or more SBFD symbols in a slot. The network entity 105-*a* may also transmit second control signaling 215 that schedules resources 230 during or in relation to the SBFD resources. For example, the second control signaling may schedule one or more occasions for transmitting a specified signal, such as a synchronization signal block (SSB), a control message in a control resource set (e.g., CORESET0), a random access message in a random access channel occasion (RO), a common search space set message, tracking reference signal (TRS), or a sounding reference signal (SRS). As such signals may be used for establishing and/or maintaining communications between the UE 115-*a* and the network entity 105-*a*, it may be desirable to perform techniques to reduce interface with such signals and to ensure that such signals are transmitted.

Accordingly, the UE 115-*a* and the network entity 105-*a* may apply a rule for regulating communications in the SBFD slot, and the rule pertains to scheduled occasions for specified signals that overlap a SBFD slot. In one example, the network entity 105-*a* may be configured such that the network entity 105-*a* does not schedule occasions (for transmitting the specified signals) that overlap with SBFD slots. Thus, such occasions may only be scheduled in non-SBFD slots, such as uplink slots, downlink slots, of flexible slots. Accordingly, the rule may specify that a UE 115 is not expected to be configured (or indicated) to receive the SSB, CORESET #0, CSS, or TRS in a slot that is configured as a SBFD slot (e.g., slots 225). Additionally, or alternatively, the rule may specify that a UE 115 is not expected to be configured (or indicated) to transmit the RO or SRS in a slot that is indicated as a SBFD slot (e.g., slots 225).

Alternatively, the scheduled occasions may overlap with a SBFD slot (or the SBFD slot may overlap with the occasion). In cases when the scheduled occasions (for transmitting the specified signals) and the SBFD slot overlap, the UE 115-*a* and the network entity 105-*a* may regulate communications in the slot by communicating the specified signal during the one or more occasions that overlap with the slot. In such cases, the SBFD slot (e.g., slot 225) may be implicitly converted by to a non-SBFD slot, such as a legacy downlink, flexible, or uplink slot, such as to correspond to the communication direction of the scheduled occasion. For example, the UE 115-*a* may receive the downlink signal, and any uplink signal or channel configured or scheduled in the uplink sub-band (e.g., uplink resources 245) in the slot may be dropped. Alternatively, the UE 115-*a* may transmit the uplink signal, and any downlink signal or channel configured or scheduled in the downlink sub-band (e.g., the downlink resources 240) in the slot may be dropped. Thus, the resources in the SBFD slot that have a communication direction (as scheduled by the first control signaling 210) that is different from the scheduled occasion (as scheduled by the second control signaling 215) may be treated by the UE 115-*a* and the network entity 105-*a* as having a different direction.

In some cases, instead of the entire slot being converted to a legacy slot, only the symbols that conflict with the scheduled occasions may be converted to non-SBFD symbols in accordance with the rule. As such, the UE 115-*a* and the network entity 105-*a* may communicate the specified signal in the one or more occasions, and the SBFD symbols that overlap with (and include conflicting SBFD resources) may be configured to non-SBFD symbols, such as uplink, downlink, or flexible symbols. For example, the UE 115-*a* receives a downlink signal (specified signal) in the one or more occasions and any uplink signal in the OFDM symbols (no SBFD operations in these symbols by the network entity 105-*a*) or uplink channel configured or scheduled in the uplink sub-band in the slot is dropped. The remaining symbols that do not overlap may be used for SBFD operations by the network entity 105-*a*. In another example, the UE 115-*a* transmits the uplink signal (specified signal) in the one or more occasions and any downlink signal in the OFDM symbols or channel configured or scheduled in the downlink sub-band of the SBFD slot is dropped. The remaining symbols may be used for SBFD operation by the network entity 105-*a*.

Another rule may specify that the network entity 105-*a* and/or the UE 115-*a* is to drop (e.g., not use according to the scheduling) occasions for communication of the specified signal when the occasions are scheduled to overlap with a SBFD slot. In such cases, the slot may be used for SBFD operation as scheduled by the first control signaling 210. Alternatively, instead of fully dropping the occasion, the rule may specify that the network entity 105-*a* and/or the UE 115 is to partially drop the overlapping occasion. That is, when an occasion has a direction that conflicts with the SBFD resources (e.g., the SSB overlaps with an uplink sub-band), the occasion is partially dropped (e.g., the RBs that conflict with the sub-band are not used). Accordingly, the UE 115-*a* and/or the network entity 105-*a* may apply one or more of various rules for handling occasions (for communication of a specified signal) that are scheduled to overlap with a SBFD slot.

As described in further detail herein, instead of the resources 230 being one or more occasions for communication of a specified signal, the resources 230 may be a resource block group or a precoding resource block for communication of a PDSCH transmission. The UE 115-*a* may apply various rules for handling scenarios when such resources are scheduled to overlap with SBFD symbols.

Figure 3:
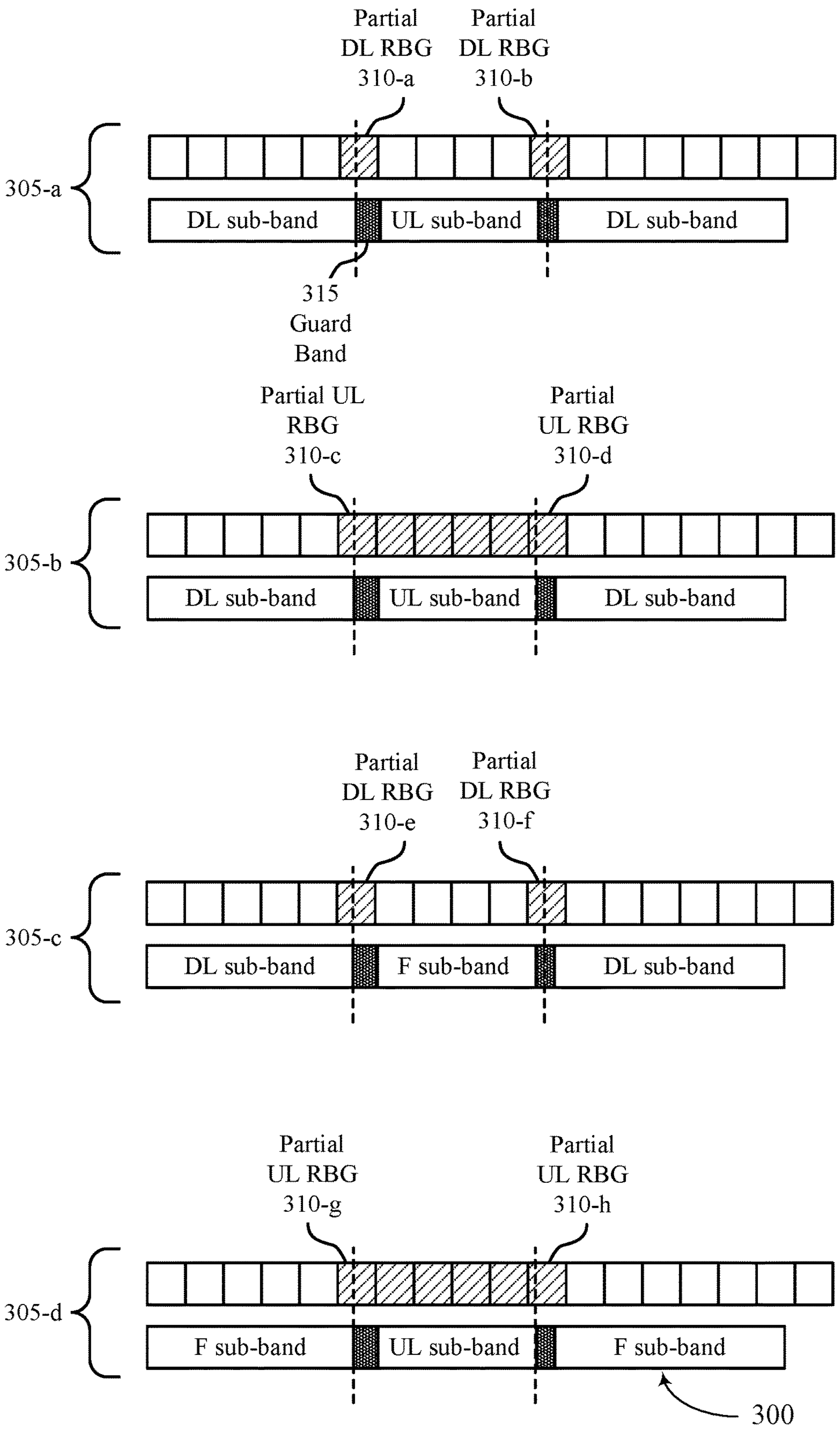
FIG. 3 shows examples of resource diagrams that support scheduling during slots with sub-band full-duplex resources in accordance with one or more aspects of the present disclosure.

FIG. 3 shows examples of resource diagrams 300 that support scheduling during slots with sub-band full-duplex resources in accordance with one or more aspects of the present disclosure. The resource diagrams 300 may be implemented by aspects of wireless communications system 100 of FIG. 1 and by wireless communications system 200 of FIG. 2. For example, the UEs 115 and the network entities 105 described herein may implement aspects of the resource diagrams 300. Aspects of the resource diagrams 300 may support full-duplex operations by the network entities 105 and the UEs 115. For example, some UEs 115 may be "aware" of SBFD operations by the network entities, even if the UEs 115 may not be capable of full-duplex operations. Such UEs 115 may be referred to as "SBFD-aware UEs." For SBFD aware UEs, various options may be available for resource allocation in the frequency-domain in case of unaligned boundaries between a RBG and SBFD sub-bands. For example, the part of the downlink RBG that is inside a downlink sub-band may be used for communications, and part of the uplink RBG inside the uplink sub-band may be used. Alternatively, part of the downlink RBG inside the downlink sub-band cannot be used, and part of the uplink RBG inside the uplink sub-band cannot be used.

Techniques described herein address the part of the RBG that is "outside" a corresponding sub-band, where the outside part of the RBG overlaps with a guard band or a sub-band that has an opposing communication direction than the communication direction of the RBG. For example, the devices (e.g., UEs 115 and network entities 105) may apply a rule to regulate communications via the outside portion of the RBG, and the rule may pertain to communications over RBG portions that overlap with communication resources having a different communication direction than the communication direction of the RBG. According to one example of the rule, the UE 115 may drop RBGs that fall outside the downlink or uplink sub-band (e.g., the sub-band that correspond to the communication direction of the RBG). An example scenario 305-*a* includes a RBG that is configured for downlink communications (e.g., via control signaling). The scenario 305-*a* includes a SBFD slot with a downlink-uplink-downlink (DUD) pattern and guard bands (e.g., a guard band 315) between the uplink and downlink sub-bands, the resource blocks (e.g., the partial RBG 310-*a* and 310-*b*) of the RBG outside the downlink sub-band may be "dropped," meaning that the devices may refrain from using the outside RBs for communications. In an example scenario 305-*b* and according to the rule, the RBG is an uplink RBG that overlaps the uplink sub-band and a portion of the RBG (e.g., partial uplink RBG 310-*c* and partial uplink RBG 310-*d*) may be dropped. The partial downlink RBG 310-*e* and the partial downlink RBG 310-*f* of scenario 305-*c* and the partial uplink RBG 310-*g* and the partial uplink RBG 310-*h* of scenario 305-*d* may be similarly dropped in accordance with the rule.

According to an alternative example of the rule, the devices may use the outside RBs for the communications according to the configured communication direction of the RBG. As such, the conflicting symbols may be treated as (or converted to) legacy symbols such as a downlink symbol (when the RBG has a downlink communication direction), an uplink symbol (when the communication direction has an uplink communication direction), or a flexible symbol. Thus, in scenario 305-*a*, the UE 115-*a* and the network entity 105-*a* may use the portion of the partial RBGs 310-*a* and 310-*b* that overlap with the guard band, the uplink sub-band, or both for uplink communications. Thus, the uplink sub-band resources may be converted to downlink resources.

In some cases, however, the devices may not be able to switch the communication direction. As such, the outside partial RBGs may be used only when the outside sub-band is flexible. Thus, in scenario 305-*c*, the partial downlink RBG 310-*e* and the partial downlink RBG 310-*f* overlap with the flexible sub-band (of the SBFD symbol), and as such, the partial downlink RBG 310-*e* and the partial downlink RBG 310-*f* may be used for the downlink communications (e.g., some or all of the flexible sub-band is used for downlink). Similarly, in scenario 305-*d*, the partial uplink RBG 310-*g* overlaps with the flexible sub-band, and the partial uplink RBG 310-*h* overlaps with the flexible sub-band. Thus, in accordance with the rule, the partial uplink RBG 310-*g* and the partial uplink RBG 310-*h* may be used for the uplink communications. In such cases, the flexible sub-band may be used as an uplink resource.

In some cases, the devices may apply a rule to determine whether the portion of the RBG inside the sub-band of the SBFD symbol is used for communications. More particularly, the rule applied by the devices may indicate whether the devices are to use the portion of the RBG that overlaps with SBFD resources that have a same communication direction as the RBG. For example, the portion of the downlink RBG that overlaps with the downlink sub-band may be used when the quantity of RBs inside the sub-band (e.g., overlapping with the downlink sub-band) is larger than a threshold quantity of resource blocks (e.g., greater than 50% of the size of the RBG). Similarly, the portion of the uplink RBG inside the uplink sub-band may be used when the quantity of RBs inside the uplink sub-band is greater than a threshold quantity of RBs. In the case that the threshold is 50% and the RBG size=16 RBs, then, if the quantity of RBs inside the sub-band is less than 8 RBs, these RBs are not used for communications. In another example, if the quantity of RBs is greater than 8 RBs, then these RBs may be used for communications in accordance with the RBG communication direction.

In some examples, the devices may apply a rule that specifies that if the part of the RBG inside the sub-band (e.g., the portion of the RBG that overlaps with sub-band with the same communication direction as the RBG) cannot be used, then the entire RBG is not used for communications. Thus, in the above examples, if the quantity of RBs inside the sub-band is less than the threshold, then the entire RBG is not used for communications. Accordingly, the rule may specify that when part of the downlink RBG that overlaps with the downlink sub-band of the SBFD symbols is not used, then the other part of the RBG that overlaps with the guard or uplink sub-band is not used for communications. Similarly, the rule may specify that when part of the uplink RBG that overlaps with the uplink sub-band of the SBFD symbols is not used, then the other part of the RBG that overlaps with the guard or downlink sub-band is not used for communications.

In some examples, based on applications of the rules, the entire RBG may be used for communications. In such cases, the devices may apply one or more rules to determine the SBFD operation in the SBFD symbols. For example, when a portion of an uplink RBG inside the uplink sub-band is used, then the other portion of the RBG outside the uplink sub-band may be used only when the SBFD symbol is configured with uplink in a flexible symbol (e.g., the other guard band sub-band is considered flexible and is used for uplink transmission). Similarly, when a portion of a downlink RBG inside the downlink sub-band is used, then the other portion of the RBG outside the downlink sub-band may be used when the SBFD symbol is configured with downlink in a flexible symbol (e.g., the other guard band sub-band is considered flexible and is used for downlink reception). When a portion of a downlink RBG inside the downlink sub-band is used, then the other portion of the RBG outside the downlink sub-band may be used when the SBFD symbol is configured with downlink in a downlink symbol (e.g., the guard band sub-band is converted back to a downlink symbol and is used for downlink reception).

Figure 4:
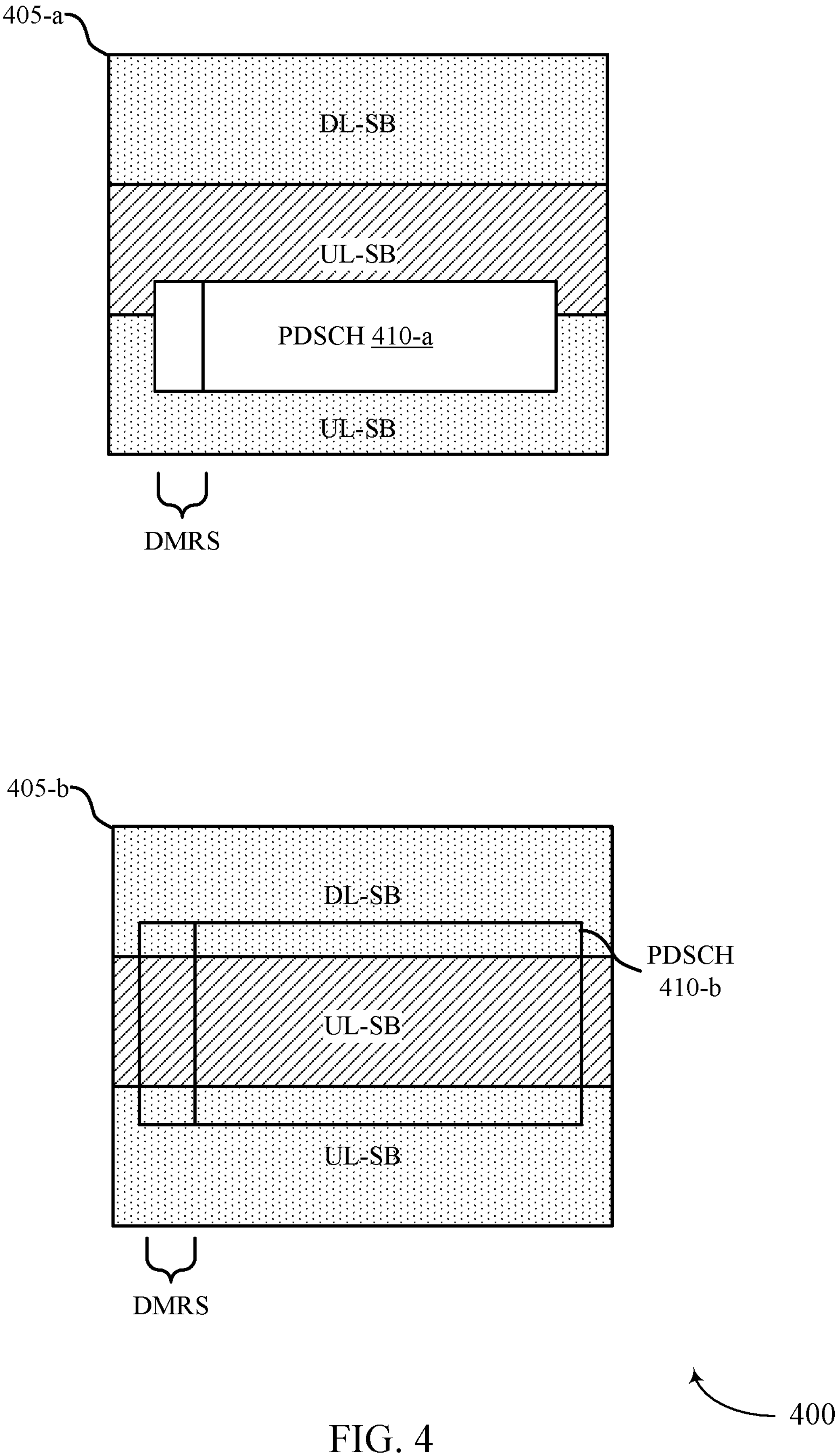
FIG. 4 shows examples of resource diagrams that support scheduling during slots with sub-band full-duplex resources in accordance with one or more aspects of the present disclosure.

FIG. 4 shows examples of resource diagrams 400 that supports scheduling during slots with sub-band full-duplex resources in accordance with one or more aspects of the present disclosure. The resource diagrams 400 may be implemented by aspects of wireless communications system 100 of FIG. 1 and by wireless communications system 200 of FIG. 2. For example, the UEs 115 and the network entities 105 described herein may implement aspects of the resource diagrams 400. Aspects of the resource diagrams 400 may support full-duplex operations by the network entities 105 and the UEs 115.

As described herein, UEs 115 may be referred to as "SBFD-aware." SBFD-aware UEs may be configured with PRGs that are used for receiving PDSCH transmissions. For example, PRGs may be configured with a size of two or four RBs. As illustrated in FIG. 4, the PRGs may be configured such that the PDSCH (e.g., PDSCH 410) may overlap with SBFD slots. The devices may be configured to utilize a wideband precoder for SBFD DMRS channel estimation (e.g., when the DMRS is contiguous). Resource diagram 405-*a* includes a contiguous PRG (e.g., single sub-band scheduling) with wideband demodulation reference signal (DMRS) precoding.

Because partial PRGs or wideband PRGs may overlap with SBFD symbols, the devices may apply a rule to regulate communications in the PRGs. For example, with a PRG with a size of two or four and the remaining RB inside the downlink sub-band (e.g., the downlink RBs overlapping with the downlink sub-band), the devices may perform various operations, depending on the rule. For example, the devices (e.g., the UE) may not be expected to be configured with a partial PRGs in the middle of the BWP (e.g., edge of the DL/UL subbands). That is, the rule may specify that the UE is not expected to be configured with precoding resource block groups that overlap with an uplink subband and a downlink subband of a bandwidth part. In another example, the devices may drop the inside RB without communication of the PDSCH (e.g., the UE does not monitor for or receive the PDSCH in the PRG and the network entity 105 does not transmit the PDSCH in the PRG). Alternatively, the devices may consider the PRG as a partial PRG with one RB and may communicate the PDSCH in the one RB that is inside. Alternatively, the devices may concatenate the RBs with one or more adjacent PRGs and form a new PRG of size three (if the adjacent PRG has a size of two) or of size five (if the adjacent PRG has a size of four).

In the case of the PRG having a size of four and the quantity downlink RBs overlapping with the downlink subband is two or three, the devices may perform one or more different operations, depending on the rule. For example, the devices (e.g., the UE) may not be expected to be configured with a partial PRGs in the middle of the BWP (e.g., edge of the DL/UL subbands). That is, the rule may specify that the UE is not expected to be configured with precoding resource block groups that overlap with an uplink subband and a downlink subband of a bandwidth part. In another example, the devices may drop the two or three RBs without communication or consider the RPG as partial with the two RBs or the three RBs. In some cases, when there are three RBs inside the downlink sub-band, then devices may resize the PRG to two RBs and drop (e.g., not use) the third RB. Alternatively, the devices may concatenate the three RBs with one or more adjacent PRGs and form a new PRG of size six or seven.

As illustrated in resource diagram 405-*b*, if a wideband PRG is configured and the SBFD slot or symbol has non-contiguous downlink sub-bands, then the device may apply a rule to regulate communications in the PRG. In some example applications of the rule, the devices may determine to not utilize the SBFD configuration of the slot or symbol. Alternatively, the utilization of the SBFD resources may depend on the UE capability. For example, if the UE is capable, RBs in a downlink sub-band may be used for reception while using the same precoder on both of the downlink sub-bands. Alternatively, the devices may use one of the downlink sub-bands for communication. For example, the devices may select one of the downlink sub-bands for communicating via the RBs, and the RBs in the other downlink sub-band are rate-matched. In another example of the rule, the UE does not expect to be configured with non-contiguous RBs across two downlink subbands for PDSCH configured with wideband PRG. That is, the UE is not expected to be configured with non-contiguous resource blocks across two downlink subbands for reception of physical downlink shared channel transmissions configured with wideband precoding resource block groups.

Figure 5:
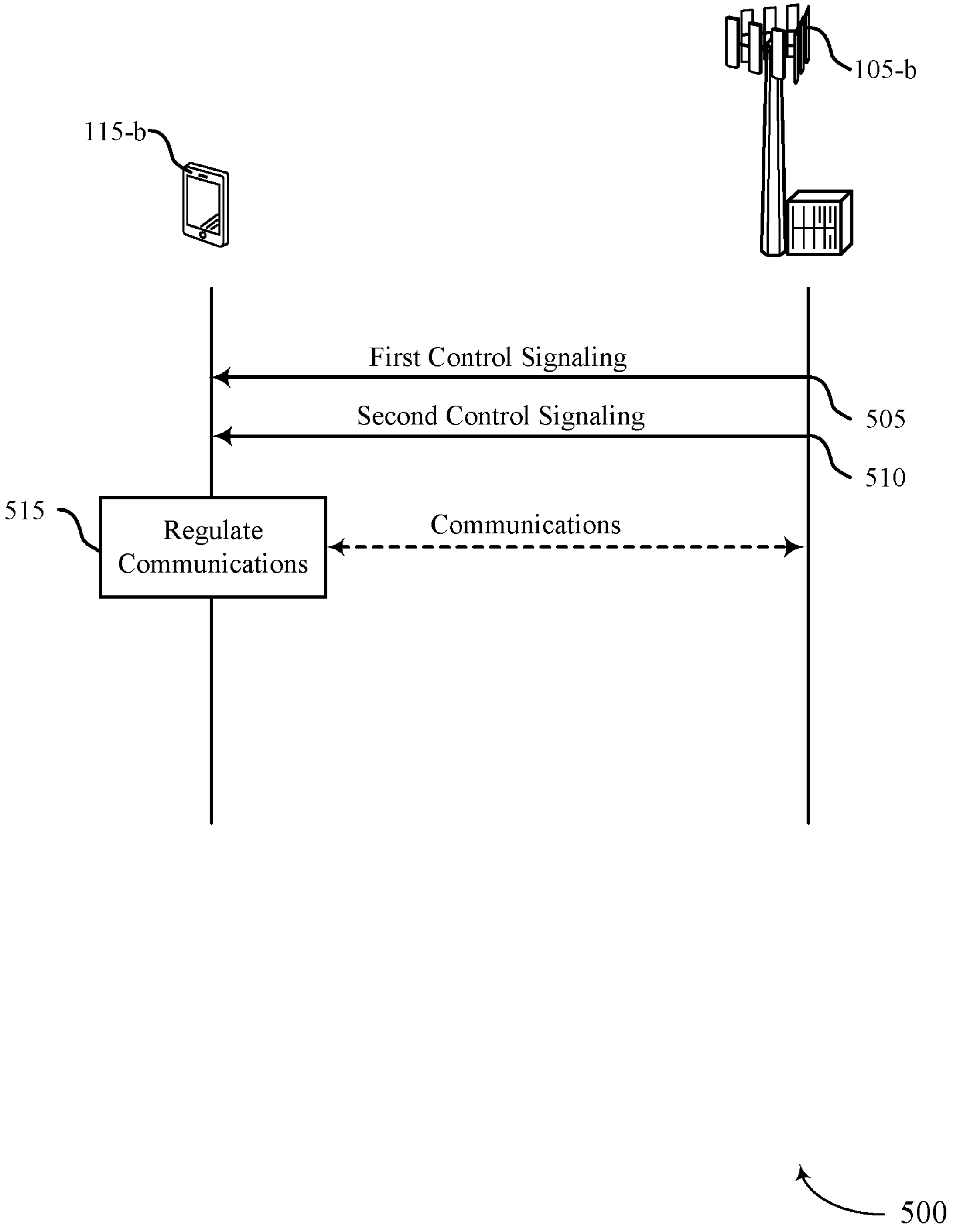
FIG. 5 shows an example of a process flow that supports scheduling during slots with sub-band full-duplex resources in accordance with one or more aspects of the present disclosure.

FIG. 5 shows an example of a process flow 500 that supports scheduling during slots with sub-band full-duplex resources in accordance with one or more aspects of the present disclosure. The process flow 500 may implement aspects of the wireless communications system 100 or may be implemented by aspects of the wireless communications system 100. For example, the process flow 500 includes a UE 115-*b* and a network entity 105-*b*, which may be examples of the corresponding devices as described with respect to FIGS. 1 through 4. In the following description of the process flow 500, the operations between the UE 115-*b* and the network entity 105-*b* may be transmitted in a different order than the example order shown, or the operations performed may be performed in different orders or at different times. Some operations may also be omitted from the process flow 500, and other operations may be added to the process flow 500.

In a first example of the process flow 500, at 505, the network entity 105-*b* may transmit and the UE 115-*b* may receive, first control signaling that indicates a slot that is allocated for sub-band full-duplex communications. The slot may be scheduled to include sub-band full-duplex symbols that each include a combination of uplink resources and downlink resources in respective frequency sub-bands.

At 510, the network entity 105-*b* may transmit, and the UE 115-*b* may receive second control signaling that schedules, within the slot or outside the slot, one or more occasions for communication of a specified signal.

At 515, the UE 115-*b* may regulate, and the network entity 105-*a* may participate in, communications during the slot, in accordance with a rule that pertains to scheduled occasions for specified signals that overlap a sub-band full-duplex slot.

In one example of regulating the communications in accordance with the rule, the second control signaling schedules the one or more occasions outside the slot in accordance with the rule. In such cases, the rule may specify that a UE 115 is not expected to communicate the specified signal in the slot that is allocated for sub-band full-duplex communications. Thus, the communications during the slot do not include the specified signal scheduled by the second control signaling.

In other examples of regulating the communications in accordance with the rule, the second control signaling schedules the one or more occasions to overlap with the slot. In such cases, the UE 115-*a* and the network entity 105-*a* may communicate, in a first communication direction and in accordance with the rule, the specified signal during the one or more occasions that overlap with the slot such that the slot is treated as a downlink, uplink, or flexible slot based on the first communication direction. Alternatively, the UE 115-*a* and the network entity 105-*a* may communicate in a first communication direction and in accordance with the rule, the specified signal during the one or more occasions that overlap with the slot such that one or more symbols that conflict with the one or more occasions are converted to downlink, uplink, or flexible symbols based on the first communication direction.

In other examples of regulating the communications, the UE may refrain from communicating the specified signal during the one or more occasions in accordance with the rule that specifies that the UE is to drop occasions for communication of the specified signal that overlaps with the sub-band full-duplex slot. Instead of dropping the one or more occasions, the UE may drop a portion of the one or more occasions that overlap with resources of the slot that have a different communication direction of the one or more occasions. As such, the UE 115-*b* and the network entity may determine that at least a first portion of the one or more occasions overlaps with a second portion of either the uplink resources or the downlink resources that have a communication direction that is different from a communication direction of the one or more occasions and refrain from communicating the specified signal during the first portion in accordance with the rule. The specified signal may be a synchronization signal block, a control message in a control resource set, a random access message in a random access channel occasion, a common search space set message, tracking reference signal, or a sounding reference signal.

In a second example of the process flow 500, at 505, the network entity 105-*b* may transmit, and the UE 115-*b* may receive, first control signaling that indicates a sub-band full-duplex symbol that includes at least a first communication resource that is associated with a first communication direction and that spans a first frequency sub-band and a second communication resource that is associated with a second communication direction and that spans a second frequency sub-band.

At 510, the network entity 105-*b* may transmit, and the UE 115-*b* may receive, second control signaling that allocates a resource block group for communication during the sub-band full-duplex symbol. The resource block group may include a plurality of resource blocks and may be associated with the first communication direction, and a first portion of the plurality of resource blocks overlaps with the first frequency sub-band of the first communication resource and a second portion of the plurality of resource blocks overlaps with a guard band or the second frequency sub-band of the second communication resource.

At 515, the UE 115-*b* may regulate, and the network entity 105-*a* may participate in communications via the second portion of the plurality of resource blocks in accordance with a rule that pertains to communications over resource block group portions that overlap with communication resources having a different communication direction than the first communication direction of the resource block group.

In some examples, the UE 115-*b* and the network entity 105-*b* may refrain from using the second portion of the plurality of resource blocks in accordance with the rule that specifies that the UE is to drop a reception during resource blocks that overlap with the communication resources having the different communication direction from the first communication direction of the resource block group. In some examples, regulating the communications includes using the second portion for communications via the first communication direction or as flexible resources in accordance with the rule. If the devices determine to use the second portion, then the devices may modify the second communication resource to have the first communication direction or to have a flexible allocation (e.g., modify the resource to have a legacy uplink, downlink, or flexible symbol). In some examples, the UE 115-*b* and the network entity 105-*b* may determine whether to use the first portion of the plurality of resource blocks for communications based at least in part on a quantity of the first portion relative to a threshold, and the threshold may be based on a total quantity of resource blocks in the resource block group.

In a third example of the process flow 500, at 505, the network entity 105-*a* may transmit, and the UE 115-*b* may receive, first control signaling that indicates a sub-band full-duplex symbol that includes at least a first uplink communication resource that spans a first frequency sub-band and a second downlink communication resource that spans a second frequency sub-band.

At 510, the network entity 105-*a* may transmit, and the UE 115-*a* may receive, second control signaling that allocates a precoding resource block group for receiving a physical downlink shared channel transmission. The precoding resource block group may include a plurality of resource blocks, and a first portion of the plurality of resource blocks overlaps with the first frequency sub-band of the first uplink communication resource.

At 515, UE 115-*b* may regulate, and the network entity 105-*a* may participate in, communications via the precoding resource block group, in accordance with a rule that pertains to communications over precoding resource block group portions that overlap with uplink communication resources of a sub-band full-duplex symbol.

For example, the UE may not expect to be configured with partial PRGs in the middle of the BWP (e.g., edge of downlink/uplink subbands). As such, the second control signaling may schedule the PRG such that the PRG does not overlap with uplink subbands). As another example, if the size of the precoding resource block group is two or four and a quantity of resource blocks in the first portion is one, then the UE 115-*b* may refrain from monitoring for, and the network entity may refrain from transmitting, the physical downlink shared channel transmission during the first portion based at least in part on the size and the quantity. In other examples, the UE 115-*b* may monitor for, and the network entity 105-*b* may transmit, the physical downlink shared channel transmission during the first portion based at least in part on the size and the quantity. In other examples, the UE 115-*b* and the network entity may combine, based at least in part on the size and the quantity, the first portion with a second precoding resource block group to generate a combined precoding resource block group and communicate the physical downlink shared channel transmission in the combined precoding resource block group.

If the size of the precoding resource block group is four and a quantity of resource blocks in the first portion is two or three, then the devices may refrain from using the resource block group or use the resource block group for communication of the physical downlink shared transmission in accordance with the rule. In other cases, the devices may use a sub-portion of the first portion for communication of the physical downlink shared channel transmission. That is, the devices may effectively resize the portion that overlaps with the sub-band.

In cases when the first control signaling indicates the sub-band full-duplex symbol that includes non-contiguous downlink sub-bands (e.g., first control signaling indicates the first uplink communication resource, the second downlink communication resource, and a third downlink communication resource that is non-contiguous with the second downlink communication resource) and the second control signaling indicates the precoding resource block group that is a wideband precoding resource block group, then the devices may use the precoding resource block group and refrain from using the uplink resources of the sub-band full-duplex symbol. In other cases, the devices may use both downlink sub-bands for communication of the physical downlink shared channel transmission. In such cases, the first and second downlink communication resource may use a same precoder in accordance with the rule. Using both downlink sub-bands may depend on the capability of the UE in monitoring non-contiguous physical downlink shared channel transmissions with a wideband precoding resource block group. In other cases, the devices may select one of the downlink sub-bands for communicating the physical downlink shared channel transmission. In such cases, the non-selected resource blocks are rate-matched with the selected resource. As another example, the UE does not expect to be configured with non-contiguous RBs across two downlink subbands for PDSCH configured with wideband PRG. As such, the wideband PRG is not scheduled to overlap with two downlink subbands.

Figure 6:
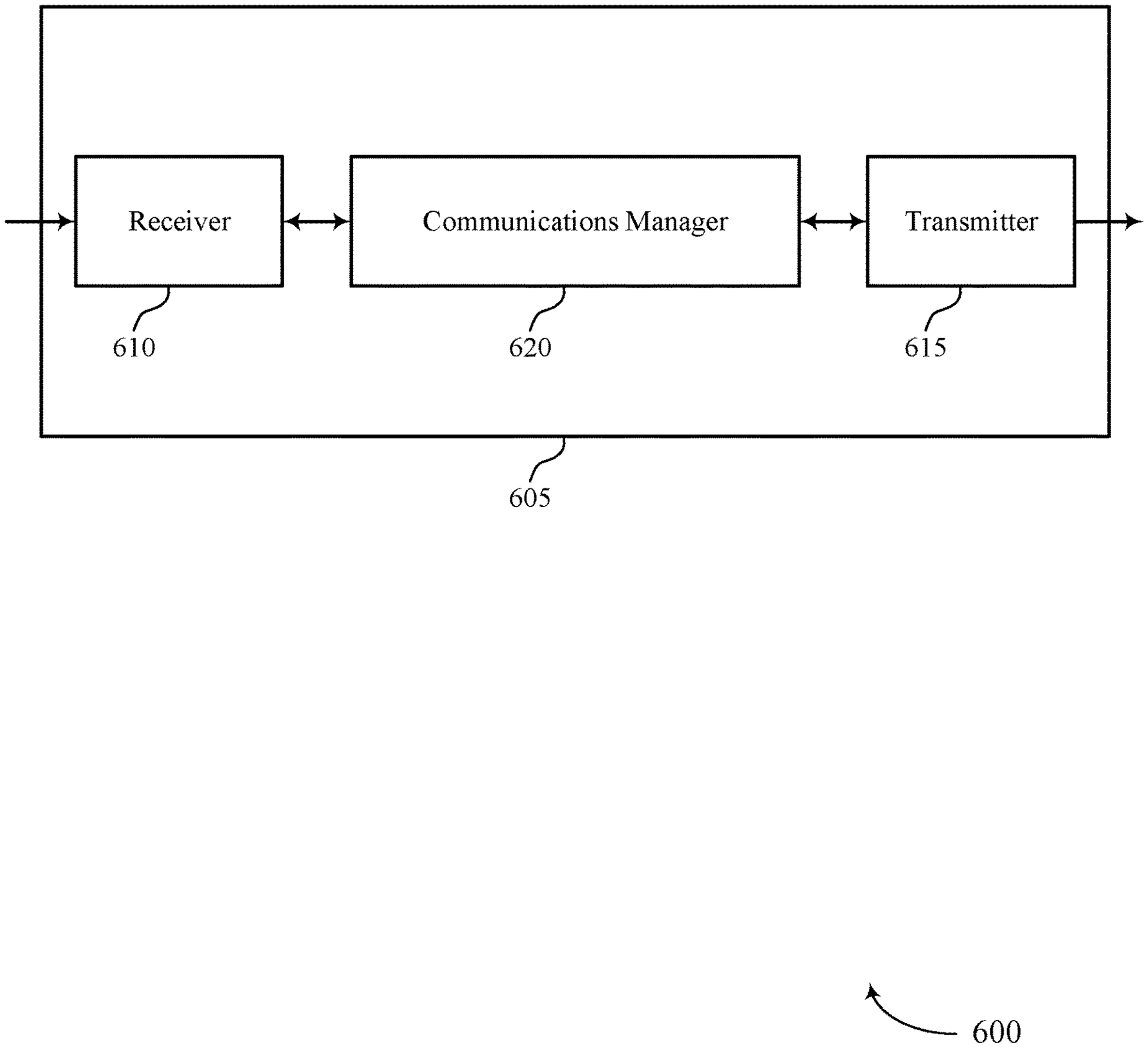
FIGS. 6 and 7 show block diagrams of devices that support scheduling during slots with sub-band full-duplex resources in accordance with one or more aspects of the present disclosure.

FIG. 6 shows a block diagram 600 of a device 605 that supports scheduling during slots with sub-band full-duplex resources in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to scheduling during slots with sub-band full-duplex resources). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to scheduling during slots with sub-band full-duplex resources). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of scheduling during slots with sub-band full-duplex resources as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at UE in accordance with examples as disclosed herein. For example, the communications manager 620 is capable of, configured to, or operable to support a means for receiving first control signaling that indicates a slot that is allocated for sub-band full-duplex communications, where the slot is scheduled to include sub-band full-duplex symbols that each include a combination of uplink resources and downlink resources in respective frequency sub-bands. The communications manager 620 is capable of, configured to, or operable to support a means for receiving second control signaling that schedules, within the slot or outside the slot, one or more occasions for communication of a specified signal. The communications manager 620 is capable of, configured to, or operable to support a means for regulating communications, during the slot, in accordance with a rule that pertains to scheduled occasions for specified signals that overlap a sub-band full-duplex slot.

Additionally, or alternatively, the communications manager 620 may support wireless communications at UE in accordance with examples as disclosed herein. For example, the communications manager 620 is capable of, configured to, or operable to support a means for receiving first control signaling that indicates a sub-band full-duplex symbol that includes at least a first communication resource that is associated with a first communication direction and that spans a first frequency sub-band and a second communication resource that is associated with a second communication direction and that spans a second frequency sub-band. The communications manager 620 is capable of, configured to, or operable to support a means for receiving second control signaling that allocates a resource block group for communication during the sub-band full-duplex symbol, the resource block group including a set of multiple resource blocks and being associated with the first communication direction, where a first portion of the set of multiple resource blocks overlaps with the first frequency sub-band of the first communication resource and a second portion of the set of multiple resource blocks overlaps with a guard band or the second frequency sub-band of the second communication resource. The communications manager 620 is capable of, configured to, or operable to support a means for regulating communications, via the second portion of the set of multiple resource blocks, in accordance with a rule that pertains to communications over resource block group portions that overlap with communication resources having a different communication direction than the first communication direction of the resource block group.

Additionally, or alternatively, the communications manager 620 may support wireless communications at UE in accordance with examples as disclosed herein. For example, the communications manager 620 is capable of, configured to, or operable to support a means for receiving first control signaling that indicates a sub-band full-duplex symbol that includes at least a first uplink communication resource that spans a first frequency sub-band and a second downlink communication resource that spans a second frequency sub-band. The communications manager 620 is capable of, configured to, or operable to support a means for receiving second control signaling that allocates a precoding resource block group for receiving a physical downlink shared channel transmission, the precoding resource block group including a set of multiple resource blocks, where a first portion of the set of multiple resource blocks overlaps with the first frequency sub-band of the first uplink communication resource. The communications manager 620 is capable of, configured to, or operable to support a means for regulating communications, via the precoding resource block group, in accordance with a rule that pertains to communications over precoding resource block group portions that overlap with uplink communication resources of a sub-band full-duplex symbol.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for more efficient utilization of communication resources by supporting full-duplexing operations by devices of a wireless communications system. As such, the techniques may support improved latency and communication efficiency.

Figure 7:
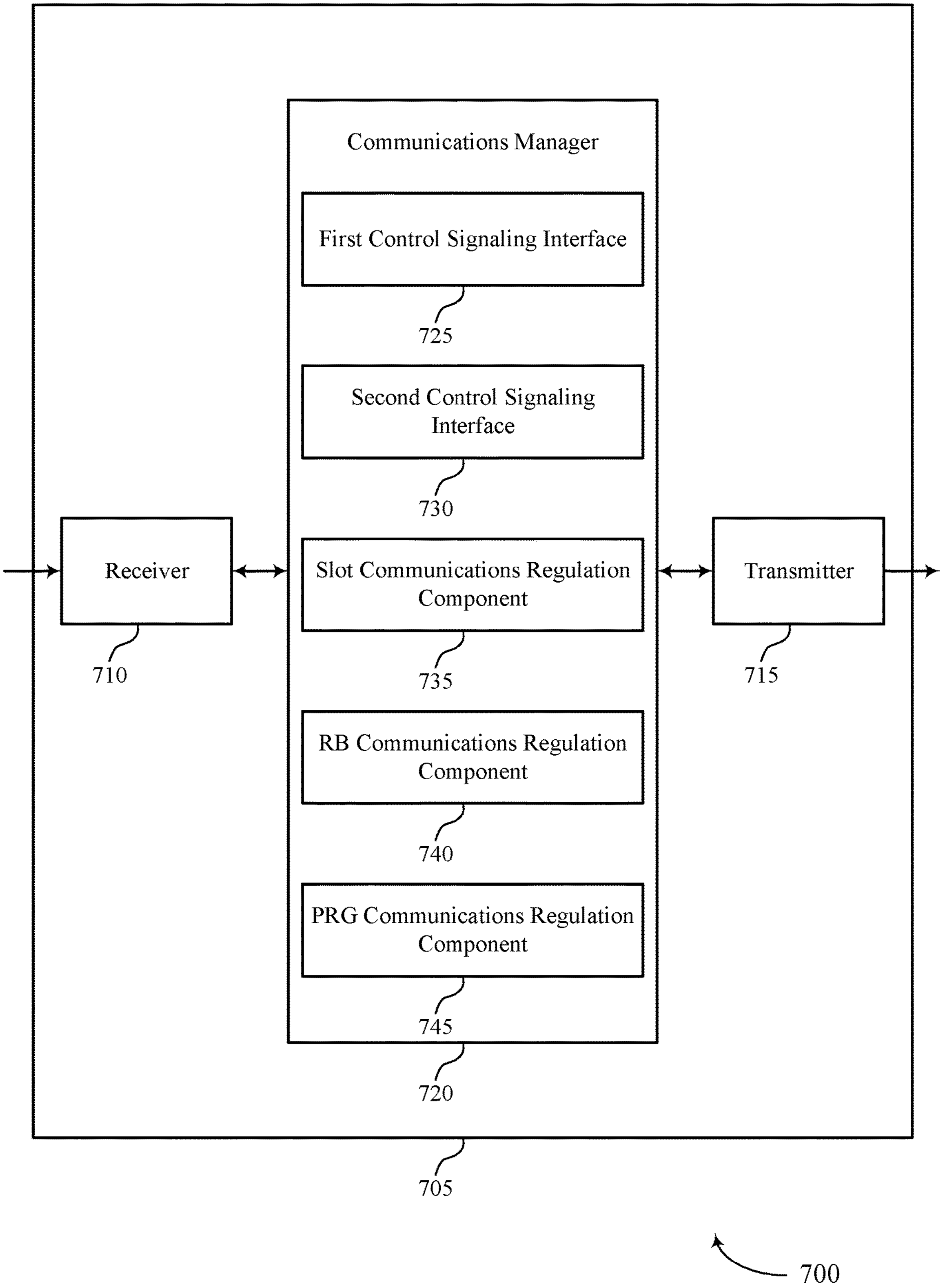

FIG. 7 shows a block diagram 700 of a device 705 that supports scheduling during slots with sub-band full-duplex resources in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to scheduling during slots with sub-band full-duplex resources). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to scheduling during slots with sub-band full-duplex resources). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of scheduling during slots with sub-band full-duplex resources as described herein. For example, the communications manager 720 may include a first control signaling interface 725, a second control signaling interface 730, a slot communications regulation component 735, an RB communications regulation component 740, an PRG communications regulation component 745, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at UE in accordance with examples as disclosed herein. The first control signaling interface 725 is capable of, configured to, or operable to support a means for receiving first control signaling that indicates a slot that is allocated for sub-band full-duplex communications, where the slot is scheduled to include sub-band full-duplex symbols that each include a combination of uplink resources and downlink resources in respective frequency sub-bands. The second control signaling interface 730 is capable of, configured to, or operable to support a means for receiving second control signaling that schedules, within the slot or outside the slot, one or more occasions for communication of a specified signal. The slot communications regulation component 735 is capable of, configured to, or operable to support a means for regulating communications, during the slot, in accordance with a rule that pertains to scheduled occasions for specified signals that overlap a sub-band full-duplex slot.

Additionally, or alternatively, the communications manager 720 may support wireless communications at UE in accordance with examples as disclosed herein. The first control signaling interface 725 is capable of, configured to, or operable to support a means for receiving first control signaling that indicates a sub-band full-duplex symbol that includes at least a first communication resource that is associated with a first communication direction and that spans a first frequency sub-band and a second communication resource that is associated with a second communication direction and that spans a second frequency sub-band. The second control signaling interface 730 is capable of, configured to, or operable to support a means for receiving second control signaling that allocates a resource block group for communication during the sub-band full-duplex symbol, the resource block group including a set of multiple resource blocks and being associated with the first communication direction, where a first portion of the set of multiple resource blocks overlaps with the first frequency sub-band of the first communication resource and a second portion of the set of multiple resource blocks overlaps with a guard band or the second frequency sub-band of the second communication resource. The RB communications regulation component 740 is capable of, configured to, or operable to support a means for regulating communications, via the second portion of the set of multiple resource blocks, in accordance with a rule that pertains to communications over resource block group portions that overlap with communication resources having a different communication direction than the first communication direction of the resource block group.

Additionally, or alternatively, the communications manager 720 may support wireless communications at UE in accordance with examples as disclosed herein. The first control signaling interface 725 is capable of, configured to, or operable to support a means for receiving first control signaling that indicates a sub-band full-duplex symbol that includes at least a first uplink communication resource that spans a first frequency sub-band and a second downlink communication resource that spans a second frequency sub-band. The second control signaling interface 730 is capable of, configured to, or operable to support a means for receiving second control signaling that allocates a precoding resource block group for receiving a physical downlink shared channel transmission, the precoding resource block group including a set of multiple resource blocks, where a first portion of the set of multiple resource blocks overlaps with the first frequency sub-band of the first uplink communication resource. The PRG communications regulation component 745 is capable of, configured to, or operable to support a means for regulating communications, via the precoding resource block group, in accordance with a rule that pertains to communications over precoding resource block group portions that overlap with uplink communication resources of a sub-band full-duplex symbol.

Figure 8:
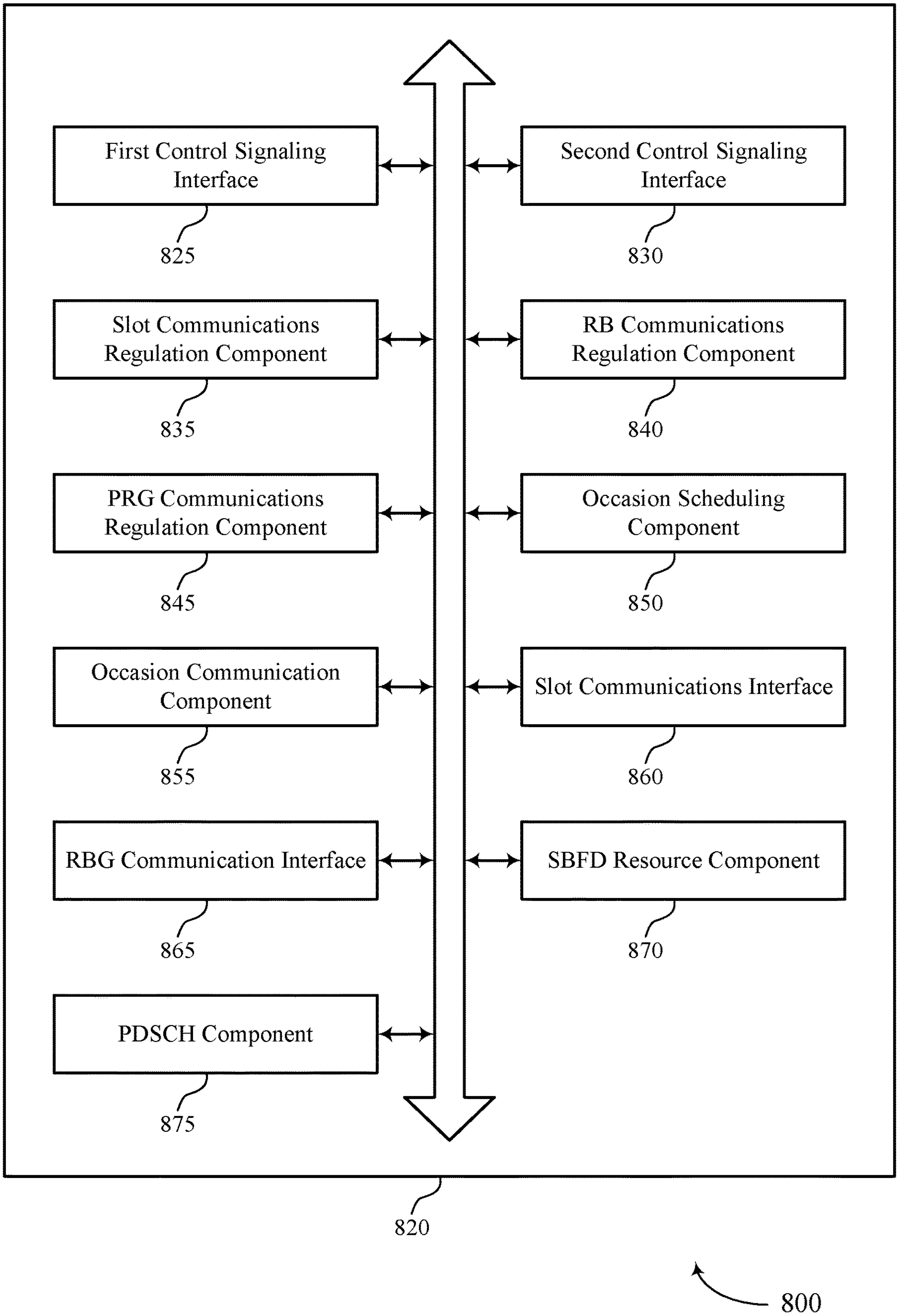
FIG. 8 shows a block diagram of a communications manager that supports scheduling during slots with sub-band full-duplex resources in accordance with one or more aspects of the present disclosure.

FIG. 8 shows a block diagram 800 of a communications manager 820 that supports scheduling during slots with sub-band full-duplex resources in accordance with one or more aspects of the present disclosure. The communications manager 820 may be an example of aspects of a communications manager 620, a communications manager 720, or both, as described herein. The communications manager 820, or various components thereof, may be an example of means for performing various aspects of scheduling during slots with sub-band full-duplex resources as described herein. For example, the communications manager 820 may include a first control signaling interface 825, a second control signaling interface 830, a slot communications regulation component 835, an RB communications regulation component 840, an PRG communications regulation component 845, an occasion scheduling component 850, an occasion communication component 855, a slot communications interface 860, an RBG communication interface 865, an SBFD resource component 870, an PDSCH component 875, or any combination thereof. Each of these components may communicate, directly or indirectly, with one another (e.g., via one or more buses).

The communications manager 820 may support wireless communications at UE in accordance with examples as disclosed herein. The first control signaling interface 825 is capable of, configured to, or operable to support a means for receiving first control signaling that indicates a slot that is allocated for sub-band full-duplex communications, where the slot is scheduled to include sub-band full-duplex symbols that each include a combination of uplink resources and downlink resources in respective frequency sub-bands. The second control signaling interface 830 is capable of, configured to, or operable to support a means for receiving second control signaling that schedules, within the slot or outside the slot, one or more occasions for communication of a specified signal. The slot communications regulation component 835 is capable of, configured to, or operable to support a means for regulating communications, during the slot, in accordance with a rule that pertains to scheduled occasions for specified signals that overlap a sub-band full-duplex slot.

In some examples, to support receiving the second control signaling, the occasion scheduling component 850 is capable of, configured to, or operable to support a means for receiving a schedule for the one or more occasions, where the one or more occasions are scheduled outside of the slot in accordance with the rule, where the rule specifies that the UE is not expected to communicate the specified signal in the slot that is allocated for sub-band full-duplex communications, where the communications during the slot do not include the specified signal scheduled by the second control signaling.

In some examples, to support regulating the communications, the occasion communication component 855 is capable of, configured to, or operable to support a means for communicating, in a first communication direction and in accordance with the rule, the specified signal during the one or more occasions that overlap with the slot such that the slot is treated as a downlink, uplink, or flexible slot based on the first communication direction such that the slot is only available for communications in the first communication direction.

In some examples, to support regulating the communications, the occasion communication component 855 is capable of, configured to, or operable to support a means for communicating, in a first communication direction and in accordance with the rule, the specified signal during the one or more occasions that overlap with the slot such that one or more symbols that conflict with the one or more occasions are converted to downlink, uplink, or flexible symbols based on the first communication direction such that one or more symbols of the slot that overlap with the one or more occasions are only available for communications in the first communication direction.

In some examples, to support regulating the communications, the slot communications interface 860 is capable of, configured to, or operable to support a means for refraining from communicating the specified signal during the one or more occasions in accordance with the rule that specifies that the UE is to drop occasions for communication of the specified signal that overlaps with the sub-band full-duplex slot.

In some examples, to support regulating the communications, the slot communications regulation component 835 is capable of, configured to, or operable to support a means for determining that at least a first portion of the one or more occasions overlaps with a second portion of either the uplink resources or the downlink resources that have a communication direction that is different from a communication direction of the one or more occasions. In some examples, to support regulating the communications, the slot communications regulation component 835 is capable of, configured to, or operable to support a means for refraining from communicating the specified signal during the first portion in accordance with the rule that specifies that the UE is to drop communication of the specified signal during resource blocks that conflict with resources of a sub-band full-duplex slot.

In some examples, the specified signal includes a synchronization signal block, a control message in a control resource set, a random access message in a random access channel occasion, a common search space set message, tracking reference signal, or a sounding reference signal.

Additionally, or alternatively, the communications manager 820 may support wireless communications at UE in accordance with examples as disclosed herein. In some examples, the first control signaling interface 825 is capable of, configured to, or operable to support a means for receiving first control signaling that indicates a sub-band full-duplex symbol that includes at least a first communication resource that is associated with a first communication direction and that spans a first frequency sub-band and a second communication resource that is associated with a second communication direction and that spans a second frequency sub-band. In some examples, the second control signaling interface 830 is capable of, configured to, or operable to support a means for receiving second control signaling that allocates a resource block group for communication during the sub-band full-duplex symbol, the resource block group including a set of multiple resource blocks and being associated with the first communication direction, where a first portion of the set of multiple resource blocks overlaps with the first frequency sub-band of the first communication resource and a second portion of the set of multiple resource blocks overlaps with a guard band or the second frequency sub-band of the second communication resource. The RB communications regulation component 840 is capable of, configured to, or operable to support a means for regulating communications, via the second portion of the set of multiple resource blocks, in accordance with a rule that pertains to communications over resource block group portions that overlap with communication resources having a different communication direction than the first communication direction of the resource block group.

In some examples, to support regulating communications, the RB communications regulation component 840 is capable of, configured to, or operable to support a means for refraining from using the second portion of the set of multiple resource blocks in accordance with the rule that specifies that the UE is to drop a reception during resource blocks that overlap with the communication resources having the different communication direction from the first communication direction of the resource block group.

In some examples, to support regulating communications, the RBG communication interface 865 is capable of, configured to, or operable to support a means for using the second portion for communications via the first communication direction or as flexible resources in accordance with the rule.

In some examples, the SBFD resource component 870 is capable of, configured to, or operable to support a means for modifying, based on the rule, the second communication resource to have the first communication direction or to have a flexible allocation.

In some examples, the RB communications regulation component 840 is capable of, configured to, or operable to support a means for determining whether to use the first portion of the set of multiple resource blocks for communications based on a quantity of the first portion relative to a threshold.

In some examples, the threshold is based on a total quantity of resource blocks in the resource block group.

In some examples, the RB communications regulation component 840 is capable of, configured to, or operable to support a means for refraining from using the first portion of the resource block group for communications based on the quantity of the first portion being less than the threshold.

In some examples, the RB communications regulation component 840 is capable of, configured to, or operable to support a means for using the first portion based on the quantity of the first portion being greater than the threshold.

In some examples, the RB communications regulation component 840 is capable of, configured to, or operable to support a means for refraining from using both the first portion and the second portion of the resource block group for communications based on the rule.

In some examples, to support regulating communications, the RB communications regulation component 840 is capable of, configured to, or operable to support a means for determining that the first portion and the second portion are to be used for communications. In some examples, to support regulating communications, the SBFD resource component 870 is capable of, configured to, or operable to support a means for modifying the second communication resource to have the first communication direction or to have a flexible allocation.

In some examples, the guard band is positioned between the first communication resource spanning the first frequency sub-band and the second communication resource spanning the second frequency sub-band.

Additionally, or alternatively, the communications manager 820 may support wireless communications at UE in accordance with examples as disclosed herein. In some examples, the first control signaling interface 825 is capable of, configured to, or operable to support a means for receiving first control signaling that indicates a sub-band full-duplex symbol that includes at least a first uplink communication resource that spans a first frequency sub-band and a second downlink communication resource that spans a second frequency sub-band. In some examples, the second control signaling interface 830 is capable of, configured to, or operable to support a means for receiving second control signaling that allocates a precoding resource block group for receiving a physical downlink shared channel transmission, the precoding resource block group including a set of multiple resource blocks, where a first portion of the set of multiple resource blocks overlaps with the first frequency sub-band of the first uplink communication resource and a second portion of the set of multiple resource blocks overlaps with a guard band or the second frequency sub-band of the second downlink communication resource. The PRG communications regulation component 845 is capable of, configured to, or operable to support a means for regulating communications, via the precoding resource block group, in accordance with a rule that pertains to communications over precoding resource block group portions that overlap with uplink communication resources of a sub-band full-duplex symbol.

In some examples, a size of the precoding resource block group is two or four and a quantity of resource blocks in the first portion is one.

In some examples, to support regulating the communications, the PRG communications regulation component 845 is capable of, configured to, or operable to support a means for refraining from monitoring for the physical downlink shared channel transmission during the first portion based on the size and the quantity.

In some examples, to support regulating the communications, the PDSCH component 875 is capable of, configured to, or operable to support a means for monitoring for the physical downlink shared channel transmission during the first portion based on the size and the quantity.

In some examples, to support regulating the communications in accordance with the rule, the PRG communications regulation component 845 is capable of, configured to, or operable to support a means for combining, based on the size and the quantity, the first portion with a second precoding resource block group to generate a combined precoding resource block group. In some examples, to support regulating the communications in accordance with the rule, the PDSCH component 875 is capable of, configured to, or operable to support a means for monitoring for the physical downlink shared channel transmission in the combined precoding resource block group.

In some examples, a size of the precoding resource block group is four and a quantity of resource blocks in the first portion is two or three.

In some examples, to support regulating the communications, the PRG communications regulation component 845 is capable of, configured to, or operable to support a means for refraining from monitoring for the physical downlink shared channel transmission during the first portion based on the size and the quantity.

In some examples, to support regulating the communications, the PDSCH component 875 is capable of, configured to, or operable to support a means for monitoring for the physical downlink shared channel transmission during the first portion based on the size and the quantity.

In some examples, to support regulating the communications, the PDSCH component 875 is capable of, configured to, or operable to support a means for monitoring, based on the size and the quantity, for the physical downlink shared channel transmission during only a sub-portion of resource blocks of the first portion in accordance with the rule.

In some examples, to support regulating the communications, the PRG communications regulation component 845 is capable of, configured to, or operable to support a means for combining, based on the size and the quantity, the first portion with a second precoding resource block group to generate a combined precoding resource block group. In some examples, to support regulating the communications, the PDSCH component 875 is capable of, configured to, or operable to support a means for monitoring for the physical downlink shared channel transmission in the combined precoding resource block group.

In some examples, the first control signaling indicates the sub-band full-duplex symbol that includes the first uplink communication resource, the second downlink communication resource, and a third downlink communication resource that is non-contiguous with the second downlink communication resource. In some examples, the second control signaling indicates that the precoding resource block group is a wideband precoding resource block group.

In some examples, to support regulating the communications, the PDSCH component 875 is capable of, configured to, or operable to support a means for monitoring for the physical downlink shared channel transmission in the precoding resource block group. In some examples, to support regulating the communications, the SBFD resource component 870 is capable of, configured to, or operable to support a means for refraining from using the first uplink communication resource for uplink communications in accordance with the rule.

In some examples, the PDSCH component 875 is capable of, configured to, or operable to support a means for monitoring for the physical downlink shared channel transmission during the second downlink communication resource and the third downlink communication resource using a same precoder in accordance with the rule.

In some examples, the UE monitors for the physical downlink shared channel transmission during the second downlink communication resource and the third downlink communication resource based on a capability of the UE in monitoring non-contiguous physical downlink shared channel transmissions with a wideband precoding resource block group.

In some examples, the SBFD resource component 870 is capable of, configured to, or operable to support a means for selecting one of the second downlink communication resource and the third downlink communication resource for monitoring for the physical downlink shared channel transmission, where non-selected resource blocks are rate-matched with the selected resource.

In some examples, to support receiving the second control signaling, the second control signaling interface 830 is capable of, configured to, or operable to support a means for receiving a schedule for the precoding resource block group that does not overlap with the second downlink communication resource and a third downlink communication resource in accordance with the rule, wherein the rule specifies that the UE is not expected to be configured with non-contiguous resource blocks across two downlink subbands for reception of physical downlink shared channel transmissions configured with wideband precoding resource block groups.

In some examples, to support receiving the second control signaling, the second control signaling interface 830 is capable of, configured to, or operable to support a means for receiving a schedule for the precoding resource block group, wherein the precoding resource block group is scheduled such that the precoding resource block does not overlap with a guard band or the first uplink communication resource in accordance with the rule, wherein the rule specifies that the UE is not expected to be configured with precoding resource block groups that overlap with an uplink subband and a downlink subband of a bandwidth part.

Figure 9:
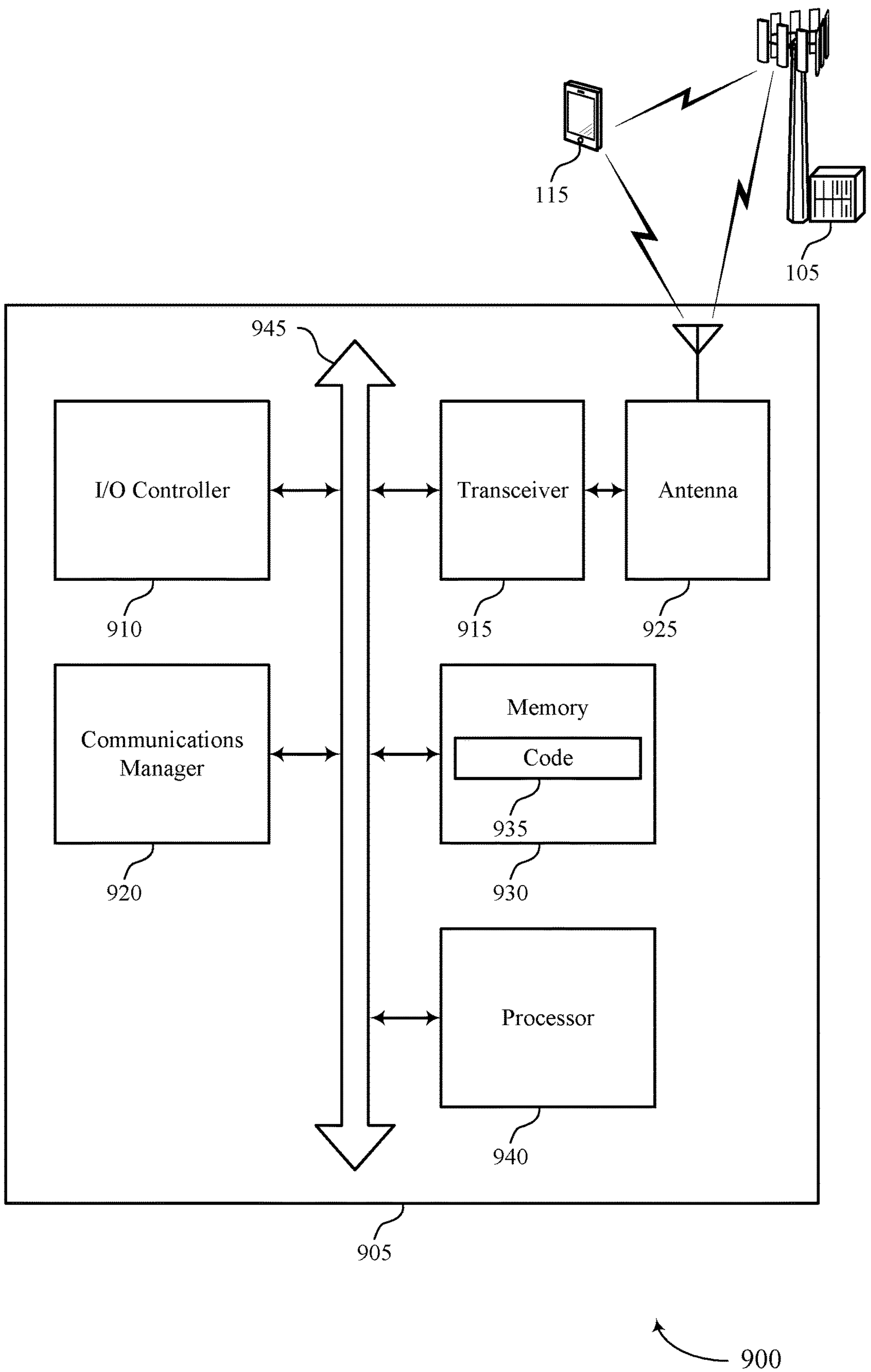
FIG. 9 shows a diagram of a system including a device that supports scheduling during slots with sub-band full-duplex resources in accordance with one or more aspects of the present disclosure.

FIG. 9 shows a diagram of a system 900 including a device 905 that supports scheduling during slots with sub-band full-duplex resources in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting scheduling during slots with sub-band full-duplex resources). For example, the device 905 or a component of the device 905 may include a processor 940 and memory 930 coupled with or to the processor 940, the processor 940 and memory 930 configured to perform various functions described herein.

The communications manager 920 may support wireless communications at UE in accordance with examples as disclosed herein. For example, the communications manager 920 is capable of, configured to, or operable to support a means for receiving first control signaling that indicates a slot that is allocated for sub-band full-duplex communications, where the slot is scheduled to include sub-band full-duplex symbols that each include a combination of uplink resources and downlink resources in respective frequency sub-bands. The communications manager 920 is capable of, configured to, or operable to support a means for receiving second control signaling that schedules, within the slot or outside the slot, one or more occasions for communication of a specified signal. The communications manager 920 is capable of, configured to, or operable to support a means for regulating communications, during the slot, in accordance with a rule that pertains to scheduled occasions for specified signals that overlap a sub-band full-duplex slot.

Additionally, or alternatively, the communications manager 920 may support wireless communications at UE in accordance with examples as disclosed herein. For example, the communications manager 920 is capable of, configured to, or operable to support a means for receiving first control signaling that indicates a sub-band full-duplex symbol that includes at least a first communication resource that is associated with a first communication direction and that spans a first frequency sub-band and a second communication resource that is associated with a second communication direction and that spans a second frequency sub-band. The communications manager 920 is capable of, configured to, or operable to support a means for receiving second control signaling that allocates a resource block group for communication during the sub-band full-duplex symbol, the resource block group including a set of multiple resource blocks and being associated with the first communication direction, where a first portion of the set of multiple resource blocks overlaps with the first frequency sub-band of the first communication resource and a second portion of the set of multiple resource blocks overlaps with a guard band or the second frequency sub-band of the second communication resource. The communications manager 920 is capable of, configured to, or operable to support a means for regulating communications, via the second portion of the set of multiple resource blocks, in accordance with a rule that pertains to communications over resource block group portions that overlap with communication resources having a different communication direction than the first communication direction of the resource block group.

Additionally, or alternatively, the communications manager 920 may support wireless communications at UE in accordance with examples as disclosed herein. For example, the communications manager 920 is capable of, configured to, or operable to support a means for receiving first control signaling that indicates a sub-band full-duplex symbol that includes at least a first uplink communication resource that spans a first frequency sub-band and a second downlink communication resource that spans a second frequency sub-band. The communications manager 920 is capable of, configured to, or operable to support a means for receiving second control signaling that allocates a precoding resource block group for receiving a physical downlink shared channel transmission, the precoding resource block group including a set of multiple resource blocks, where a first portion of the set of multiple resource blocks overlaps with the first frequency sub-band of the first uplink communication resource. The communications manager 920 is capable of, configured to, or operable to support a means for regulating communications, via the precoding resource block group, in accordance with a rule that pertains to communications over precoding resource block group portions that overlap with uplink communication resources of a sub-band full-duplex symbol.

By including or configuring the communications manager 920 in accordance with examples as described herein, the device 905 may support techniques for more efficient utilization of communication resources by supporting full-duplexing operations by devices of a wireless communications system. As such, the techniques may support improved latency and communication efficiency.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of scheduling during slots with sub-band full-duplex resources as described herein, or the processor 940 and the memory 930 may be otherwise configured to perform or support such operations.

Figure 10:
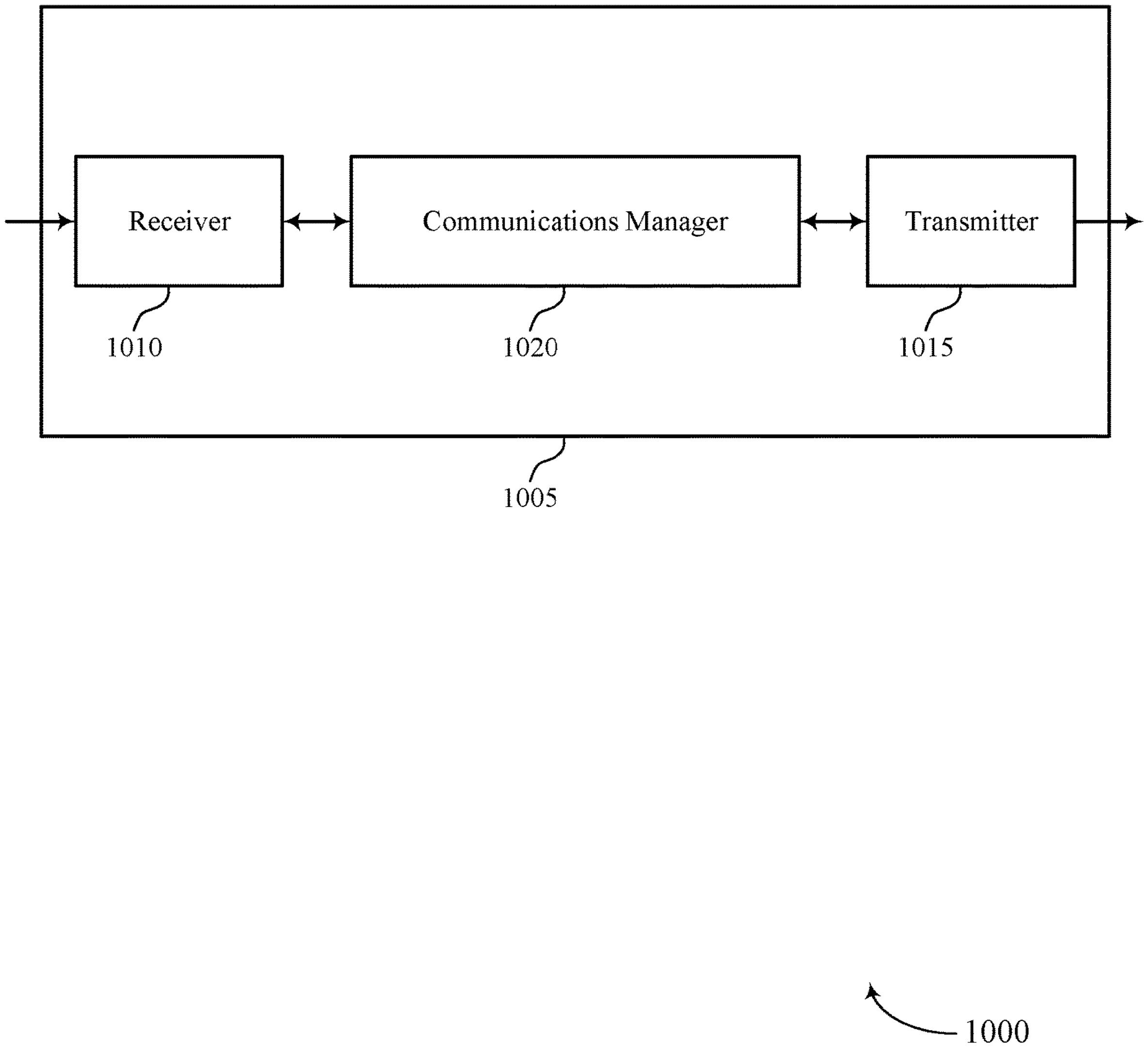
FIGS. 10 and 11 show block diagrams of devices that support scheduling during slots with sub-band full-duplex resources in accordance with one or more aspects of the present disclosure.

FIG. 10 shows a block diagram 1000 of a device 1005 that supports scheduling during slots with sub-band full-duplex resources in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of scheduling during slots with sub-band full-duplex resources as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 is capable of, configured to, or operable to support a means for transmitting first control signaling that indicates a slot that is allocated for sub-band full-duplex communications, where the slot is scheduled to include sub-band full-duplex symbols that each include a combination of uplink resources and downlink resources in respective frequency sub-bands. The communications manager 1020 is capable of, configured to, or operable to support a means for transmitting second control signaling that schedules, within the slot or outside the slot, one or more occasions for communication of a specified signal. The communications manager 1020 is capable of, configured to, or operable to support a means for participating in communications, during the slot, in accordance with a rule that pertains to scheduled occasions for the specified signal that overlaps a sub-band full-duplex slot.

Additionally, or alternatively, the communications manager 1020 may support wireless communications at a network entity in accordance with examples as disclosed herein. For example, the communications manager 1020 is capable of, configured to, or operable to support a means for transmitting first control signaling that indicates a sub-band full-duplex symbol that includes at least a first communication resource that is associated with a first communication direction and that spans a first frequency sub-band and a second communication resource that is associated with a second communication direction and that spans a second frequency sub-band. The communications manager 1020 is capable of, configured to, or operable to support a means for transmitting second control signaling that allocates a resource block group for communication during the sub-band full-duplex symbol, the resource block group including a set of multiple resource blocks and being associated with the first communication direction, where a first portion of the set of multiple resource blocks overlaps with the first frequency sub-band of the first communication resource and a second portion of the set of multiple resource blocks overlaps with a guard band or the second frequency sub-band of the second communication resource. The communications manager 1020 is capable of, configured to, or operable to support a means for participating in communications, via the second portion of the set of multiple resource blocks, in accordance with a rule that pertains to communications over resource block group portions that overlap with communication resources having a different communication direction than the first communication direction of the resource block group.

Additionally, or alternatively, the communications manager 1020 may support wireless communications at a network entity in accordance with examples as disclosed herein. For example, the communications manager 1020 is capable of, configured to, or operable to support a means for transmitting first control signaling that indicates a sub-band full-duplex symbol that includes at least a first uplink communication resource that spans a first frequency sub-band and a second downlink communication resource that spans a second frequency sub-band. The communications manager 1020 is capable of, configured to, or operable to support a means for transmitting second control signaling that allocates a precoding resource block group for receiving a physical downlink shared channel transmission, the precoding resource block group including a set of multiple resource blocks, where a first portion of the set of multiple resource blocks overlaps with the first frequency sub-band of the first uplink communication resource. The communications manager 1020 is capable of, configured to, or operable to support a means for participating in communications, via precoding resource block group, in accordance with a rule that pertains to communications over precoding resource block group portions that overlap with uplink communication resources of a sub-band full-duplex symbol.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for more efficient utilization of communication resources by supporting full-duplexing operations by devices of a wireless communications system. As such, the techniques may support improved latency and communication efficiency.

Figure 11:
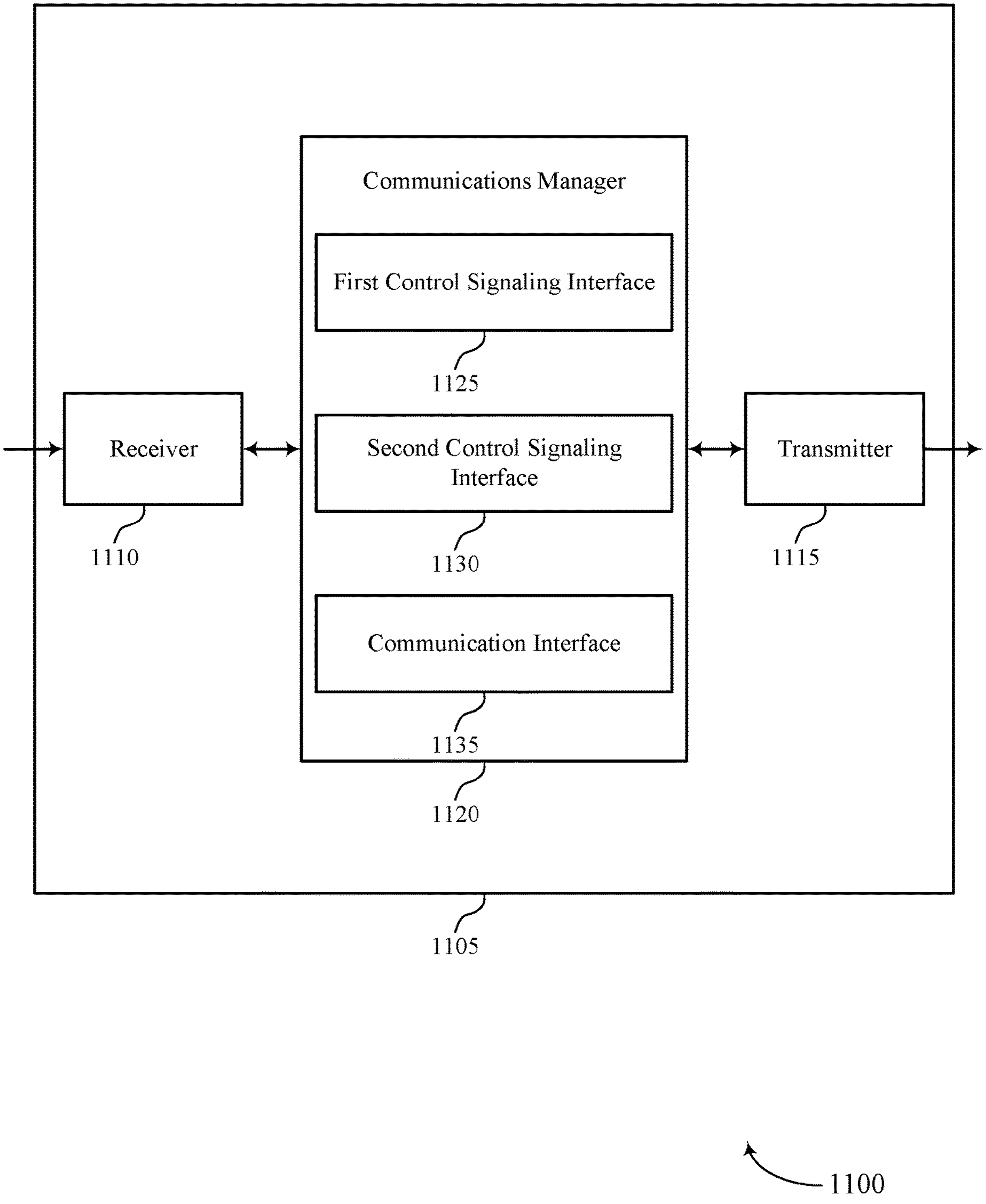

FIG. 11 shows a block diagram 1100 of a device 1105 that supports scheduling during slots with sub-band full-duplex resources in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of scheduling during slots with sub-band full-duplex resources as described herein. For example, the communications manager 1120 may include a first control signaling interface 1125, a second control signaling interface 1130, a communication interface 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The first control signaling interface 1125 is capable of, configured to, or operable to support a means for transmitting first control signaling that indicates a slot that is allocated for sub-band full-duplex communications, where the slot is scheduled to include sub-band full-duplex symbols that each include a combination of uplink resources and downlink resources in respective frequency sub-bands. The second control signaling interface 1130 is capable of, configured to, or operable to support a means for transmitting second control signaling that schedules, within the slot or outside the slot, one or more occasions for communication of a specified signal. The communication interface 1135 is capable of, configured to, or operable to support a means for participating in communications, during the slot, in accordance with a rule that pertains to scheduled occasions for the specified signal that overlaps a sub-band full-duplex slot.

Additionally, or alternatively, the communications manager 1120 may support wireless communications at a network entity in accordance with examples as disclosed herein. The first control signaling interface 1125 is capable of, configured to, or operable to support a means for transmitting first control signaling that indicates a sub-band full-duplex symbol that includes at least a first communication resource that is associated with a first communication direction and that spans a first frequency sub-band and a second communication resource that is associated with a second communication direction and that spans a second frequency sub-band. The second control signaling interface 1130 is capable of, configured to, or operable to support a means for transmitting second control signaling that allocates a resource block group for communication during the sub-band full-duplex symbol, the resource block group including a set of multiple resource blocks and being associated with the first communication direction, where a first portion of the set of multiple resource blocks overlaps with the first frequency sub-band of the first communication resource and a second portion of the set of multiple resource blocks overlaps with a guard band or the second frequency sub-band of the second communication resource. The communication interface 1135 is capable of, configured to, or operable to support a means for participating in communications, via the second portion of the set of multiple resource blocks, in accordance with a rule that pertains to communications over resource block group portions that overlap with communication resources having a different communication direction than the first communication direction of the resource block group.

Additionally, or alternatively, the communications manager 1120 may support wireless communications at a network entity in accordance with examples as disclosed herein. The first control signaling interface 1125 is capable of, configured to, or operable to support a means for transmitting first control signaling that indicates a sub-band full-duplex symbol that includes at least a first uplink communication resource that spans a first frequency sub-band and a second downlink communication resource that spans a second frequency sub-band. The second control signaling interface 1130 is capable of, configured to, or operable to support a means for transmitting second control signaling that allocates a precoding resource block group for receiving a physical downlink shared channel transmission, the precoding resource block group including a set of multiple resource blocks, where a first portion of the set of multiple resource blocks overlaps with the first frequency sub-band of the first uplink communication resource. The communication interface 1135 is capable of, configured to, or operable to support a means for participating in communications, via precoding resource block group, in accordance with a rule that pertains to communications over precoding resource block group portions that overlap with uplink communication resources of a sub-band full-duplex symbol.

Figure 12:
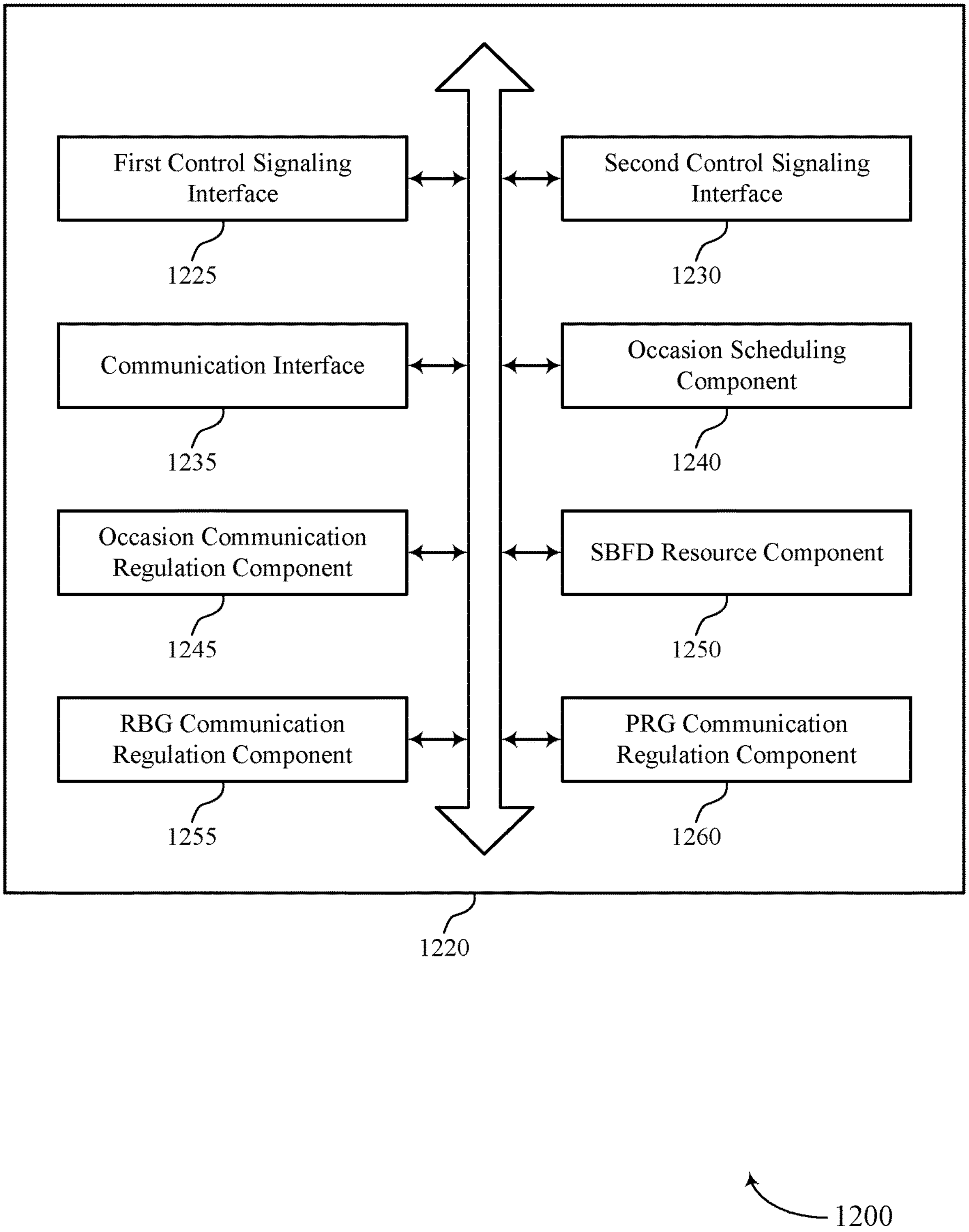
FIG. 12 shows a block diagram of a communications manager that supports scheduling during slots with sub-band full-duplex resources in accordance with one or more aspects of the present disclosure.

FIG. 12 shows a block diagram 1200 of a communications manager 1220 that supports scheduling during slots with sub-band full-duplex resources in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of scheduling during slots with sub-band full-duplex resources as described herein. For example, the communications manager 1220 may include a first control signaling interface 1225, a second control signaling interface 1230, a communication interface 1235, an occasion scheduling component 1240, an occasion communication regulation component 1245, an SBFD resource component 1250, an RBG communication regulation component 1255, an PRG communication regulation component 1260, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The first control signaling interface 1225 is capable of, configured to, or operable to support a means for transmitting first control signaling that indicates a slot that is allocated for sub-band full-duplex communications, where the slot is scheduled to include sub-band full-duplex symbols that each include a combination of uplink resources and downlink resources in respective frequency sub-bands. The second control signaling interface 1230 is capable of, configured to, or operable to support a means for transmitting second control signaling that schedules, within the slot or outside the slot, one or more occasions for communication of a specified signal. The communication interface 1235 is capable of, configured to, or operable to support a means for participating in communications, during the slot, in accordance with a rule that pertains to scheduled occasions for the specified signal that overlaps a sub-band full-duplex slot.

In some examples, to support transmitting the second control signaling, the occasion scheduling component 1240 is capable of, configured to, or operable to support a means for transmitting a schedule for the one or more occasions, where the one or more occasions are scheduled outside of the slot in accordance with the rule, where the rule specifies that a UE is not expected to communicate the specified signal in the slot that is allocated for sub-band full-duplex communications, where the communications during the slot do not include the specified signal scheduled by the second control signaling.

In some examples, to support participating in the communications, the communication interface 1235 is capable of, configured to, or operable to support a means for communicating, in a first communication direction and in accordance with the rule, the specified signal during the one or more occasions that overlap with the slot such that the slot is treated as a downlink, uplink, or flexible slot based on the first communication direction such that the slot is only available for communications in the first communication direction.

In some examples, to support participating in the communications, the communication interface 1235 is capable of, configured to, or operable to support a means for communicating, in a first communication direction and in accordance with the rule, the specified signal during the one or more occasions that overlap with the slot such that one or more symbols that conflict with the one or more occasions are converted to downlink, uplink, or flexible symbols based on the first communication direction such that one or more symbols of the slot that overlap with the one or more occasions are only available for communications in the first communication direction.

In some examples, to support participating in the communications, the occasion communication regulation component 1245 is capable of, configured to, or operable to support a means for refraining from communicating the specified signal during the one or more occasions in accordance with the rule that specifies that a UE is to drop occasions for communication of the specified signal that overlaps with the sub-band full-duplex slot.

In some examples, to support participating in the communications, the SBFD resource component 1250 is capable of, configured to, or operable to support a means for determining that at least a first portion of the one or more occasions overlap with a second portion of either the uplink resources or the downlink resources that have a communication direction that is different from a communication direction of the one or more occasions. In some examples, to support participating in the communications, the occasion communication regulation component 1245 is capable of, configured to, or operable to support a means for refraining from communicating the specified signal during the first portion in accordance with the rule that specifies that a UE is to drop transmission of the specified signal during resource blocks that conflict with resources of a sub-band full-duplex slot.

In some examples, the specified signal includes a synchronization signal block, a control message in a control resource set, a random access message in a random access channel occasion, a common search space set message, tracking reference signal, or a sounding reference signal.

Additionally, or alternatively, the communications manager 1220 may support wireless communications at a network entity in accordance with examples as disclosed herein. In some examples, the first control signaling interface 1225 is capable of, configured to, or operable to support a means for transmitting first control signaling that indicates a sub-band full-duplex symbol that includes at least a first communication resource that is associated with a first communication direction and that spans a first frequency sub-band and a second communication resource that is associated with a second communication direction and that spans a second frequency sub-band. In some examples, the second control signaling interface 1230 is capable of, configured to, or operable to support a means for transmitting second control signaling that allocates a resource block group for communication during the sub-band full-duplex symbol, the resource block group including a set of multiple resource blocks and being associated with the first communication direction, where a first portion of the set of multiple resource blocks overlaps with the first frequency sub-band of the first communication resource and a second portion of the set of multiple resource blocks overlaps with a guard band or the second frequency sub-band of the second communication resource. In some examples, the communication interface 1235 is capable of, configured to, or operable to support a means for participating in communications, via the second portion of the set of multiple resource blocks, in accordance with a rule that pertains to communications over resource block group portions that overlap with communication resources having a different communication direction than the first communication direction of the resource block group.

In some examples, to support participating in communications, the RBG communication regulation component 1255 is capable of, configured to, or operable to support a means for refraining from using the second portion of the set of multiple resource blocks in accordance with the rule that specifies that a UE is to drop a reception during resource blocks that overlap with the communication resources having the different communication direction from the first communication direction of the resource block group.

In some examples, to support participating in communications, the SBFD resource component 1250 is capable of, configured to, or operable to support a means for using the second portion for communications via the first communication direction or as flexible resources in accordance with the rule.

In some examples, the SBFD resource component 1250 is capable of, configured to, or operable to support a means for modifying, based on the rule, the second communication resource to have the first communication direction or to have a flexible allocation.

In some examples, the RBG communication regulation component 1255 is capable of, configured to, or operable to support a means for determining whether to use the first portion of the set of multiple resource blocks for communications based on a quantity of the first portion relative to a threshold.

In some examples, the threshold is based on a total quantity of resource blocks in the resource block group.

In some examples, the RBG communication regulation component 1255 is capable of, configured to, or operable to support a means for refraining from using the first portion of the resource block group for communications based on the quantity of the first portion being less than the threshold.

In some examples, the communication interface 1235 is capable of, configured to, or operable to support a means for using the first portion based on the quantity of the first portion being greater than the threshold.

In some examples, the RBG communication regulation component 1255 is capable of, configured to, or operable to support a means for refraining from using both the first portion and the second portion of the resource block group for communications based on the rule.

In some examples, to support participating in communications, the RBG communication regulation component 1255 is capable of, configured to, or operable to support a means for determining that the first portion and the second portion are to be used for communications. In some examples, to support participating in communications, the SBFD resource component 1250 is capable of, configured to, or operable to support a means for modifying the second communication resource to have the first communication direction or to have a flexible allocation.

In some examples, the guard band is positioned between the first communication resource spanning the first frequency sub-band and the second communication resource spanning the second frequency sub-band.

Additionally, or alternatively, the communications manager 1220 may support wireless communications at a network entity in accordance with examples as disclosed herein. In some examples, the first control signaling interface 1225 is capable of, configured to, or operable to support a means for transmitting first control signaling that indicates a sub-band full-duplex symbol that includes at least a first uplink communication resource that spans a first frequency sub-band and a second downlink communication resource that spans a second frequency sub-band. In some examples, the second control signaling interface 1230 is capable of, configured to, or operable to support a means for transmitting second control signaling that allocates a precoding resource block group for receiving a physical downlink shared channel transmission, the precoding resource block group including a set of multiple resource blocks, where a first portion of the set of multiple resource blocks overlaps with the first frequency sub-band of the first uplink communication resource. In some examples, the communication interface 1235 is capable of, configured to, or operable to support a means for participating in communications, via precoding resource block group, in accordance with a rule that pertains to communications over precoding resource block group portions that overlap with uplink communication resources of a sub-band full-duplex symbol.

In some examples, a size of the precoding resource block group is two or four and a quantity of resource blocks in the first portion is one.

In some examples, to support regulating the communications, the PRG communication regulation component 1260 is capable of, configured to, or operable to support a means for refraining from transmitting the physical downlink shared channel transmission during the first portion based on the size and the quantity.

In some examples, to support regulating the communications, the communication interface 1235 is capable of, configured to, or operable to support a means for transmitting the physical downlink shared channel transmission during the first portion based on the size and the quantity.

In some examples, to support regulating the communications in accordance with the rule, the PRG communication regulation component 1260 is capable of, configured to, or operable to support a means for combining, based on the size and the quantity, the first portion with a second precoding resource block group to generate a combined precoding resource block group. In some examples, to support regulating the communications in accordance with the rule, the communication interface 1235 is capable of, configured to, or operable to support a means for transmitting the physical downlink shared channel transmission in the combined precoding resource block group.

In some examples, a size of the precoding resource block group is four and a quantity of resource blocks in the first portion is two or three.

In some examples, to support regulating the communications, the PRG communication regulation component 1260 is capable of, configured to, or operable to support a means for refraining from transmitting the physical downlink shared channel transmission during the first portion based on the size and the quantity.

In some examples, to support regulating the communications, the communication interface 1235 is capable of, configured to, or operable to support a means for transmitting the physical downlink shared channel transmission during the first portion based on the size and the quantity.

In some examples, to support regulating the communications, the communication interface 1235 is capable of, configured to, or operable to support a means for transmitting, based on the size and the quantity, the physical downlink shared channel transmission during only a sub-portion of resource blocks of the first portion in accordance with the rule.

In some examples, to support regulating the communications, the PRG communication regulation component 1260 is capable of, configured to, or operable to support a means for combining, based on the size and the quantity, the first portion with a second precoding resource block group to generate a combined precoding resource block group. In some examples, to support regulating the communications, the communication interface 1235 is capable of, configured to, or operable to support a means for transmitting the physical downlink shared channel transmission in the combined precoding resource block group.

In some examples, the first control signaling indicates the sub-band full-duplex symbol that includes the first uplink communication resource, the second downlink communication resource, and a third downlink communication resource that is non-contiguous with the second downlink communication resource. In some examples, the second control signaling indicates that the precoding resource block group is a wideband precoding resource block group.

In some examples, to support regulating the communications, the communication interface 1235 is capable of, configured to, or operable to support a means for transmitting the physical downlink shared channel transmission in the precoding resource block group. In some examples, to support regulating the communications, the SBFD resource component 1250 is capable of, configured to, or operable to support a means for refraining from monitoring for uplink communications in the first uplink communication resource in accordance with the rule.

In some examples, the communication interface 1235 is capable of, configured to, or operable to support a means for transmitting the physical downlink shared channel transmission during the second downlink communication resource and the third downlink communication resource using a same precoder in accordance with the rule.

In some examples, the SBFD resource component 1250 is capable of, configured to, or operable to support a means for selecting one of the second downlink communication resource and the third downlink communication resource for transmitting the physical downlink shared channel transmission, where non-selected resource blocks are rate-matched with the selected resource.

In some examples, to support participating in the communications, the second control signaling interface 1230 is capable of, configured to, or operable to support a means for transmitting a schedule for the precoding resource block group, wherein the precoding resource block group is scheduled such that the precoding resource block does not overlap with a guard band or the first uplink communication resource in accordance with the rule, wherein the rule specifies that the UE is not expected to be configured with precoding resource block groups that overlap with an uplink subband and a downlink subband of a bandwidth part.

In some examples, to support participating in the communications, the second control signaling interface 1230 is capable of, configured to, or operable to support a means for transmitting a schedule for the precoding resource block group that does not overlap with the second downlink communication resource and a third downlink communication resource in accordance with the rule, wherein the rule specifies that the UE is not expected to be configured with non-contiguous resource blocks across two downlink subbands for reception of physical downlink shared channel transmissions configured with wideband precoding resource block groups.

Figure 13:
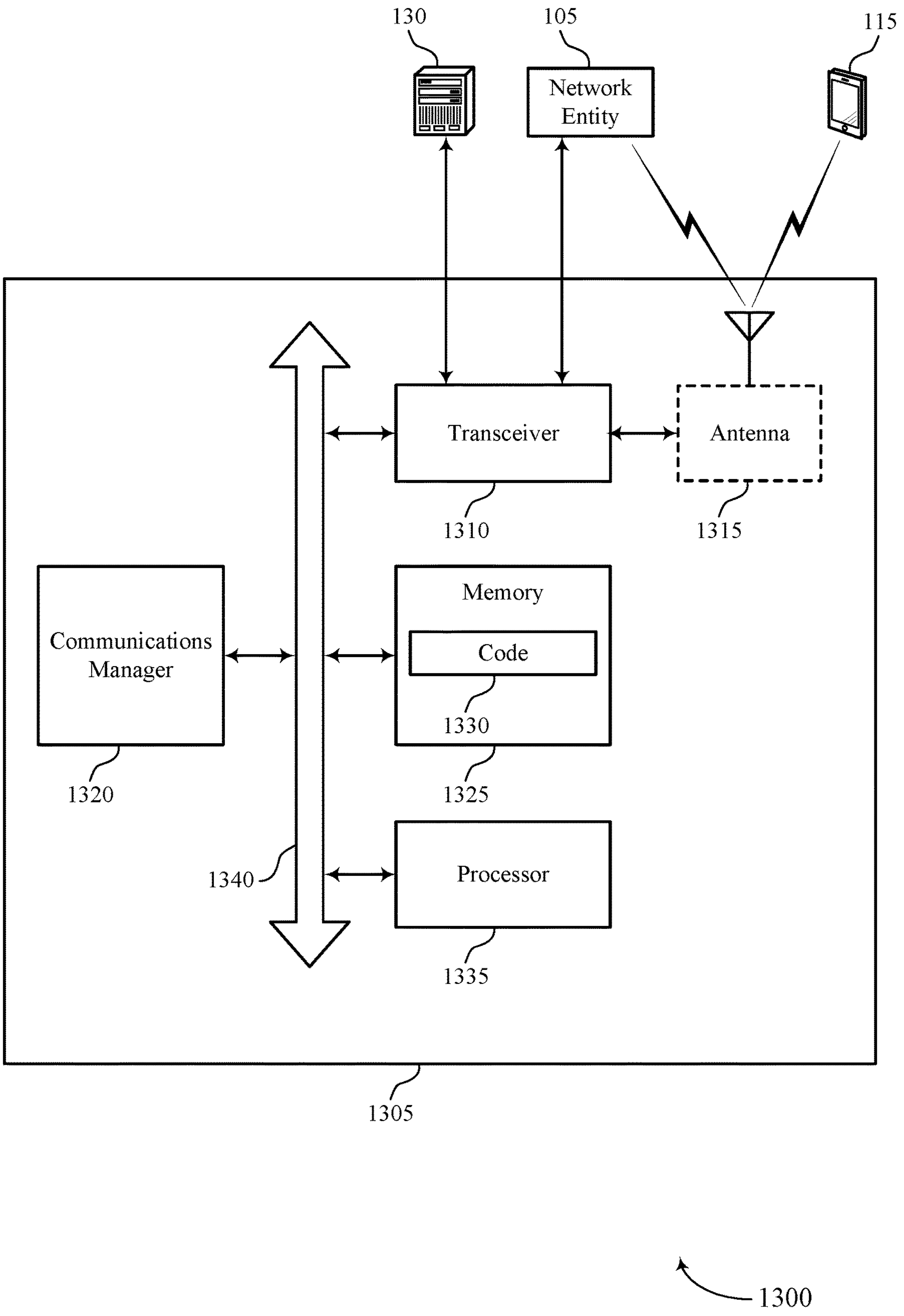
FIG. 13 shows a diagram of a system including a device that supports scheduling during slots with sub-band full-duplex resources in accordance with one or more aspects of the present disclosure.

FIG. 13 shows a diagram of a system 1300 including a device 1305 that supports scheduling during slots with sub-band full-duplex resources in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting scheduling during slots with sub-band full-duplex resources). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity in accordance with examples as disclosed herein. For example, the communications manager 1320 is capable of, configured to, or operable to support a means for transmitting first control signaling that indicates a slot that is allocated for sub-band full-duplex communications, where the slot is scheduled to include sub-band full-duplex symbols that each include a combination of uplink resources and downlink resources in respective frequency sub-bands. The communications manager 1320 is capable of, configured to, or operable to support a means for transmitting second control signaling that schedules, within the slot or outside the slot, one or more occasions for communication of a specified signal. The communications manager 1320 is capable of, configured to, or operable to support a means for participating in communications, during the slot, in accordance with a rule that pertains to scheduled occasions for the specified signal that overlaps a sub-band full-duplex slot.

Additionally, or alternatively, the communications manager 1320 may support wireless communications at a network entity in accordance with examples as disclosed herein. For example, the communications manager 1320 is capable of, configured to, or operable to support a means for transmitting first control signaling that indicates a sub-band full-duplex symbol that includes at least a first communication resource that is associated with a first communication direction and that spans a first frequency sub-band and a second communication resource that is associated with a second communication direction and that spans a second frequency sub-band. The communications manager 1320 is capable of, configured to, or operable to support a means for transmitting second control signaling that allocates a resource block group for communication during the sub-band full-duplex symbol, the resource block group including a set of multiple resource blocks and being associated with the first communication direction, where a first portion of the set of multiple resource blocks overlaps with the first frequency sub-band of the first communication resource and a second portion of the set of multiple resource blocks overlaps with a guard band or the second frequency sub-band of the second communication resource. The communications manager 1320 is capable of, configured to, or operable to support a means for participating in communications, via the second portion of the set of multiple resource blocks, in accordance with a rule that pertains to communications over resource block group portions that overlap with communication resources having a different communication direction than the first communication direction of the resource block group.

Additionally, or alternatively, the communications manager 1320 may support wireless communications at a network entity in accordance with examples as disclosed herein. For example, the communications manager 1320 is capable of, configured to, or operable to support a means for transmitting first control signaling that indicates a sub-band full-duplex symbol that includes at least a first uplink communication resource that spans a first frequency sub-band and a second downlink communication resource that spans a second frequency sub-band. The communications manager 1320 is capable of, configured to, or operable to support a means for transmitting second control signaling that allocates a precoding resource block group for receiving a physical downlink shared channel transmission, the precoding resource block group including a set of multiple resource blocks, where a first portion of the set of multiple resource blocks overlaps with the first frequency sub-band of the first uplink communication resource and a second portion of the set of multiple resource blocks overlaps with a guard band or the second frequency sub-band of the second downlink communication resource. The communications manager 1320 is capable of, configured to, or operable to support a means for participating in communications, via precoding resource block group, in accordance with a rule that pertains to communications over precoding resource block group portions that overlap with uplink communication resources of a sub-band full-duplex symbol.

By including or configuring the communications manager 1320 in accordance with examples as described herein, the device 1305 may support techniques for more efficient utilization of communication resources by supporting full-duplexing operations by devices of a wireless communications system. As such, the techniques may support improved latency and communication efficiency.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of scheduling during slots with sub-band full-duplex resources as described herein, or the processor 1335 and the memory 1325 may be otherwise configured to perform or support such operations.

Figure 14:
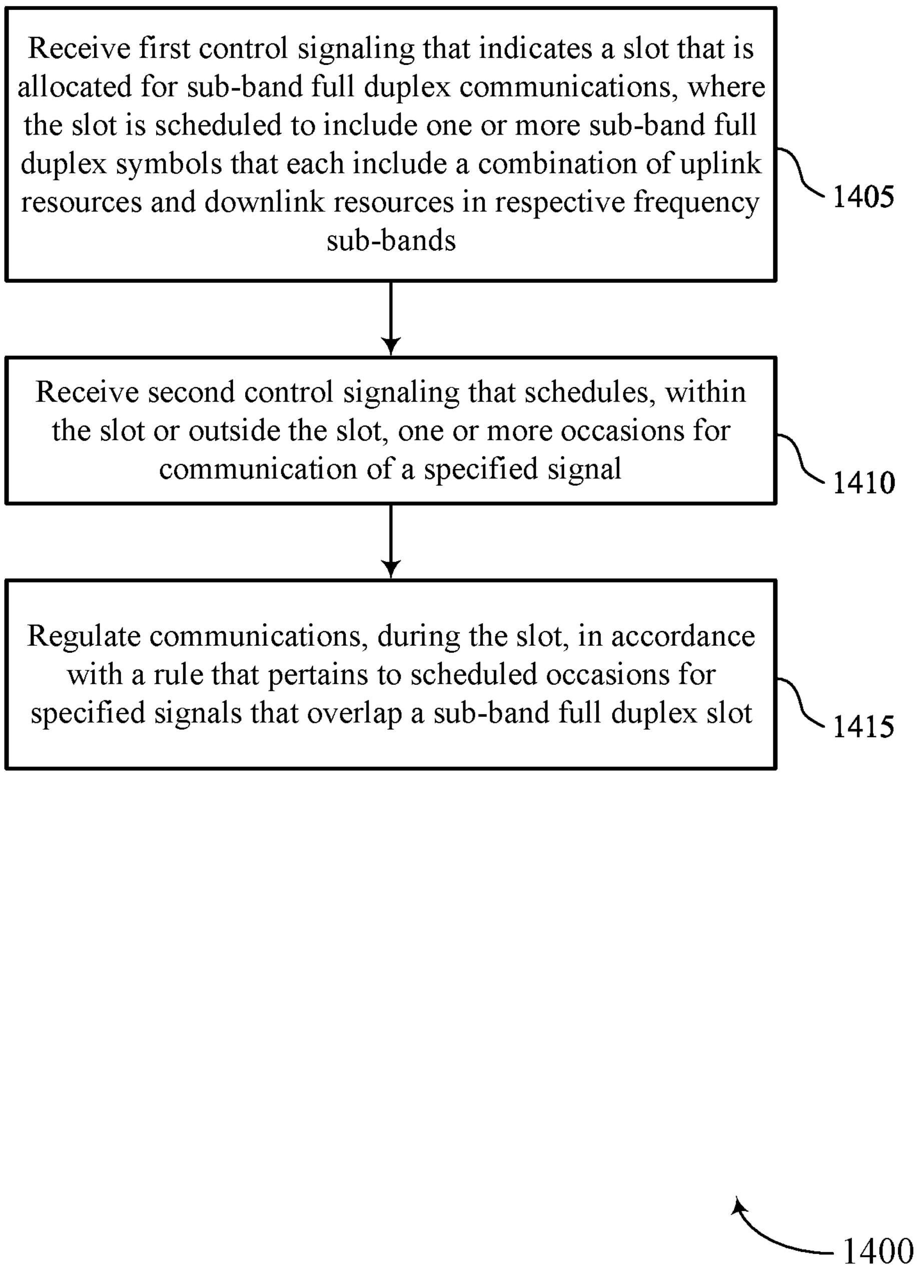
FIGS. 14 through 19 show flowcharts illustrating methods that support scheduling during slots with sub-band full-duplex resources in accordance with one or more aspects of the present disclosure.

FIG. 14 shows a flowchart illustrating a method 1400 that supports scheduling during slots with sub-band full-duplex resources in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 1405, the method may include receiving first control signaling that indicates a slot that is allocated for sub-band full-duplex communications, where the slot is scheduled to include sub-band full-duplex symbols that each include a combination of uplink resources and downlink resources in respective frequency sub-bands. The operations of 1405 may be performed in accordance with examples as disclosed herein. In some examples, aspects of the operations of 1405 may be performed by a first control signaling interface 825 as described with reference to FIG. 8.

At 1410, the method may include receiving second control signaling that schedules, within the slot or outside the slot, one or more occasions for communication of a specified signal. The operations of 1410 may be performed in accordance with examples as disclosed herein. In some examples, aspects of the operations of 1410 may be performed by a second control signaling interface 830 as described with reference to FIG. 8.

At 1415, the method may include regulating communications, during the slot, in accordance with a rule that pertains to scheduled occasions for specified signals that overlap a sub-band full-duplex slot. The operations of 1415 may be performed in accordance with examples as disclosed herein. In some examples, aspects of the operations of 1415 may be performed by a slot communications regulation component 835 as described with reference to FIG. 8.

Figure 15:
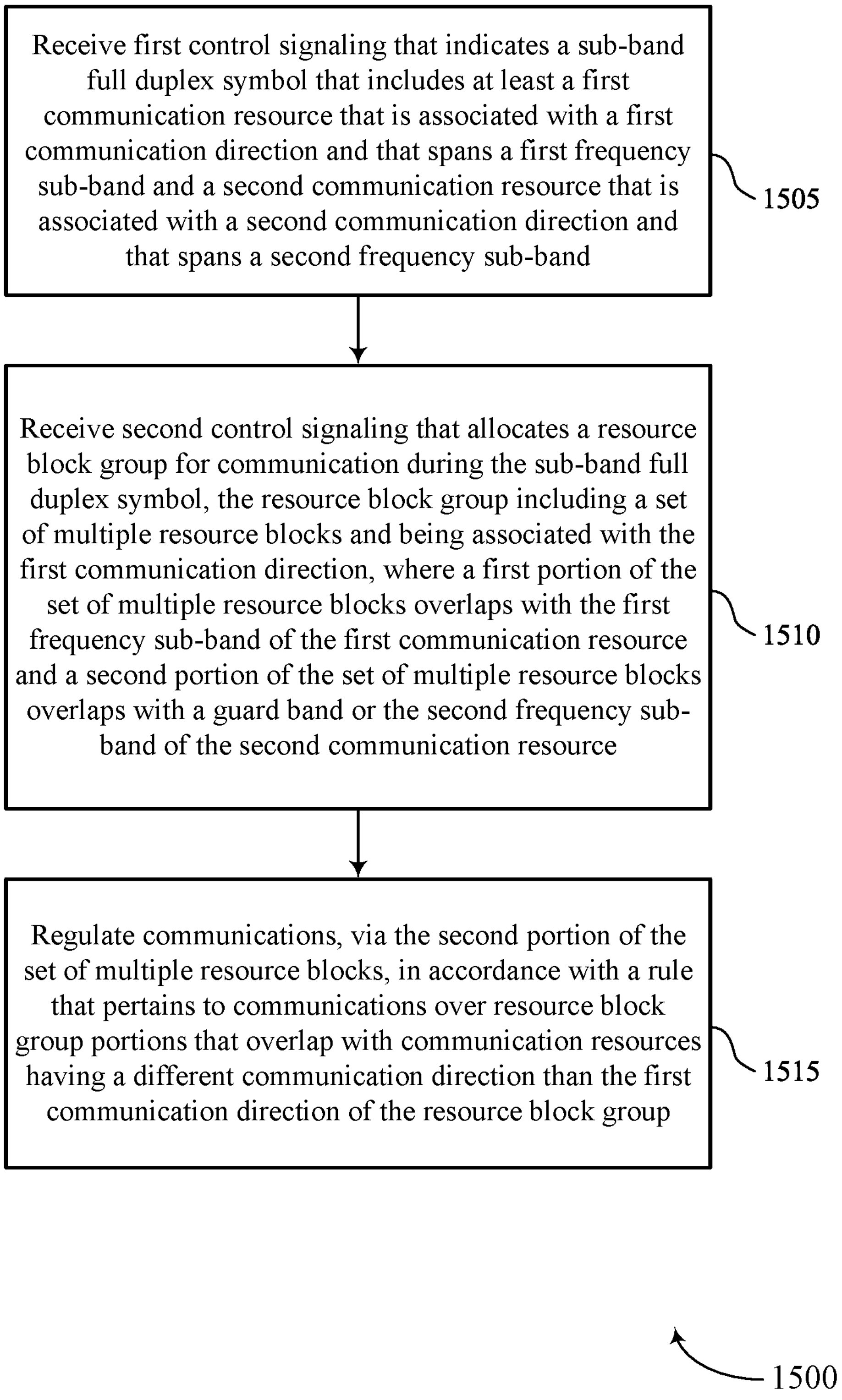

FIG. 15 shows a flowchart illustrating a method 1500 that supports scheduling during slots with sub-band full-duplex resources in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 1505, the method may include receiving first control signaling that indicates a sub-band full-duplex symbol that includes at least a first communication resource that is associated with a first communication direction and that spans a first frequency sub-band and a second communication resource that is associated with a second communication direction and that spans a second frequency sub-band. The operations of 1505 may be performed in accordance with examples as disclosed herein. In some examples, aspects of the operations of 1505 may be performed by a first control signaling interface 825 as described with reference to FIG. 8.

At 1510, the method may include receiving second control signaling that allocates a resource block group for communication during the sub-band full-duplex symbol, the resource block group including a set of multiple resource blocks and being associated with the first communication direction, where a first portion of the set of multiple resource blocks overlaps with the first frequency sub-band of the first communication resource and a second portion of the set of multiple resource blocks overlaps with a guard band or the second frequency sub-band of the second communication resource. The operations of 1510 may be performed in accordance with examples as disclosed herein. In some examples, aspects of the operations of 1510 may be performed by a second control signaling interface 830 as described with reference to FIG. 8.

At 1515, the method may include regulating communications, via the second portion of the set of multiple resource blocks, in accordance with a rule that pertains to communications over resource block group portions that overlap with communication resources having a different communication direction than the first communication direction of the resource block group. The operations of 1515 may be performed in accordance with examples as disclosed herein. In some examples, aspects of the operations of 1515 may be performed by an RB communications regulation component 840 as described with reference to FIG. 8.

Figure 16:
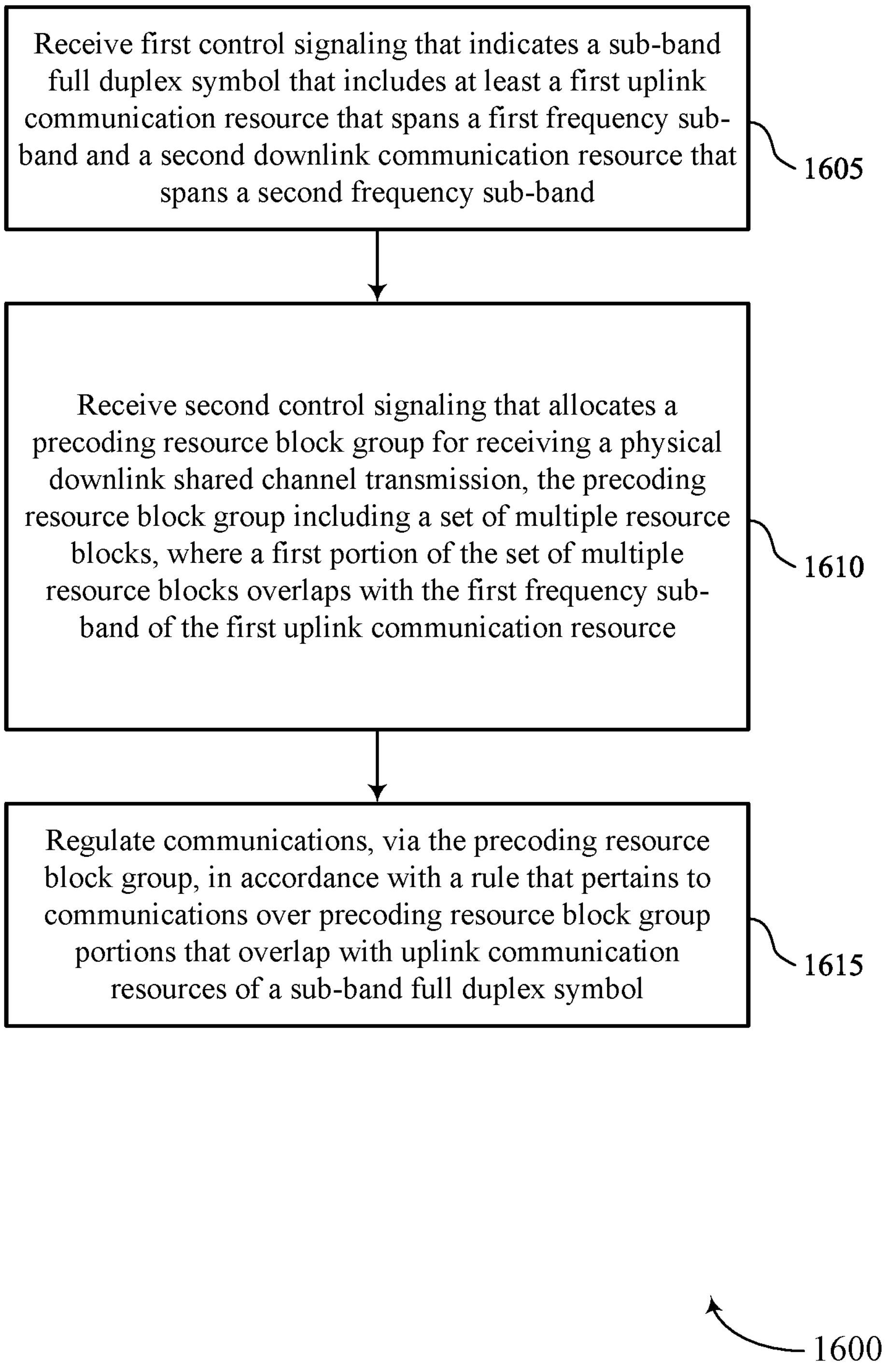

FIG. 16 shows a flowchart illustrating a method 1600 that supports scheduling during slots with sub-band full-duplex resources in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 1605, the method may include receiving first control signaling that indicates a sub-band full-duplex symbol that includes at least a first uplink communication resource that spans a first frequency sub-band and a second downlink communication resource that spans a second frequency sub-band. The operations of 1605 may be performed in accordance with examples as disclosed herein. In some examples, aspects of the operations of 1605 may be performed by a first control signaling interface 825 as described with reference to FIG. 8.

At 1610, the method may include receiving second control signaling that allocates a precoding resource block group for receiving a physical downlink shared channel transmission, the precoding resource block group including a set of multiple resource blocks, where a first portion of the set of multiple resource blocks overlaps with the first frequency sub-band of the first uplink communication resource. The operations of 1610 may be performed in accordance with examples as disclosed herein. In some examples, aspects of the operations of 1610 may be performed by a second control signaling interface 830 as described with reference to FIG. 8.

At 1615, the method may include regulating communications, via the precoding resource block group, in accordance with a rule that pertains to communications over precoding resource block group portions that overlap with uplink communication resources of a sub-band full-duplex symbol. The operations of 1615 may be performed in accordance with examples as disclosed herein. In some examples, aspects of the operations of 1615 may be performed by an PRG communications regulation component 845 as described with reference to FIG. 8.

Figure 17:
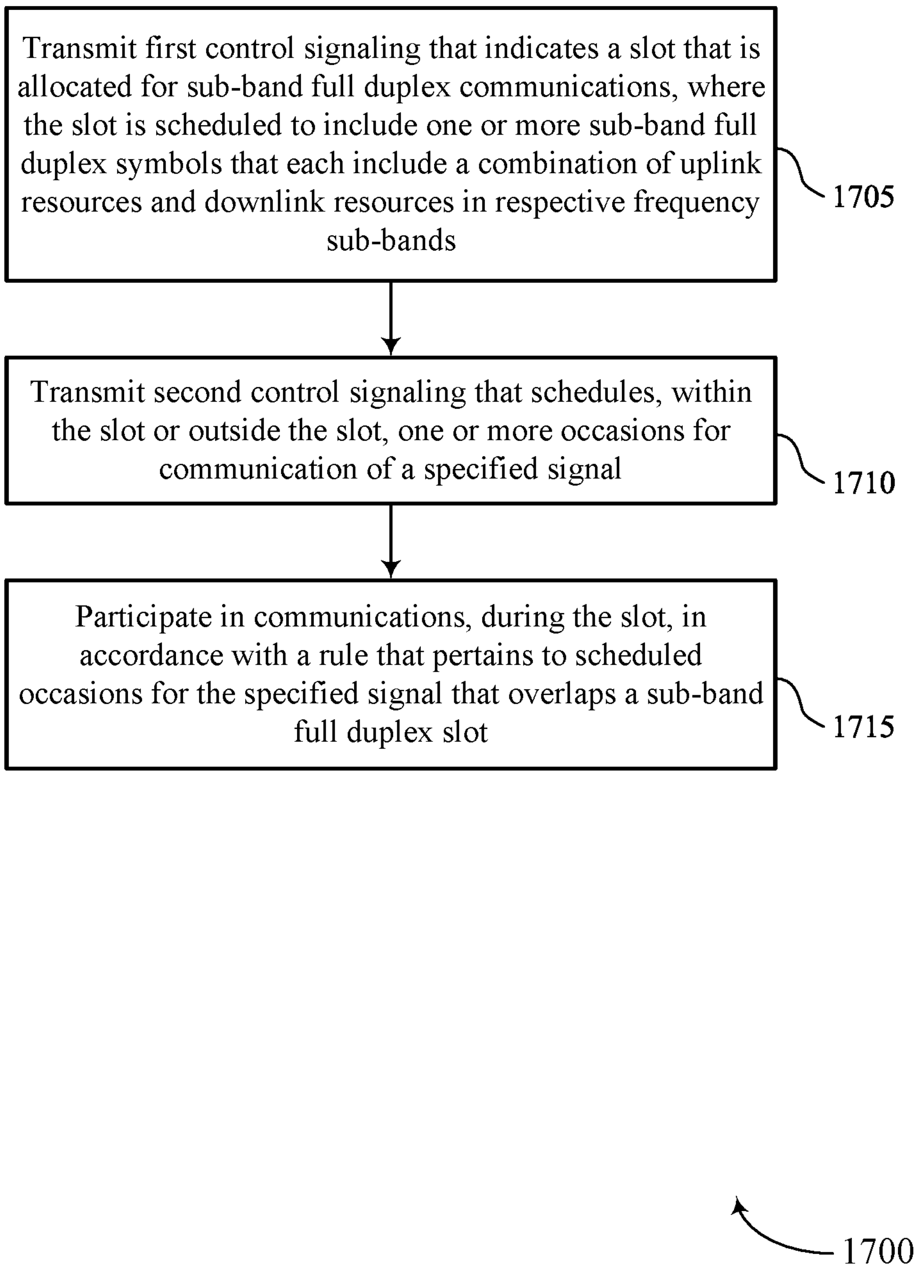

FIG. 17 shows a flowchart illustrating a method 1700 that supports scheduling during slots with sub-band full-duplex resources in accordance with aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the wireless network entity to perform the described functions. Additionally, or alternatively, the wireless network entity may perform aspects of the described functions using special-purpose hardware.

At 1705, the method may include transmitting first control signaling that indicates a slot that is allocated for sub-band full-duplex communications, where the slot is scheduled to include sub-band full-duplex symbols that each include a combination of uplink resources and downlink resources in respective frequency sub-bands. The operations of 1705 may be performed in accordance with examples as disclosed herein. In some examples, aspects of the operations of 1705 may be performed by a first control signaling interface 1225 as described with reference to FIG. 12.

At 1710, the method may include transmitting second control signaling that schedules, within the slot or outside the slot, one or more occasions for communication of a specified signal. The operations of 1710 may be performed in accordance with examples as disclosed herein. In some examples, aspects of the operations of 1710 may be performed by a second control signaling interface 1230 as described with reference to FIG. 12.

At 1715, the method may include participating in communications, during the slot, in accordance with a rule that pertains to scheduled occasions for the specified signal that overlaps a sub-band full-duplex slot. The operations of 1715 may be performed in accordance with examples as disclosed herein. In some examples, aspects of the operations of 1715 may be performed by a communication interface 1235 as described with reference to FIG. 12.

Figure 18:
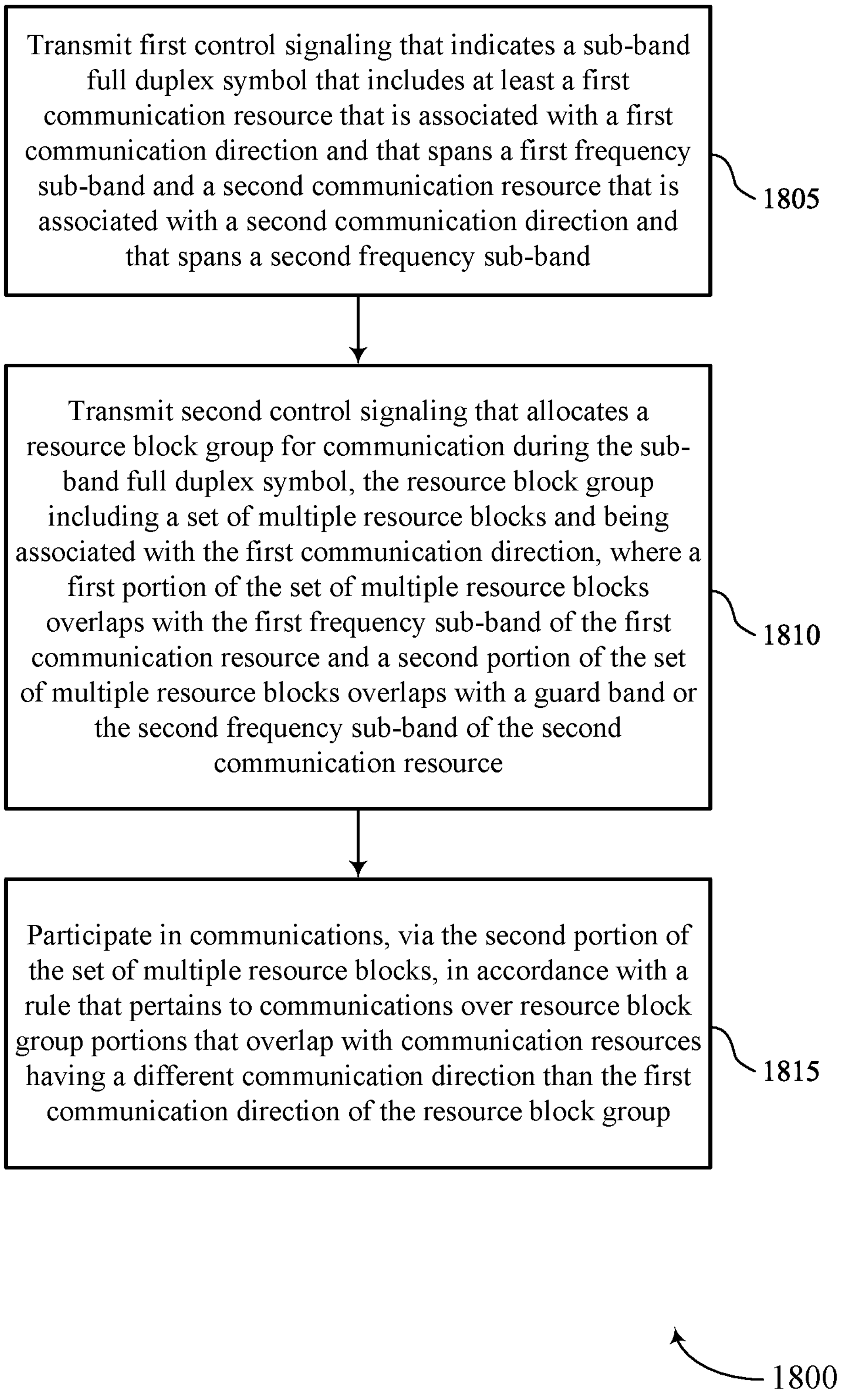

FIG. 18 shows a flowchart illustrating a method 1800 that supports scheduling during slots with sub-band full-duplex resources in accordance with aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the wireless network entity to perform the described functions. Additionally, or alternatively, the wireless network entity may perform aspects of the described functions using special-purpose hardware.

At 1805, the method may include transmitting first control signaling that indicates a sub-band full-duplex symbol that includes at least a first communication resource that is associated with a first communication direction and that spans a first frequency sub-band and a second communication resource that is associated with a second communication direction and that spans a second frequency sub-band. The operations of 1805 may be performed in accordance with examples as disclosed herein. In some examples, aspects of the operations of 1805 may be performed by a first control signaling interface 1225 as described with reference to FIG. 12.

At 1810, the method may include transmitting second control signaling that allocates a resource block group for communication during the sub-band full-duplex symbol, the resource block group including a set of multiple resource blocks and being associated with the first communication direction, where a first portion of the set of multiple resource blocks overlaps with the first frequency sub-band of the first communication resource and a second portion of the set of multiple resource blocks overlaps with a guard band or the second frequency sub-band of the second communication resource. The operations of 1810 may be performed in accordance with examples as disclosed herein. In some examples, aspects of the operations of 1810 may be performed by a second control signaling interface 1230 as described with reference to FIG. 12.

At 1815, the method may include participating in communications, via the second portion of the set of multiple resource blocks, in accordance with a rule that pertains to communications over resource block group portions that overlap with communication resources having a different communication direction than the first communication direction of the resource block group. The operations of 1815 may be performed in accordance with examples as disclosed herein. In some examples, aspects of the operations of 1815 may be performed by a communication interface 1235 as described with reference to FIG. 12.

Figure 19:
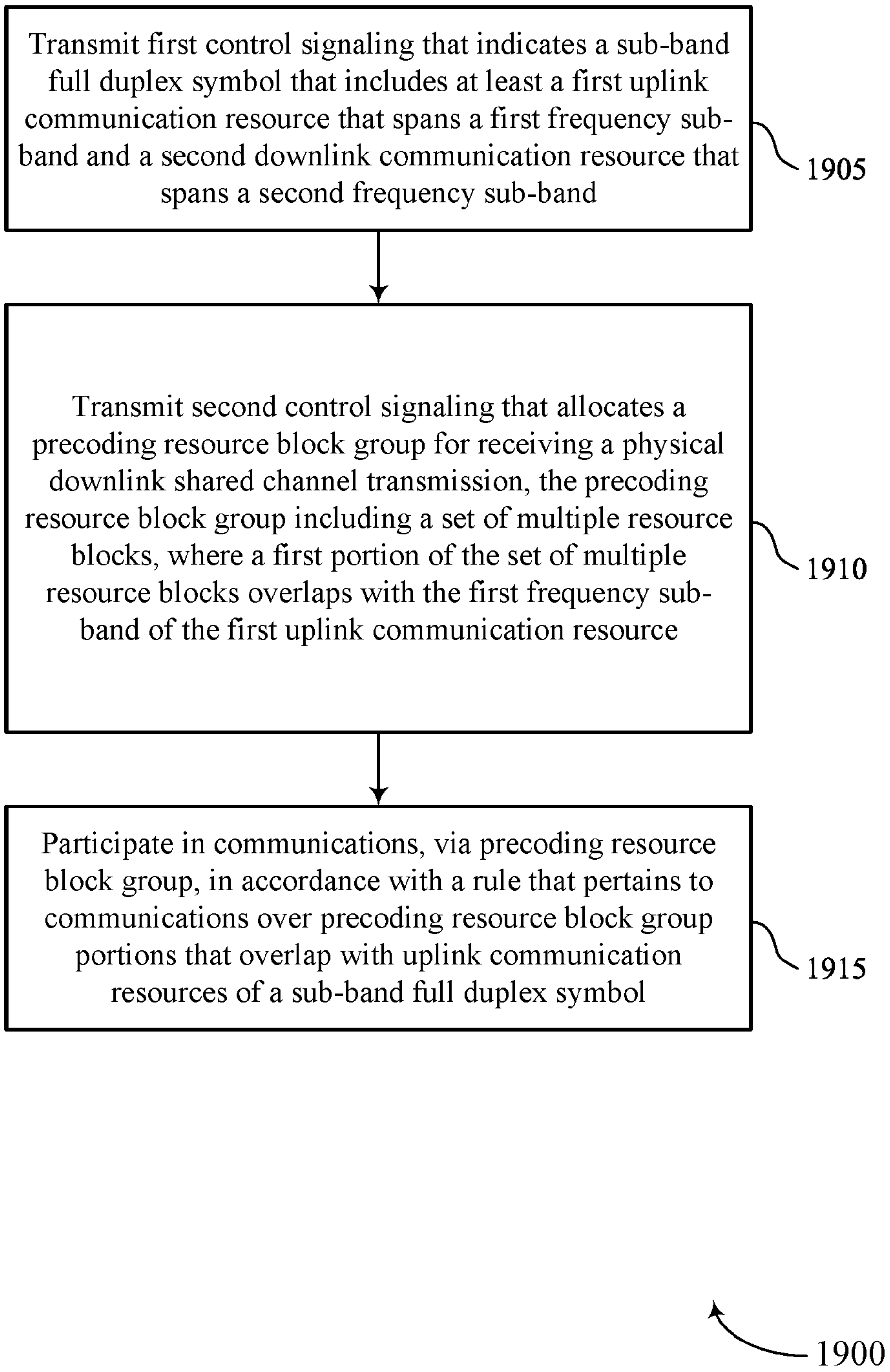

FIG. 19 shows a flowchart illustrating a method 1900 that supports scheduling during slots with sub-band full-duplex resources in accordance with aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the wireless network entity to perform the described functions. Additionally, or alternatively, the wireless network entity may perform aspects of the described functions using special-purpose hardware.

At 1905, the method may include transmitting first control signaling that indicates a sub-band full-duplex symbol that includes at least a first uplink communication resource that spans a first frequency sub-band and a second downlink communication resource that spans a second frequency sub-band. The operations of 1905 may be performed in accordance with examples as disclosed herein. In some examples, aspects of the operations of 1905 may be performed by a first control signaling interface 1225 as described with reference to FIG. 12.

At 1910, the method may include transmitting second control signaling that allocates a precoding resource block group for receiving a physical downlink shared channel transmission, the precoding resource block group including a set of multiple resource blocks, where a first portion of the set of multiple resource blocks overlaps with the first frequency sub-band of the first uplink communication resource. The operations of 1910 may be performed in accordance with examples as disclosed herein. In some examples, aspects of the operations of 1910 may be performed by a second control signaling interface 1230 as described with reference to FIG. 12.

At 1915, the method may include participating in communications, via precoding resource block group, in accordance with a rule that pertains to communications over precoding resource block group portions that overlap with uplink communication resources of a sub-band full-duplex symbol. The operations of 1915 may be performed in accordance with examples as disclosed herein. In some examples, aspects of the operations of 1915 may be performed by a communication interface 1235 as described with reference to FIG. 12.

The following provides an overview of aspects of the present disclosure:

Aspect 1: A method for wireless communications at UE, comprising: receiving first control signaling that indicates a slot that is allocated for sub-band full duplex communications, wherein the slot is scheduled to include one or more sub-band full duplex symbols that each include a combination of uplink resources and downlink resources in respective frequency sub-bands; receiving second control signaling that schedules, within the slot or outside the slot, one or more occasions for communication of a specified signal; and regulating communications, during the slot, in accordance with a rule that pertains to scheduled occasions for specified signals that overlap a sub-band full duplex slot.

Aspect 2: The method of aspect 1, wherein receiving the second control signaling comprises: receiving a schedule for the one or more occasions, wherein the one or more occasions are scheduled outside of the slot in accordance with the rule, wherein the rule specifies that the UE is not expected to communicate the specified signal in the slot that is allocated for sub-band full duplex communications, wherein the communications during the slot do not include the specified signal scheduled by the second control signaling.

Aspect 3: The method of aspect 1, wherein the second control signaling schedules the one or more occasions to overlap with the slot and wherein regulating the communications comprises: communicating, in a first communication direction and in accordance with the rule, the specified signal during the one or more occasions that overlap with the slot such that the slot is treated as a downlink, uplink, or flexible slot based on the first communication direction.

Aspect 4: The method of aspect 1, wherein the second control signaling schedules the one or more occasions to overlap with the slot and wherein regulating the communications comprises: communicating, in a first communication direction and in accordance with the rule, the specified signal during the one or more occasions that overlap with the slot such that one or more symbols that conflict with the one or more occasions are converted to downlink, uplink, or flexible symbols based on the first communication direction.

Aspect 5: The method of aspect 1, wherein the second control signaling schedules the one or more occasions to overlap with the slot and wherein regulating the communications comprises: refraining from communicating the specified signal during the one or more occasions in accordance with the rule that specifies that the UE is to drop occasions for communication of the specified signal that overlaps with the sub-band full duplex slot.

Aspect 6: The method of aspect 1, wherein the second control signaling schedules the one or more occasions to overlap with the slot and wherein regulating the communications comprises: determining that at least a first portion of the one or more occasions overlaps with a second portion of either the uplink resources or the downlink resources that have a communication direction that is different from a communication direction of the one or more occasions; and refraining from communicating the specified signal during the first portion in accordance with the rule that specifies that the UE is to drop communication of the specified signal during resource blocks that conflict with resources of a sub-band full duplex slot.

Aspect 7: The method of any of aspects 1 through 6, wherein the specified signal comprises a synchronization signal block, a control message in a control resource set, a random access message in a random access channel occasion, a common search space set message, tracking reference signal, or a sounding reference signal.

Aspect 8: A method for wireless communications at UE, comprising: receiving first control signaling that indicates a sub-band full duplex symbol that includes at least a first communication resource that is associated with a first communication direction and that spans a first frequency sub-band and a second communication resource that is associated with a second communication direction and that spans a second frequency sub-band; receiving second control signaling that allocates a resource block group for communication during the sub-band full duplex symbol, the resource block group comprising a plurality of resource blocks and being associated with the first communication direction, wherein a first portion of the plurality of resource blocks overlaps with the first frequency sub-band of the first communication resource and a second portion of the plurality of resource blocks overlaps with a guard band or the second frequency sub-band of the second communication resource; and regulating communications, via the second portion of the plurality of resource blocks, in accordance with a rule that pertains to communications over resource block group portions that overlap with communication resources having a different communication direction than the first communication direction of the resource block group.

Aspect 9: The method of aspect 8, wherein regulating communications comprises: refraining from using the second portion of the plurality of resource blocks in accordance with the rule that specifies that the UE is to drop a reception during resource blocks that overlap with the communication resources having the different communication direction from the first communication direction of the resource block group.

Aspect 10: The method of aspect 8, wherein regulating communications comprises: using the second portion for communications via the first communication direction or as flexible resources in accordance with the rule.

Aspect 11: The method of any of aspects 8 through 10, further comprising: modifying, based at least in part on the rule, the second communication resource to have the first communication direction or to have a flexible allocation.

Aspect 12: The method of any of aspects 8 through 11, further comprising: determining whether to use the first portion of the plurality of resource blocks for communications based at least in part on a quantity of the first portion relative to a threshold.

Aspect 13: The method of aspect 12, wherein the threshold is based on a total quantity of resource blocks in the resource block group.

Aspect 14: The method of any of aspects 12 through 13, further comprising: refraining from using the first portion of the resource block group for communications based at least in part on the quantity of the first portion being less than the threshold.

Aspect 15: The method of any of aspects 12 through 13, further comprising: using the first portion based at least in part on the quantity of the first portion being greater than the threshold.

Aspect 16: The method of aspect 12, further comprising: refraining from using both the first portion and the second portion of the resource block group for communications based at least in part on the rule.

Aspect 17: The method of aspect 12, wherein regulating communications comprises: determining that the first portion and the second portion are to be used for communications; and modifying the second communication resource to have the first communication direction or to have a flexible allocation.

Aspect 18: The method of any of aspects 8 through 17, wherein the guard band is positioned between the first communication resource spanning the first frequency sub-band and the second communication resource spanning the second frequency sub-band.

Aspect 19: A method for wireless communications at UE, comprising: receiving first control signaling that indicates a sub-band full duplex symbol that includes at least a first uplink communication resource that spans a first frequency sub-band and a second downlink communication resource that spans a second frequency sub-band; receiving second control signaling that allocates a precoding resource block group for receiving a physical downlink shared channel transmission, the precoding resource block group comprising a plurality of resource blocks, wherein a first portion of the plurality of resource blocks overlaps with the first frequency sub-band of the first uplink communication resource; and regulating communications, via the precoding resource block group, in accordance with a rule that pertains to communications over precoding resource block group portions that overlap with uplink communication resources of a sub-band full duplex symbol.

Aspect 20: The method of aspect 19, wherein receiving the second control signaling comprises: receiving a schedule for the precoding resource block group, wherein the precoding resource block group is scheduled such that the precoding resource block group does not overlap with a guard band or the first uplink communication resource in accordance with the rule, wherein the rule specifies that the UE is not expected to be configured with precoding resource block groups that overlap with an uplink subband and a downlink subband of a bandwidth part.

Aspect 21: The method of aspect 19, wherein a size of the precoding resource block group is two or four and a quantity of resource blocks in the first portion is one and a second portion of the plurality of resource blocks overlaps with a guard band or the second frequency sub-band of the second downlink communication resource.

Aspect 22: The method of aspect 21, wherein regulating the communications comprises: refraining from monitoring for the physical downlink shared channel transmission during the first portion based at least in part on the size and the quantity.

Aspect 23: The method of aspect 21, wherein regulating the communications comprises: monitoring for the physical downlink shared channel transmission during the first portion based at least in part on the size and the quantity.

Aspect 24: The method of aspect 21, wherein regulating the communications in accordance with the rule comprises: combining, based at least in part on the size and the quantity, the first portion with a second precoding resource block group to generate a combined precoding resource block group; and monitoring for the physical downlink shared channel transmission in the combined precoding resource block group.

Aspect 25: The method of aspect 19, wherein a size of the precoding resource block group is four and a quantity of resource blocks in the first portion is two or three and a second portion of the plurality of resource blocks overlaps with a guard band or the second frequency sub-band of the second downlink communication resource.

Aspect 26: The method of aspect 25, wherein regulating the communications comprises: refraining from monitoring for the physical downlink shared channel transmission during the first portion based at least in part on the size and the quantity.

Aspect 27: The method of aspect 25, wherein regulating the communications comprises: monitoring for the physical downlink shared channel transmission during the first portion based at least in part on the size and the quantity.

Aspect 28: The method of aspect 25, wherein regulating the communications comprises: monitoring, based at least in part on the size and the quantity, for the physical downlink shared channel transmission during only a sub-portion of resource blocks of the first portion in accordance with the rule.

Aspect 29: The method of aspect 25, wherein regulating the communications comprises: combining, based at least in part on the size and the quantity, the first portion with a second precoding resource block group to generate a combined precoding resource block group; and monitoring for the physical downlink shared channel transmission in the combined precoding resource block group.

Aspect 30: The method of any of aspects 19 through 29, wherein the first control signaling indicates the sub-band full duplex symbol that includes the first uplink communication resource, the second downlink communication resource, and a third downlink communication resource that is non-contiguous with the second downlink communication resource, and the second control signaling indicates that the precoding resource block group is a wideband precoding resource block group.

Aspect 31: The method of aspect 30, wherein receiving the second control signaling comprises: receiving a schedule for the precoding resource block group that does not overlap with the second downlink communication resource and a third downlink communication resource in accordance with the rule, wherein the rule specifies that the UE is not expected to be configured with non-contiguous resource blocks across two downlink subbands for reception of physical downlink shared channel transmissions configured with wideband precoding resource block groups.

Aspect 32: The method of aspect 30, wherein regulating the communications comprises: monitoring for the physical downlink shared channel transmission in the precoding resource block group; and refraining from using the first uplink communication resource for uplink communications in accordance with the rule.

Aspect 33: The method of aspect 30, further comprising: monitoring for the physical downlink shared channel transmission during the second downlink communication resource and the third downlink communication resource using a same precoder in accordance with the rule.

Aspect 34: The method of aspect 30, wherein the UE monitors for the physical downlink shared channel transmission during the second downlink communication resource and the third downlink communication resource based at least in part on a capability of the UE in monitoring non-contiguous physical downlink shared channel transmissions with a wideband precoding resource block group.

Aspect 35: The method of aspect 30, further comprising: selecting one of the second downlink communication resource and the third downlink communication resource for monitoring for the physical downlink shared channel transmission, wherein non-selected resource blocks are rate-matched with the selected resource.

Aspect 36: A method for wireless communications at a network entity, comprising: transmitting first control signaling that indicates a slot that is allocated for sub-band full duplex communications, wherein the slot is scheduled to include one or more sub-band full duplex symbols that each include a combination of uplink resources and downlink resources in respective frequency sub-bands; transmitting second control signaling that schedules, within the slot or outside the slot, one or more occasions for communication of a specified signal; and participating in communications, during the slot, in accordance with a rule that pertains to scheduled occasions for the specified signal that overlaps a sub-band full duplex slot.

Aspect 37: The method of aspect 36, wherein transmitting the second control signaling comprises: transmitting a schedule for the one or more occasions, wherein the one or more occasions are scheduled outside of the slot in accordance with the rule, wherein the rule specifies that a UE is not expected to communicate the specified signal in the slot that is allocated for sub-band full duplex communications, wherein the communications during the slot do not include the specified signal scheduled by the second control signaling.

Aspect 38: The method of aspect 36, wherein the second control signaling schedules the one or more occasions to overlap with the slot and wherein participating in the communications comprises: communicating, in a first communication direction and in accordance with the rule, the specified signal during the one or more occasions that overlap with the slot such that the slot is treated as a downlink, uplink, or flexible slot based on the first communication direction.

Aspect 39: The method of aspect 36, wherein the second control signaling schedules the one or more occasions to overlap with the slot and wherein participating in the communications comprises: communicating, in a first communication direction and in accordance with the rule, the specified signal during the one or more occasions that overlap with the slot such that one or more symbols that conflict with the one or more occasions are converted to downlink, uplink, or flexible symbols based on the first communication direction.

Aspect 40: The method of aspect 36, wherein the second control signaling schedules the one or more occasions to overlap with the slot and wherein participating in the communications comprises: refraining from communicating the specified signal during the one or more occasions in accordance with the rule that specifies that a UE is to drop occasions for communication of the specified signal that overlaps with the sub-band full duplex slot.

Aspect 41: The method of aspect 36, wherein the second control signaling schedules the one or more occasions to overlap with the slot and wherein participating in the communications comprises: determining that at least a first portion of the one or more occasions overlap with a second portion of either the uplink resources or the downlink resources that have a communication direction that is different from a communication direction of the one or more occasions; and refraining from communicating the specified signal during the first portion in accordance with the rule that specifies that a UE is to drop transmission of the specified signal during resource blocks that conflict with resources of a sub-band full duplex slot.

Aspect 42: The method of any of aspects 36 through 41, wherein the specified signal comprises a synchronization signal block, a control message in a control resource set, a random access message in a random access channel occasion, a common search space set message, tracking reference signal, or a sounding reference signal.

Aspect 43: A method for wireless communications at a network entity, comprising: transmitting first control signaling that indicates a sub-band full duplex symbol that includes at least a first communication resource that is associated with a first communication direction and that spans a first frequency sub-band and a second communication resource that is associated with a second communication direction and that spans a second frequency sub-band; transmitting second control signaling that allocates a resource block group for communication during the sub-band full duplex symbol, the resource block group comprising a plurality of resource blocks and being associated with the first communication direction, wherein a first portion of the plurality of resource blocks overlaps with the first frequency sub-band of the first communication resource and a second portion of the plurality of resource blocks overlaps with a guard band or the second frequency sub-band of the second communication resource; and participating in communications, via the second portion of the plurality of resource blocks, in accordance with a rule that pertains to communications over resource block group portions that overlap with communication resources having a different communication direction than the first communication direction of the resource block group.

Aspect 44: The method of aspect 43, wherein participating in communications comprises: refraining from using the second portion of the plurality of resource blocks in accordance with the rule that specifies that a UE is to drop a reception during resource blocks that overlap with the communication resources having the different communication direction from the first communication direction of the resource block group.

Aspect 45: The method of aspect 43, wherein participating in communications comprises: using the second portion for communications via the first communication direction or as flexible resources in accordance with the rule.

Aspect 46: The method of any of aspects 44 through 45, further comprising: modifying, based at least in part on the rule, the second communication resource to have the first communication direction or to have a flexible allocation.

Aspect 47: The method of any of aspects 44 through 46, further comprising: determining whether to use the first portion of the plurality of resource blocks for communications based at least in part on a quantity of the first portion relative to a threshold.

Aspect 48: The method of aspect 47, wherein the threshold is based on a total quantity of resource blocks in the resource block group.

Aspect 49: The method of any of aspects 47 through 48, further comprising: refraining from using the first portion of the resource block group for communications based at least in part on the quantity of the first portion being less than the threshold.

Aspect 50: The method of any of aspects 47 through 48, further comprising: using the first portion based at least in part on the quantity of the first portion being greater than the threshold.

Aspect 51: The method of any of aspects 47 through 48, further comprising: refraining from using both the first portion and the second portion of the resource block group for communications based at least in part on the rule.

Aspect 52: The method of aspect 43, wherein participating in communications comprises: determining that the first portion and the second portion are to be used for communications; and modifying the second communication resource to have the first communication direction or to have a flexible allocation.

Aspect 53: The method of any of aspects 43 through 52, wherein the guard band is positioned between the first communication resource spanning the first frequency sub-band and the second communication resource spanning the second frequency sub-band.

Aspect 54: A method for wireless communications at a network entity, comprising: transmitting first control signaling that indicates a sub-band full duplex symbol that includes at least a first uplink communication resource that spans a first frequency sub-band and a second downlink communication resource that spans a second frequency sub-band; transmitting second control signaling that allocates a precoding resource block group for receiving a physical downlink shared channel transmission, the precoding resource block group comprising a plurality of resource blocks, wherein a first portion of the plurality of resource blocks overlaps with the first frequency sub-band of the first uplink communication resource; and participating in communications, via precoding resource block group, in accordance with a rule that pertains to communications over precoding resource block group portions that overlap with uplink communication resources of a sub-band full duplex symbol.

Aspect 55: The method of aspect 54, wherein transmitting the second control signaling comprises: transmitting a schedule for the precoding resource block group, wherein the precoding resource block group is scheduled such that the precoding resource block group does not overlap with a guard band or the first uplink communication resource in accordance with the rule, wherein the rule specifies that a UE is not expected to be configured with precoding resource block groups that overlap with an uplink subband and a downlink subband of a bandwidth part.

Aspect 56: The method of aspect 54, wherein a size of the precoding resource block group is two or four and a quantity of resource blocks in the first portion is one and a second portion of the plurality of resource blocks overlaps with a guard band or the second frequency sub-band of the second downlink communication resource.

Aspect 57: The method of aspect 56, wherein regulating the communications comprises: refraining from transmitting the physical downlink shared channel transmission during the first portion based at least in part on the size and the quantity.

Aspect 58: The method of aspect 56, wherein regulating the communications comprises: transmitting the physical downlink shared channel transmission during the first portion based at least in part on the size and the quantity.

Aspect 59: The method of aspect 56, wherein regulating the communications in accordance with the rule comprises: combining, based at least in part on the size and the quantity, the first portion with a second precoding resource block group to generate a combined precoding resource block group; and transmitting the physical downlink shared channel transmission in the combined precoding resource block group.

Aspect 60: The method of aspect 54, wherein a size of the precoding resource block group is four and a quantity of resource blocks in the first portion is two or three and a second portion of the plurality of resource blocks overlaps with a guard band or the second frequency sub-band of the second downlink communication resource.

Aspect 61: The method of aspect 60, wherein regulating the communications comprises: refraining from transmitting the physical downlink shared channel transmission during the first portion based at least in part on the size and the quantity.

Aspect 62: The method of aspect 60, wherein regulating the communications comprises: transmitting the physical downlink shared channel transmission during the first portion based at least in part on the size and the quantity.

Aspect 63: The method of aspect 60, wherein regulating the communications comprises: transmitting, based at least in part on the size and the quantity, the physical downlink shared channel transmission during only a sub-portion of resource blocks of the first portion in accordance with the rule.

Aspect 64: The method of aspect 60, wherein regulating the communications comprises: combining, based at least in part on the size and the quantity, the first portion with a second precoding resource block group to generate a combined precoding resource block group; and transmitting the physical downlink shared channel transmission in the combined precoding resource block group.

Aspect 65: The method of aspect 54, wherein the first control signaling indicates the sub-band full duplex symbol that includes the first uplink communication resource, the second downlink communication resource, and a third downlink communication resource that is non-contiguous with the second downlink communication resource, and the second control signaling indicates that the precoding resource block group is a wideband precoding resource block group.

Aspect 66: The method of aspect 65, wherein transmitting the second control signaling comprises: transmitting a schedule for the precoding resource block group that does not overlap with the second downlink communication resource and a third downlink communication resource in accordance with the rule, wherein the rule specifies that a UE is not expected to be configured with non-contiguous resource blocks across two downlink subbands for reception of physical downlink shared channel transmissions configured with wideband precoding resource block groups.

Aspect 67: The method of aspect 65, wherein regulating the communications comprises: transmitting the physical downlink shared channel transmission in the precoding resource block group; and refraining from monitoring for uplink communications in the first uplink communication resource in accordance with the rule.

Aspect 68: The method of aspect 65, further comprising: transmitting the physical downlink shared channel transmission during the second downlink communication resource and the third downlink communication resource using a same precoder in accordance with the rule.

Aspect 69: The method of aspect 65, further comprising: selecting one of the second downlink communication resource and the third downlink communication resource for transmitting the physical downlink shared channel transmission, wherein non-selected resource blocks are rate-matched with the selected resource.

Aspect 70: A UE for wireless communications, comprising one or more memories storing processor-executable code and one or more processors coupled with the one or more memories and individually or collectively operable to execute the code to cause the UE to perform a method of any of aspects 1 through 7.

Aspect 71: A UE for wireless communications, comprising at least one means for performing a method of any of aspects 1 through 7.

Aspect 72: A non-transitory computer-readable medium storing code for wireless communications at UE, the code comprising instructions executable by a processor to perform a method of any of aspects 1 through 7.

Aspect 73: A UE for wireless communications, comprising one or more memories storing processor-executable code and one or more processors coupled with the one or more memories and individually or collectively operable to execute the code to cause the UE to perform a method of any of aspects 8 through 18.

Aspect 74: A UE for wireless communications, comprising at least one means for performing a method of any of aspects 8 through 18.

Aspect 75: A non-transitory computer-readable medium storing code for wireless communications at UE, the code comprising instructions executable by a processor to perform a method of any of aspects 8 through 18.

Aspect 76: A UE for wireless communications at UE, comprising one or more memories storing processor-executable code and one or more processors coupled with the one or more memories and individually or collectively operable to execute the code to cause the UE to perform a method of any of aspects 19 through 35.

Aspect 77: A UE for wireless communications, comprising at least one means for performing a method of any of aspects 19 through 35.

Aspect 78: A non-transitory computer-readable medium storing code for wireless communications at UE, the code comprising instructions executable by a processor to perform a method of any of aspects 19 through 35.

Aspect 79: A network entity for wireless communications, comprising one or more memories storing processor-executable code and one or more processors coupled with the one or more memories and individually or collectively operable to execute the code to cause the network entity to perform a method of any of aspects 36 through 42.

Aspect 80: A network entity for wireless communications, comprising at least one means for performing a method of any of aspects 36 through 42.

Aspect 81: A non-transitory computer-readable medium storing code for wireless communications at a network entity, the code comprising instructions executable by a processor to perform a method of any of aspects 36 through 42.

Aspect 82: A network entity for wireless communications, comprising one or more memories storing processor-executable code and one or more processors coupled with the one or more memories and individually or collectively operable to execute the code to cause the network entity to perform a method of any of aspects 43 through 53.

Aspect 83: A network entity for wireless communications, comprising at least one means for performing a method of any of aspects 43 through 53.

Aspect 84: A non-transitory computer-readable medium storing code for wireless communications at a network entity, the code comprising instructions executable by a processor to perform a method of any of aspects 43 through 53.

Aspect 85: A network entity for wireless communications, comprising one or more memories storing processor-executable code and one or more processors coupled with the one or more memories and individually or collectively operable to execute the code to cause the network entity to perform a method of any of aspects 54 through 69.

Aspect 86: A network entity for wireless communications, comprising at least one means for performing a method of any of aspects 54 through 69.

Aspect 87: A non-transitory computer-readable medium storing code for wireless communications at a network entity, the code comprising instructions executable by a processor to perform a method of any of aspects 54 through 69

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communications, comprising:

one or more memories storing processor-executable code; and one or more processors coupled with the one or more memories and individually or collectively operable to execute the code to cause the UE to:

receive first control signaling that indicates a slot that is allocated for sub-band full-duplex communications, wherein the first control signaling indicates a sub-band full-duplex symbol of the slot, and wherein the sub-band full-duplex symbol comprises at least a first communication resource that is associated with a first communication direction and that spans a first frequency sub-band and a second communication resource that is associated with a second communication direction different from the first communication direction and that spans a second frequency sub-band;

receive second control signaling that schedules, within the slot or outside the slot, one or more occasions for communication of a specified signal and that allocates a resource block group for communication during the sub-band full-duplex symbol, the resource block group comprising a plurality of resource blocks and being associated with the first communication direction, wherein a first portion of the plurality of resource blocks overlaps with the first frequency sub-band of the first communication resource and a second portion of the plurality of resource blocks overlaps with a guard band or the second frequency sub-band of the second communication resource; and regulate communications, during the slot and via the second portion of the plurality of resource blocks, based at least in part on the second portion of the plurality of resource blocks overlapping with the guard band or the second frequency sub-band of the second communication resource.

2. The UE of claim 1, wherein, to receive the second control signaling, the one or more processors are individually or collectively further operable to execute the code to cause the UE to:

receive a schedule for the one or more occasions, wherein the one or more occasions are scheduled outside of the slot, wherein the UE is not expected to communicate the specified signal in the slot that is allocated for sub-band full-duplex communications, and wherein the communications during the slot do not include the specified signal scheduled by the second control signaling.

3. The UE of claim 1, wherein, to regulate the communications, the one or more processors are individually or collectively further operable to execute the code to cause the UE to:

communicate, in the first communication direction, the specified signal during the one or more occasions that overlap with the slot such that the slot is treated as a downlink, uplink, or flexible slot based on the first communication direction.

4. The UE of claim 1, wherein, to regulate the communications, the one or more processors are individually or collectively further operable to execute the code to cause the UE to:

communicate, in the first communication direction, the specified signal during the one or more occasions that overlap with the slot such that one or more symbols that conflict with the one or more occasions are treated as downlink, uplink, or flexible symbols based on the first communication direction such that one or more symbols of the slot that overlap with the one or more occasions are only available for communications in the first communication direction.

5. The UE of claim 1, wherein, to regulate the communications, the one or more processors are individually or collectively further operable to execute the code to cause the UE to:

refrain from communicating the specified signal during the one or more occasions such that the UE is configured to drop occasions for communication of the specified signal that overlap with the sub-band full-duplex slot.

6. The UE of claim 1, wherein, to regulate the communications, the one or more processors are individually or collectively further operable to execute the code to cause the UE to:

determine that at least a first portion of the one or more occasions overlaps with a second portion of either uplink resources or downlink resources that have a communication direction that is different from a communication direction of the one or more occasions; and refrain from communicating the specified signal during the first portion such that the UE is configured to drop communication of the specified signal during resource blocks that conflict with resources of the sub-band full-duplex slot.

7. The UE of claim 1, wherein the specified signal comprises a synchronization signal block, a control message in a control resource set, a random access message in a random access channel occasion, a common search space set message, tracking reference signal, or a sounding reference signal.

8. The UE of claim 1, wherein, to regulate the communications, the one or more processors are individually or collectively further operable to execute the code to cause the UE to:

refrain from using the second portion of the plurality of resource blocks such that the UE is configured to drop a reception during resource blocks that overlap with the second communication resource having a different communication direction from the first communication direction of the resource block group.

9. The UE of claim 1, wherein, to regulate the communications, the one or more processors are individually or collectively further operable to execute the code to cause the UE to:

use the second portion for communications via the first communication direction or as flexible resources.

10. The UE of claim 1, wherein the one or more processors are individually or collectively further operable to execute the code to cause the UE to:

modify the second communication resource to have the first communication direction or to have a flexible allocation.

11. The UE of claim 1, wherein the one or more processors are individually or collectively further operable to execute the code to cause the UE to:

determine whether to use the first portion of the plurality of resource blocks for communications based at least in part on a quantity of the first portion relative to a threshold.

12. The UE of claim 11, wherein the threshold is based on a total quantity of resource blocks in the resource block group.

13. The UE of claim 11, wherein the one or more processors are individually or collectively further operable to execute the code to cause the UE to:

refrain from using the first portion of the resource block group for communications based at least in part on the quantity of the first portion being less than the threshold.

14. The UE of claim 11, wherein the one or more processors are individually or collectively further operable to execute the code to cause the UE to:

use the first portion based at least in part on the quantity of the first portion being greater than the threshold.

15. The UE of claim 1, wherein the one or more processors are individually or collectively further operable to execute the code to cause the UE to:

refrain from using both the first portion and the second portion of the resource block group for communications.

16. The UE of claim 1, wherein, to regulate the communications, the one or more processors are individually or collectively further operable to execute the code to cause the UE to:

determine that the first portion and the second portion are to be used for communications; and modify the second communication resource to have the first communication direction or to have a flexible allocation.

17. The UE of claim 1, wherein the guard band is positioned between the first communication resource spanning the first frequency sub-band and the second communication resource spanning the second frequency sub-band.

18. A user equipment (UE) for wireless communications, comprising:

one or more memories storing processor-executable code; and one or more processors coupled with the one or more memories and individually or collectively operable to execute the code to cause the UE to:

receive first control signaling that indicates a slot that is allocated for sub-band full-duplex communications, wherein the first control signaling indicates a sub-band full-duplex symbol of the slot, and wherein the sub-band full-duplex symbol comprises at least a first uplink communication resource that spans a first frequency sub-band and a second downlink communication resource that spans a second frequency sub-band;

receive second control signaling that schedules, within the slot or outside the slot, one or more occasions for communication of a specified signal and that allocates a precoding resource block group for receiving a physical downlink shared channel transmission, the precoding resource block group comprising a plurality of resource blocks, wherein a first portion of the plurality of resource blocks overlaps with the first frequency sub-band of the first uplink communication resource; and regulate communications, during the slot and via the precoding resource block group, based at least in part on the first portion of the plurality of resource blocks overlapping with the first frequency sub-band of the first uplink communication resource.

19. The UE of claim 18, wherein, to receive the second control signaling, the one or more processors are individually or collectively further operable to execute the code to cause the UE to:

receive a schedule for the precoding resource block group, wherein the precoding resource block group is scheduled such that the precoding resource block group does not overlap with a guard band or the first uplink communication resource, wherein the UE is not expected to be configured with precoding resource block groups that overlap with an uplink subband and a downlink subband of a bandwidth part.

20. The UE of claim 18, wherein a size of the precoding resource block group is two or four and a quantity of resource blocks in the first portion is one and a second portion of the plurality of resource blocks overlaps with a guard band or the second frequency sub-band of the second downlink communication resource.

21. The UE of claim 20, wherein, to regulate the communications, the one or more processors are individually or collectively further operable to execute the code to cause the UE to:

refrain from monitoring for the physical downlink shared channel transmission during the first portion based at least in part on the size and the quantity.

22. The UE of claim 20, wherein, to regulate the communications, the one or more processors are individually or collectively further operable to execute the code to cause the UE to:

monitor for the physical downlink shared channel transmission during the first portion based at least in part on the size and the quantity.

23. The UE of claim 20, wherein, to regulate the communications, the one or more processors are individually or collectively further operable to execute the code to cause the UE to:

combine, based at least in part on the size and the quantity, the first portion with a second precoding resource block group to generate a combined precoding resource block group; and monitor for the physical downlink shared channel transmission in the combined precoding resource block group.

24. The UE of claim 18, wherein a size of the precoding resource block group is four and a quantity of resource blocks in the first portion is two or three and a second portion of the plurality of resource blocks overlaps with a guard band or the second frequency sub-band of the second downlink communication resource.

25. The UE of claim 24, wherein, to regulate the communications, the one or more processors are individually or collectively further operable to execute the code to cause the UE to:

refrain from monitoring for the physical downlink shared channel transmission during the first portion based at least in part on the size and the quantity.

26. The UE of claim 18, wherein:

the first control signaling indicates the sub-band full-duplex symbol that includes the first uplink communication resource, the second downlink communication resource, and a third downlink communication resource that is non-contiguous with the second downlink communication resource; and the second control signaling indicates that the precoding resource block group is a wideband precoding resource block group.

27. A method for wireless communications by a user equipment (UE), comprising:

receiving first control signaling that indicates a slot that is allocated for sub-band full-duplex communications, wherein the first control signaling indicates a sub-band full-duplex symbol of the slot, and wherein the sub-band full-duplex symbol comprises at least a first communication resource that is associated with a first communication direction and that spans a first frequency sub-band and a second communication resource that is associated with a second communication direction different from the first communication direction and that spans a second frequency sub-band;

receiving second control signaling that schedules, within the slot or outside the slot, one or more occasions for communication of a specified signal and that allocates a resource block group for communication during the sub-band full-duplex symbol, the resource block group comprising a plurality of resource blocks and being associated with the first communication direction, wherein a first portion of the plurality of resource blocks overlaps with the first frequency sub-band of the first communication resource and a second portion of the plurality of resource blocks overlaps with a guard band or the second frequency sub-band of the second communication resource; and regulating communications, during the slot and via the second portion of the plurality of resource blocks, based at least in part on the second portion of the plurality of resource blocks overlapping with the guard band or the second frequency sub-band of the second communication resource.

28. A method for wireless communications by a user equipment (UE), comprising:

receiving first control signaling that indicates a slot that is allocated for sub-band full-duplex communications, wherein the first control signaling indicates a sub-band full-duplex symbol of the slot, and wherein the sub-band full-duplex symbol comprises at least a first uplink communication resource that spans a first frequency sub-band and a second downlink communication resource that spans a second frequency sub-band;

receiving second control signaling that schedules, within the slot or outside the slot, one or more occasions for communication of a specified signal and that allocates a precoding resource block group for receiving a physical downlink shared channel transmission, the precoding resource block group comprising a plurality of resource blocks, wherein a first portion of the plurality of resource blocks overlaps with the first frequency sub-band of the first uplink communication resource; and regulating communications, during the slot and via the precoding resource block group, based at least in part on the first portion of the plurality of resource blocks overlapping with the first frequency sub-band of the first uplink communication resource.

* * * * *